United States Patent [19]

Asamura et al.

[11] Patent Number: 5,442,399
[45] Date of Patent: Aug. 15, 1995

[54] METHOD AND APPARATUS FOR CODING A DIGITAL VIDEO SIGNAL BY FORMATTING THE SIGNAL INTO BLOCKS

[75] Inventors: Yoshinori Asamura; Yoshiko Hatano; Ken Onishi, all of Nagaokakyo, Japan

[73] Assignee: Mitsubishi Denki Kabushiki Kaisha, Tokyo, Japan

[21] Appl. No.: 287,587

[22] Filed: Aug. 8, 1994

Related U.S. Application Data

[63] Continuation of Ser. No. 718,288, Jun. 20, 1991, abandoned.

[30] Foreign Application Priority Data

| Jun. 25, 1990 | [JP] | Japan | 2-170816 |
| Jul. 5, 1990 | [JP] | Japan | 2-180124 |
| Jul. 16, 1990 | [JP] | Japan | 2-189928 |
| Jul. 16, 1990 | [JP] | Japan | 2-189929 |
| Jul. 17, 1990 | [JP] | Japan | 2-191662 |
| Sep. 12, 1990 | [JP] | Japan | 2-243555 |
| Apr. 11, 1991 | [JP] | Japan | 3-079210 |

[51] Int. Cl.[6] ................................ H04N 7/13
[52] U.S. Cl. ............................ 348/394; 348/395; 348/397; 348/398
[58] Field of Search ............. 358/133–136; 348/391–398, 400–420; H04N 7/13

[56] References Cited

U.S. PATENT DOCUMENTS

| 4,394,774 | 7/1983 | Wislergren | 358/13 |
| 4,663,660 | 5/1987 | Fedele et al. | 358/13 X |
| 4,734,767 | 3/1988 | Kaneko et al. | . |
| 4,827,336 | 5/1989 | Acampora et al. | 358/135 |
| 4,829,378 | 5/1989 | LeGall | 358/133 |
| 4,907,087 | 3/1990 | Schreiber | 358/186 |
| 4,918,524 | 4/1990 | Ansari et al. | 358/133 |
| 4,933,763 | 6/1990 | Chantelou | . |
| 4,987,480 | 1/1991 | Lippman et al. | 358/133 |
| 5,010,405 | 4/1991 | Schreiber et al. | 358/141 |
| 5,040,062 | 8/1991 | Knauer et al. | 358/136 |
| 5,048,111 | 9/1991 | Jones et al. | 358/133 |
| 5,097,331 | 3/1992 | Chen et al. | 358/133 |
| 5,128,757 | 7/1992 | Citta et al. | 358/141 X |
| 5,136,374 | 8/1992 | Jayant et al. | 358/133 |

FOREIGN PATENT DOCUMENTS

| 0294357 | 12/1988 | European Pat. Off. . |
| 43563A2 | 7/1991 | European Pat. Off. . |
| 2597282 | 10/1987 | France . |
| 63-38385 | 2/1988 | Japan . |
| 1253382 | 10/1989 | Japan . |
| 2079567 | 1/1982 | United Kingdom . |

OTHER PUBLICATIONS

IEEE Global Telecommunications Conference & Exhibition "Compatible HDTV Coding for Broadband ISDN" Tzou et al. 1988.

1989 IEEE International Symposium on Circuits And Systems "A Comparison of Vector Quantization Subband and Transform Coding of Imagery" fischer et al. 1989.

IEE Journal of Selected Areas in Communication "Fixed Distortion Subband Coding of Images for Packet-Switched Networks" Darragh et al.

Better Video Images–23rd Annual SMPTE Television Conference "Spectrum Compatible High-Definition Television Transmission System" 1989.

International Conference on Acoustics, Speech, and Signal processing "three Dimensional Sub-Band Coding of Video" Karlsson et al.

IEEE Acoustics, Speech, and Signal processing Magazine "Quadrature Mirror Filter Banks, M-Band Exten- (List continued on next page.)

*Primary Examiner*—Victor R. Kostak

[57] ABSTRACT

A high-efficient coding apparatus and method for compressing a digital video signal such as a color television signal, by dividing the digital video signal into a plurality of sub-bands, formatting the video signal of each sub-band into blocks per every plurality of picture elements, performing an orthogonal transform to each formatted block and coding coefficients obtained by the orthogonal transform.

62 Claims, 56 Drawing Sheets

OTHER PUBLICATIONS sions and Perfect-Reconstruction Techniques" Viadyanathan.
Signal Processing "Extension of Finite Length Signals for Sub-Band Coding" Karlsson et al.
Gharavi et al., "Sub-Band Coding of Monochroem and Color Images," IEEE Transactions on Circuits and Systems, vol. 35, No. 2, pp. 207–24.
Rao et al., Discrete Cosine Transform, pp. 165–177.
IEEE Transaction on Consumer Electronics, vol. 34, No. 3 (aug. 1988) "An Experimental Digital VCR with 40MM Drum, Single Actuator and DCT Based Bit-Rate REduction".
IEEE Transaction on Acoustics, Speech and Signal Processing, vol. Assp–34 No. 5 (Oct. 1986) "Subband Coding of Images".

ONE BLOCK AFTER
SUB-SUMPLING (INPUT SIGNAL)

(OUTPUT SIGNAL FROM SWITCH 39, 40)

Fig. 50(a) LL BAND
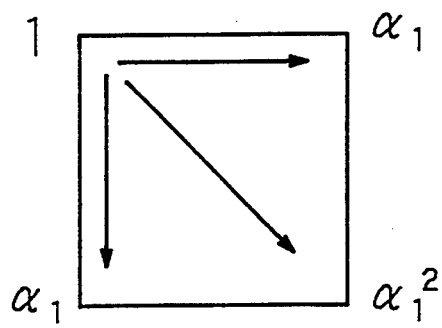
Fig. 50(b) LH BAND
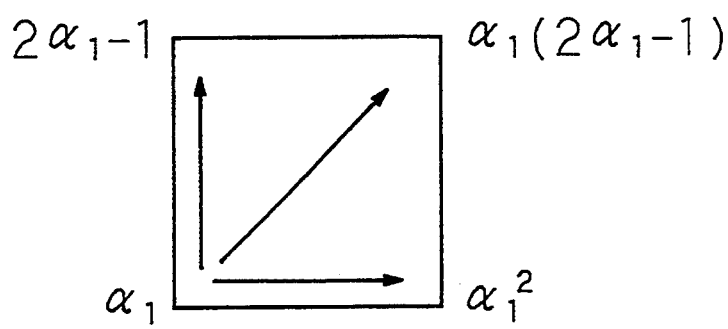
Fig. 50(c) HL BAND
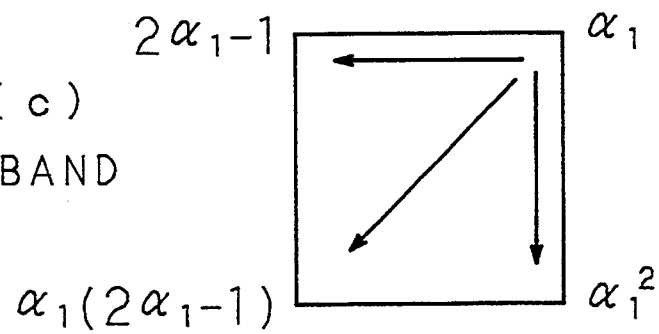
Fig. 50(d) HH BAND
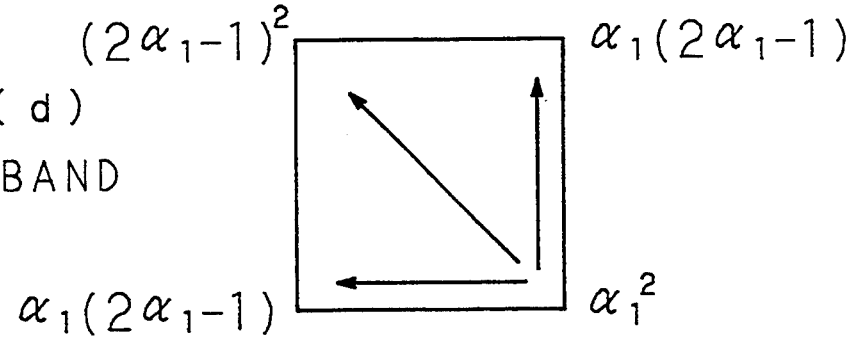

Fig. 53(a)
1 LINE SIGNAL x(n)

| x(1) | x(2) | x(3) | (4) | ... | x(702) | x(703) | x(704) |
|---|---|---|---|---|---|---|---|

Fig. 53(b)
OUTPUT OF CIRCUIT 71

| ... | x(3) | x(2) | x(1) | x(1) | x(2) | x(3) | x(4) | ... | x(702) | x(703) | x(704) | x(703) | x(704) | x | ... |

Fig. 53(c)
OUTPUT OF LPF 72 AND HPF 73 (i=1, 2)

| yi(1) | yi(2) | yi(3) | yi(4) | ... | yi(702) | yi(703) | yi(704) |

Fig. 53(d)
OUTPUT OF CIRCUIT 74a AND 74b (i=1, 2)

| yi(1) | ... | yi(3) | ... | yi(703) |

Fig. 53(e)
OUTPUT OF CIRCUIT 79a

| ... | 0 | y1(1) | 0 | y1(1) | 0 | y1(3) | 0 | ... | 0 | y1(703) | 0 |

Fig. 53(f)
OUTPUT OF CIRCUIT 79b

| ... | 0 | −y2(1) | 0 | y2(1) | 0 | y2(3) | 0 | ... | 0 | y2(703) | 0 | −y2(703) |

Fig. 53(g)
OUTPUT OF LPF 80 AND HPF 81 (i=1, 2)

| xi(1) | xi(2) | xi(3) | xi(4) | ... | xi(702) | xi(703) | xi(704) |

Fig. 56(a) 1 LINE SIGNAL x(n)

| ... | x(4) | x(3) | x(2) | x(1) | x(2) | x(3) | x(4) | ... | x(702) | x(703) | x(704) | ... |

Fig. 56(b) OUTPUT OF CIRCUIT 84

| ... | x(4) | x(3) | x(2) | x(1) | x(2) | x(3) | x(4) | ... | x(702) | x(703) | x(704) | x(703) | x(702) | ... |

Fig. 56(c) OUTPUT OF CIRCUIT 74a

| y1(1) | y1(3) | ... | y1(703) |

Fig. 56(d) OUTPUT OF CIRCUIT 74c

| y2(4) | y2(2) | y2(2) | y2(4) | ... | y2(702) | y2(704) |

Fig. 56(e) OUTPUT OF CIRCUIT 87a

| ... | 0 | y1(3) | 0 | y1(1) | 0 | y1(3) | 0 | ... | 0 | y1(703) | 0 | ... |

Fig. 56(f) OUTPUT OF CIRCUIT 87b

| ... | y2(4) | 0 | y2(2) | 0 | y2(2) | 0 | y2(4) | ... | y2(702) | 0 | y2(704) | ... |

Fig. 56(g) OUTPUT OF LPF 88 AND HPF 89

| xi(1) | xi(2) | xi(3) | xi(4) | ... | xi(702) | xi(703) | xi(704) | (i=1,2) |

METHOD AND APPARATUS FOR CODING A DIGITAL VIDEO SIGNAL BY FORMATTING THE SIGNAL INTO BLOCKS

This application is a continuation of application Ser. No. 07/718,288 filed on Jun. 20, 1991, now abandoned.

BACKGROUND OF THE INVENTION

1. Field of the Invention

This invention relates to a method and an apparatus for formatting and coding a digital video signal of each frequency band after dividing the same into a plurality of frequency bands.

2. Description of Related Art

Conventionally, a digital video signal has been coded in such a manner as disclosed in Japanese Patent Laid-Open No. 1-253382 (1989) and U.S. Pat. No. 4,394,774. The conventional coding method will be discussed hereinbelow with reference to these prior arts.

Referring to FIG. 1, there is shown a block diagram of the structure of a conventional digital video signal coding apparatus disclosed in Japanese Patent Laid-Open No. 1-253382 referred to above. A principal movement estimating circuit 101 regulates a principal displacement vector whose image-to image difference is minimum by each preceding image and outputs the vector to a scan converting circuit 102 and coding circuit 105. The scan converting circuit 102 forms a two-dimensional block of 8 picture elements×8 lines, thereby forming a three-dimensional block with the four two-dimensional blocks of four consecutive images. Every four two-dimensional blocks in each three-dimensional block are shifted in space from one image to another by the displacement vector outputted from the circuit 101. The three-dimensional block outputted from the scan converting circuit 102 is processed by an orthogonal transform at a three-dimensional orthogonal transforming circuit 103. An inverse quantizing and normalizing circuit 104 normalize and quantize coefficients outputted from the three-dimensional orthogonal transforming circuit 103. The normalization weights coefficients by multiplying or dividing them according to a parameter related to the filling rate of a rate control memory 106 and the coefficients themselves. The quantization converts the normalized value of each coefficient expressed at a floating point to an integer.

An output of the quantizing and normalizing circuit 104 is outputted to the coding circuit 105 which transmits a word of Huffman code among words stored in a memory and regulated beforehand, and another word indicating an address of the coded value to the rate control memory 106 by each non-zero quantized value. The address simultaneously with the one-dimensional scan in the three-dimensional block are regulated by coding the length of a sequence of zeros. The coding circuit 105 provided with a variable length coding function is a generally common model. The rate control memory 106 ensures the outputting rate to be constant. The above-mentioned U.S. Pat. No. 4,394,774 reveals the method to reduce the coding rate of the sequence of zeros outputted from the rate control memory 106.

In FIG. 2, a coding circuit 105 of a different embodiment is shown. The coding apparatus 105 can be arranged in such structure as shown in FIG. 2 wherein each of the apparatuses is provided with m paths in parallel to receive all the values to be coded. More specifically, these values are inputted to respective storing circuits along the paths, and each storing circuit has two memories functioning as a flip-flop. The value of a given three-dimensional block is written in one of the two memories, while the value of the preceding block is read by the other memory in the order corresponding to a new scan. FIGS. 3(a) and 3(b) indicate two types of scanning for reading, i.e., FIG. 3(a) is a type allowing minimization of the rate of a block having a fixed content and FIG. 3(b) is a type related to a moving picture. Each output from the storing circuits 111a–111m is outputted to respective associating circuits 112a–112m which are coding circuits performing variable length coding according to the U.S. Pat. No. 4,394,774. Each output from the circuits 112a–112m is inputted to a counting and judging circuit 113. The circuit 113 counts the number of bits used to code each three-dimensional block for scanning, thereby to determine a scan which minimizes the rate of the three-dimensional block. Moreover, the circuit 113 controls an output of a branching circuit 114 storing bits outputted from each coding circuit, and ensures the transfer of bits corresponding to the optimum coding of the three-dimensional block to a multiplexing circuit 115. The multiplexing circuit 115 multiplies the bits based on a selected scanning index and transfers the bits to a decoding apparatus for reconstruction of the block, and assures the transfer of a principal displacement vector determining the images when each of four groups of images is started.

According to a conventional coding method of a digital video signal, when the coefficients, after being processed by the three-dimensional orthogonal transform, are scanned in the one dimension, the coding amount is reduced by selecting the scanning type of FIG. 3(a) for a static part and the scanning type of FIG. 3(b) for a moving part. In combination of the sub-dividing and three-dimensional orthogonal transform, namely, when the three-dimensional orthogonal transform is applied to each band component after the digital video signal is divided into a plurality of frequency band, however, the scanning types shown in FIGS. 3(a) and 3(b) are not considered optimum particularly for components including high frequencies.

The quantization level of the coefficients outputted from the three-dimensional orthogonal transforming circuit 103 is decided by a parameter related to the filling rate of the rate control memory 106 and the coefficients themselves. In this case, if both a flat part and an edge part exist within one block, noises on the flat part of a reproduced image are very conspicuous.

In the Japanese Patent Laid-Open No. 1-253382, if a utilizable signal is treated according to the interlaced scanning, the signal is converted to a video signal in the sequential scanning from prior to the coding. Therefore, as indicated in FIG. 4, one image is constituted by every frame, and a horizontal direction 1 is set as a first dimensional direction, a vertical direction 2 as a second dimensional direction and a time direction 3 as a third dimensional direction thereby to construct a three-dimensional block, and the redundancy of the video signal is eliminated by performing orthogonal transform on the three-dimensional block.

Meanwhile, the interlaced scanning method is employed in the actual television screen as shown in FIG. 5. This method can prevent flickering without increasing the amount of information to be transmitted when transmitting the moving image information. Accordingly, one screen is completely scanned by half the number of scanning lines shown in FIG. 5. Lines not scanned on the preceding screen are scanned on the succeeding screen, so that the vertical resolution of the image is restricted from being worsened. Since the number of screens transmitted within the same period is increased twice according to the interlaced scanning as compared with the sequential scanning, the occurrence of the flickering is restricted. The screen roughly scanned as above is called a field. One frame is formed of the two successive fields as illustrated in FIG. 6, and therefore the scanning speed is approximately 60 fields per second according to the NTSC (National Television System Committee) method.

In the conventional digital video signal coding method, a three-dimensional block is constituted by a video signal in the sequential scanning form, which is the reason why the redundancy of the video signal in the interlaced scanning form cannot be effectively eliminated. Particularly, if the video signal in the interlaced scanning form with large motion is coded in the same manner as the video signal in the sequential scanning form, a two-dimensional block is formed with the spatial displacement and time displacement mixed, making it difficult to eliminate the redundancy of the video signal.

FIG. 7 is a block diagram showing the structure of a conventional coding apparatus disclosed, for example, in IEEE Transactions on Consumer Electronics, Vol. 34, No. 3 (August 1988) under the title of "AN EXPERIMENTS DIGITAL VCR WITH 40 MM DRUM, SINGLE ACTUATOR AND DCT-BASED BITRATE REDUCTION". Referring to this FIG. 7, a block formatting circuit 121 divides an inputted digital video signal into a plurality of blocks and outputs the video signal of each block to a DCT circuit 122. The DCT circuit 122 processes each block outputted from the block formatting circuit 121 by DCT (Discrete Cosine Transform), and outputs the obtained coefficients to a weighting circuit 123. Each coefficient from the DCT circuit 122 is weighted at the weighting circuit 123 and then outputted to an adaptive quantizing circuit 124. The adaptive quantizing circuit 124 holding a plurality of quantization tables of different quantizing step widths quantizes the weighted coefficient according to the optimum quantizing step width and outputs it to a variable length coding circuit 125. The variable length coding apparatus 125 performs variable length coding on the quantized coefficient and outputs the variable length coded data to a buffer memory 126. The buffer memory 126 converts the data to a fixed rate and stores the same. The variable length coded data is outputted with a fixed output rate. A buffer controller 127 switches the quantizing step width at the adaptive quantizing circuit 124 so that the buffer memory 126 does not overflow, and at the same time it selects the coefficient to be coded at the variable length coding circuit 125.

The operation of the above-described apparatus will now be discussed more in detail. An inputted digital video signal is composed of, e.g., a luminance signal and two color difference signals. These signals are time-divided at the formatting circuit 121 and divided into blocks, for example, 8 picture elements × lines and outputted to the DCT circuit 122. The video signal in each block is processed by DCT on 8 picture elements in the horizontal and in the vertical directions at the DCT circuit 122. Supposing that the video signal is expressed by $x(i,j)$ $(i,j=0, 1, \ldots, 7)$, DCT on 8 picture elements in the horizontal direction is conducted in a manner as follows:

$$f(0, j) = \frac{1}{2\sqrt{2}} \sum_{i=0}^{7} x(i, j)$$

$$f(m, j) = \frac{1}{2} \sum_{i=0}^{7} x(i, j) \cos \frac{(2i + 1)m\pi}{16}$$

$$(m = 1, 2, \ldots, 7) (j = 0, 1, \ldots, 7)$$

Then, DCT on 8 picture elements in the vertical direction is performed on the transformed video signals $f(0,j)$, $f(m,j)$ in accordance with equations below:

$$F(m, o) = \frac{1}{2\sqrt{2}} \sum_{i=0}^{7} f(m, j)$$

$$F(m, n) = \frac{1}{2} \sum_{i=0}^{7} f(m, j) \cos \frac{(2j + 1)n\pi}{16}$$

$$(n = 1, 2, \ldots, 7) (m = 0, 1, \ldots, 7)$$

Accordingly, the video signal is expressed as a coefficient $F(m,n)$ $(m,n=0, 1, \ldots, 7)$ and outputted to the weighting circuit 123.

Each coefficient inputted to the weighting circuit 123 is processed by weighting. Concretely, since the human eye is weak to a high spatial frequency, weighting with small rate is performed on a zone including high spatial frequency components, whereas weighting with large rate is performed on a zone including low spatial frequency components. A weighting function $W(m,n)$ is represented by the following equation;

$$W(m,n) = \frac{7 - (1 - \alpha)m}{7} \times \frac{7 - (1 - \alpha)n}{7}$$

$$(0 < \alpha \leq 1) (m,n = 0, 1, \ldots, 7)$$

The output from the weighting circuit 123 is quantized at the adaptive quantizing circuit 124. Based on the coefficient in each block and the quantizing parameter outputted from the buffer controller 127, the adaptive quantizing step width is selected at the adaptive quantizing circuit 124. The weighted coefficient is quantized in accordance with the selected optimum quantizing step width. Concretely, a coarse quantizing step width is selected for the video data with a leading end of strong contrast, or a fine quantizing step width is selected for the video data of a detailed part of small amplitude.

The quantized coefficient is variable length coded at the variable length coding circuit 125 and stored in the buffer memory 126. The amount of data stored in the buffer memory 126 is checked by the buffer controller 127 so as to prevent the buffer memory 126 from overflowing. The buffer controller 127 decides the quantizing parameter in accordance with the amount of data stored in the buffer memory 126. The quantizing step width in the adaptive quantizing circuit 124 is changed in accordance with this quantizing parameter, and also the coefficient to be coded in the variable length coding circuit 125 is selected in accordance with the amount of data in the buffer memory 126. In other words, the buffer controller 127 increases the reduction rate of data when the buffer memory 126 stores a lot of data. On the other hand, the buffer controller 127 reduces the reduction rate when the amount of data stored in the buffer memory 126 is small. Owing to the adjustment as above at the buffer controller 127, the buffer memory 126 is prevented from overflowing. The data stored in the buffer memory 126 is read with a fixed output rate.

In the conventional coding apparatus described above, when a digital video signal is divided into sub-bands and orthogonal transform is performed on the blocks in each sub-band, since the frequency response of each sub-band is different by the influences of the folding of the sub-sampling, weighting to be fitted for each sub-band is necessary.

As disclosed in Japanese Patent Laid-Open No. 63-38385 (38385/1988), a sampled video signal can be periodically downsampled in order to reduce the coding rate of the signal. FIGS. 9 and 10 are block diagrams showing the structure of a transmission side (recording side) and a receiver side (reproducing side) of a coding apparatus, respectively, wherein the sub-sampling method referred to above is employed for a color video signal.

Referring first to FIG. 9, the transmission side will be explained. A color video signal, for example, in NTSC system is inputted to an input terminal 131. When this color video signal is outputted to an A/D converter 132, a digital color video signal quantized in 8 bits per one sample with a sampling frequency of, e.g., 4 fsc (fsc: color sub carrier frequency) is obtained. The obtained digital color video signal is outputted to a sub-sampling circuit 133 and then to a formatting circuit 134. A prefilter for band restriction is not provided in the former stage of the sub-sampling circuit 133, therefore high frequency components of the color video signal are not lost.

In the sub-sampling circuit 133, the digital color video signal is sampled with a sampling frequency 2 fsc. At the formatting circuit 134, the digital color video signal is further converted to a continuous signal per every two-dimensional block which is a coding unit. According to the example shown in FIG. 9, one block obtained by dividing the screen of one field is composed of 8 picture elements×4 lines, i.e., 32 picture elements. FIG. 11 illustrates one block, in which a solid line indicates a line of a field of an odd number and a broken line shows a line of a field of an even number. One block can be a three-dimensional block constituted by four two-dimensional areas in each of four frames. The picture elements in the block are downsampled as shown in FIG. 12 at the sub-sampling circuit 133 provided prior to the formatting circuit 134. In consequence, the number of picture elements in each block is 16. A symbol o in FIG. 12 is a sub-sampled picture element, a symbol x being a downsampled picture element.

The output of the formatting circuit 134 is inputted to a dynamic range (DR) detecting circuit 135 and to a delay circuit 136. The DR detecting circuit 135 detects the dynamic range and minimum value MIN by every block. The picture element data PD from the delay circuit 136 is outputted to a subtractor 137, where the picture element data PDI from which the minimum value MIN is removed is formed.

Into a quantizing circuit 138 are inputted the picture element data PDI without the minimum value and the dynamic range DR. The picture element data PDI is quantized at the quantizing circuit 138 in compliance with the dynamic range DR. The quantizing circuit 138 outputs a code signal DT with one picture element data converted to 4 bits.

The code signal DT from the quantizing circuit 138 is outputted to a framing circuit 139. The dynamic range DR (8 bits) and minimum value MIN (8 bits) are inputted as an additional code of each block to the framing circuit 139. The framing circuit 139 executes error correction coding on the code signal DT and additional code, and also adds a synchronizing signal. The transmission data obtained at an output terminal 140 of the framing circuit 139 is outputted to a transmission line such as a digital line, etc. In the case of a digital VTR, the output signal is sent to a rotary head through a recording amplifier and a rotary transformer and the like.

The receiver side will be depicted with reference to FIG. 10. The received data is inputted to a de-framing circuit 142 through an input terminal 141. The code signal DT and additional code DR, MIN are separated and processed by error correction at the de-framing circuit 142. The code signal DT and dynamic range DR are outputted, to a decoding circuit 143.

The decoding circuit 143 carries out the treatment reverse to that of the quantizing circuit 138 at the transmission side. That is, the data, with the minimum level removed, is decoded to a representative level, which data is added with the 8-bit minimum value MIN at an adder 144, thereby decoding the original picture element data. The output of the adder 144 is inputted to a de-formatting circuit 145 which, in the process reverse to that of the formatting circuit 134, converts the decoded data in the order of blocks to those in the same order as scanning. When the output of the de-formatting circuit 145 is inputted to an interpolating circuit 146, the data of the thinned picture elements is interpolated by the sub-sampling data therearound. The digital color video signal with the sampling frequency 4 fsc from the interpolating circuit 146 is outputted to a D/A converter 147. Accordingly, an analog color video signal is obtained at an output terminal 148 of the D/A converter 147. In the case where a prefilter is not provided at the transmission side, there is a possibility that a folding distortion is generated, for example, at a point where the luminance level is suddenly changed, and therefore a circuit to remove the distortion can connected to an output side of the interpolating circuit 146.

Although the coding rate is reduced in the conventional coding apparatus of the above-discussed structure, there still are involved some problems that the resolution of a moving picture is lowered, an occurrence of the folding distortion increases the quality deterioration etc. The conventional coding apparatus is not sufficient for coding to obtain an image of good quality.

FIGS. 13 and 14 are block diagrams showing the structure of a conventional sub-band dividing/synthesizing circuit disclosed, e.g., IEEE Transactions on Circuits and System, Vol. 35, No. 2 (February 1988) "Sub-Band Coding of Monochrome and Color Images".

In FIG. 13, a digital video signal inputted through an input terminal 151 is outputted to a horizontal low pass filter. 152 (referred to as a horizontal LPF 152 hereinafter) for restricting a horizontal frequency of the video signal. The horizontal LPF 152 is a filter with even number taps, having a frequency response shown in FIG. 15. When the function of the horizontal LPF 152 is designated by $h1(n)$ ($h = 0, 1, \ldots, N-1$; N being an even number), the following equation is held;

$$h_1(n) = h_1(N-n-1), n=0, \ldots, (N/2)-1$$

In other words, if the input video signal is 256 picture elements×256 lines, the horizontal LPF 152 outputs a signal expressed by a formula (1) below by each line x(n) (n = 1, ..., 256) of the video signal;

$$\begin{aligned} y_1(n) &= \sum_{k=0}^{N-1} h_1(k) \cdot x\left(n + \frac{N}{2} - k\right) \\ &= \sum_{k=0}^{(N/2)-1} h_1(k) \cdot \left\{ x\left(n + \frac{N}{2} - k\right) + x\left(n - \frac{N}{2} + 1 + k\right) \right\} \end{aligned} \quad (1)$$

$$(n = 1, \ldots, 256)$$

On the other hand, the inputted digital video signal is inputted also to a horizontal high pass filter 153 (referred to as a horizontal HPF 153 hereinafter) for restricting a horizontal frequency of the video signal. The horizontal HPF 153 is a filter with even number taps, having a frequency response b of FIG. 15. The function h2(n) (n=0, $$h_2(n) = h_1(n) \cdot (-1)^n$$

Therefore, $$h_2(n) = -h_2(N-n-1), n=0, \ldots, (N/2)-1$$

In other words, the horizontal HPF 153 outputs a signal represented by a formula (2) below by each line x(n) (n=1, $$\begin{aligned} y_2(n) &= \sum_{k=0}^{N-1} h_2(k) \cdot x\left(n + \frac{N}{2} - k\right) \\ &= \sum_{k=0}^{(N/2)-1} h_2(k) \cdot \left\{ x\left(n + \frac{N}{2} - k\right) + x\left(n - \frac{N}{2} + 1 + k\right) \right\} \end{aligned} \quad (2)$$

$$(n = 1, \ldots, 256)$$

The outputs of the horizontal LPF 152 and horizontal HPF 153 are inputted to horizontal 2:1 sub-sampling circuits 154a, 154b respectively, to reduce the picture elements in the horizontal direction to half. The outputs of the horizontal 2:1 sub-sampling circuits 154a, 154b are inputted to vertical low pass filters 155a, 155b (referred to as vertical LPFs 155a, 155b) for restricting a vertical frequency respectively. The vertical LPFs 155a, 155b are filters with even number taps having the frequency response a in FIG. 15. The function h3(m) (m=0, ..., M−1: M being an even number) satisfies $$h_3(m) = h_3(M-m-1), m=0, , (M/2)-1$$

That is to say, the vertical LPFs 155a, 155b output a signal represented by the following formula by each line w(m) (m=1, ..., 256) of the video signal outputted from the horizontal 2:1 sub-sampling circuits 154a, 154b respectively;

$$\begin{aligned} u_1(m) &= \sum_{k=0}^{M-1} h_3(k) \cdot w\left(m + \frac{M}{2} - k\right) \\ &= \sum_{k=0}^{(M/2)-1} h_3(k) \cdot \left\{ w\left(m + \frac{M}{2} - k\right) + w\left(m - \frac{M}{2} + 1 + k\right) \right\} \end{aligned}$$

$$(m = 1, \ldots, 256)$$

The outputs of the vertical LPFs 155a, 155b are respectively inputted to vertical 2:1 sub-sampling circuits 157a, 157c, where the number of picture elements in the vertical direction is reduced to half. The outputs of the vertical 2:1 sub-sampling circuits 157a, 157c are outputted from respective output terminals 158a, 158c. The signal outputted from the output terminal 158a is a signal of the LL frequency band of FIG. 16. Moreover, the signal outputted from the output terminal 158c is a signal in the HL frequency band of FIG. 16. Meanwhile, the outputs of the horizontal 2:1 sub-sampling circuits 154a, 154b are also inputted to vertical high pass filters 156a, 156b (referred to as vertical HPFs 156a, 156b hereinafter) for restricting a vertical frequency. The vertical HPFs 156a, 156b are filters with even number taps, having the frequency response b shown in FIG. 15, the function h4(m) (m=0, ..., M−1) being $$h_4(m) = h_3(m)(-1)^m$$

Therefore, $$h_4(m) = -h_4(M-m-1), m=0, \ldots, (M/2)-1$$

In other words, the vertical HPFs 156a, 156b output a signal expressed as follows by each line w(m) (m=1, ..., 256) of the video signal outputted from the respective horizontal 2:1 sub-sampling circuits 154a, 154b;

$$\begin{aligned} u_2(m) &= \sum_{k=0}^{M-1} h_4(k) \cdot w\left(m + \frac{M}{2} - k\right) \\ &= \sum_{k=0}^{(M/2)-1} h_4(k) \cdot \left\{ w\left(m + \frac{M}{2} - k\right) + w\left(m - \frac{M}{2} + 1 + k\right) \right\} \end{aligned}$$

$$(m = 1, \ldots, 256)$$

The outputs of the vertical HPFs 156a, 156b are inputted to vertical 2:1 sub-sampling circuits 157b, 157d respectively. After the number of picture elements in the vertical direction is reduced to half at the circuits 157b, 157d, the signal is outputted from each output terminal 158b, 158d. The signal outputted from the output terminal 158b is a signal of the LH frequency band in FIG. 16, and that outputted from the output terminal 158d is a signal in the HH frequency band of FIG. 16.

The sub-band dividing circuit operates in the manner as described hereinabove. The four sub-divided signals are coded by predictive coding, orthogonal transform, etc. and outputted. At the decoding side, these signals are combined after being decoded. A sub-band synthesizing circuit shown in FIG. 14 operates in reverse of the sub-band dividing circuit of FIG. 13. Specifically, the outputs from the output terminals 158a–158d are inputted to the corresponding input terminals 159a–159d, interpolated with 0 at vertical 1:2 interpolating circuits 160a–160d respectively. As a result, the number of picture elements in the vertical direction is increased twice. The outputs from the vertical 1:2 interpolating circuits 160a, 160c are inputted to vertical LPFs 161a, 161b respectively. The vertical LPFs 161a, 161b are filters having the completely same frequency response as the vertical LPFs 155a, 155b, and output a signal described below by each line u1'(m) (m=1, ..., 256) of the output video signal outputted from the vertical 1:2 interpolating circuits 160a, 160c respectively;

$$w1(m) = \sum_{k=0}^{M-1} h_3(k) \cdot u_1'\left(m + \frac{M}{2} - 1 - k\right)$$

$$= \sum_{k=0}^{(M/2)-1} h_3(k) \cdot \left\{ u_1'\left(m + \frac{M}{2} - 1 - k\right) + u_1'\left(m - \frac{M}{2} + k\right)\right\}$$

$(m = 1, \ldots, 256)$

In the meantime, the outputs of the vertical 1:2 interpolating circuits 160b, 160d are respectively inputted to vertical HPFs 162a, 162b. The vertical HPFs 162a, 162b are equivalent to the vertical HPFs 156a, 156b in frequency response, and output a signal expressed by a formula below by each line u2'(m) (m=1, ..., 256) of the video signal outputted from the vertical 1:2 interpolating circuits 160b, 160d;

$$w2(m) = \sum_{k=0}^{M-1} h_4(k) \cdot u_2'\left(m + \frac{M}{2} - 1 - k\right)$$

$$= \sum_{k=0}^{(M/2)-1} h_4(k) \cdot \left\{ u_2'\left(m + \frac{M}{2} - 1 - k\right) - u_2'\left(m - \frac{M}{2} + k\right)\right\}$$

$(m = 1, \ldots, 256)$

A calculating unit 163a subtracts the output of the vertical HPF 162a from the output of the vertical LPF 161a, while a calculating unit 163b subtracts the output of the vertical HPF 162b from the output of the vertical LPF 161b. Each output from the calculating units 163a, 163b is interpolated with 0 at horizontal 1:2 interpolating circuits a, 164b, and accordingly the number of picture elements in the horizontal direction is increased twice. The output of the horizontal 1:2 interpolating circuit 164a is inputted to a horizontal LPF 165 which is a filter having the same frequency response as the horizontal LPF 152. A signal represented by a formula (3) below is outputted by each line y1'(n) (n=1, ..., 256) of the video signal outputted from the horizontal 1:2 interpolating circuit 164a;

$$x1(n) = \sum_{k=0}^{N-1} h_1(k) \cdot y_1'\left(n + \frac{N}{2} - 1 - k\right) \quad (3)$$

$$= \sum_{k=0}^{(N/2)-1} h_1(k) \cdot \left\{ y_1'\left(n + \frac{N}{2} - 1 - k\right) + y_1'\left(n - \frac{N}{2} + k\right)\right\}$$

$(n = 1, \ldots, 256)$

In the meantime, an output from a horizontal 1:2 interpolating circuit 164b is inputted to a horizontal HPF 166. The horizontal HPF 166 is a filter with the same frequency response as the horizontal HPF 153, and outputs a signal expressed by a formula (4) below by each line y2'(n) (n=1, ..., 256) of the video signal outputted from the horizontal 1:2 interpolating circuit 164b;

$$x2(n) = \sum_{k=0}^{N-1} h_2(k) \cdot y_2'\left(n + \frac{N}{2} - 1 - k\right) \quad (4)$$

$$= \sum_{k=0}^{(N/2)-1} h_2(k) \cdot \left\{ y_2'\left(n + \frac{N}{2} - 1 - k\right) - y_2'\left(n - \frac{N}{2} + k\right)\right\}$$

$(n = 1, \ldots, 256)$

A calculating unit 167 subtracts the output of the horizontal LPF 166 from the output of the horizontal LPF 165, and outputs a subtracted signal from an output terminal 168.

Although the conventional sub-band dividing/synthesizing circuit is constructed in the manner as described hereinabove, filtering at the end of the image remains to be solved. In the disclosure "Sub-Band Coding of Monochrome and Color Images" mentioned earlier, although the horizontal and the vertical filters used are filters with 16 taps as indicated in Table 1, values x(−6),...,x(0) and x(257), ..., x(264) are necessary to perform an operation on each line x(n) (n=1, ..., 256) of the video signal according to the formula (1) when the video signal is passed through the horizontal LPF 152.

TABLE 1

| | LPF | | HPF |
|---|---|---|---|
| h1(7) | 0.48102840 E 00 | h2(7) | −0.48102840 E 00 |
| h1(6) | 0.97798170 E-01 | h2(6) | 0.97798170 E-01 |
| h1(5) | −0.90392230 E-01 | h2(5) | 0.90392230 E-01 |
| h1(4) | −0.96663760 E-02 | h2(4) | −0.96663760 E-02 |
| h1(3) | 0.27641400 E-01 | h2(3) | −0.27641400 E-01 |
| h1(2) | −0.25897560 E-02 | h2(2) | −0.25897560 E-02 |
| h1(1) | −0.50545260 E-02 | h2(1) | 0.50545260 E-02 |
| h1(0) | 0.10501670 E-02 | h2(0) | 0.10501670 E-02 |

Conventionally, as a countermeasure to the above-mentioned problem, it has been practiced that the input signal x(n) (n=1, ..., 256) to the filter is folded to be connected and operated. In other words, the operation is performed in accordance with a formula (5);

$$\begin{cases} x(1-n) = x(n) \\ x(256+n) = x(257-n) \end{cases} \quad (5)$$

$(n = 1, \ldots, 256)$

When the video signal is folded for filtering, however, there is a defect such that the resultant subdivided/synthesized image cannot be perfectly returned to the original at an end point thereof. It will be discussed to explain the above defect more concretely when the first line of the inputted video signal $x(n)$ ($n=1, \ldots, 256$) is $x(1)=16, x(2)=120, x(3)=130, x(4)=140, x(5)=150,$
$\quad x(6)=160, x(7)=170, x(8)=180, x(9)=190,$
$\quad x(10)=200, x(n)=200, (n=11, \ldots, 256)$ When the first line is passed through the horizontal LPF 152 with 16 taps as shown in Table 1 and thinned out at the horizontal 2:1 sub-sampling circuit 154a, the line is outputted, by the formulae (1) and (5), as;

$y1(1)=59.6, y1(3)=144.7, y1(5)=152.6,$
$\quad y1(7)=175.1, y1(9)=195.3, y1(11)=200.5,$
$\quad y1(13)=199.8, y1(15)=200.0, y1(17)=199.9,$ On the other hand, when the first line is passed through the horizontal HPF 153 and thinned out at the horizontal 2:1 sub-sampling circuit 154b, the line is outputted by the formulae (2) and (5), as;

$y2(1)=-37.7, y2(3)=8.2, y2(5)=-3.1, y2(7)=1.0,$
$\quad y2(9)=-1.6, y2(11)=0.1, y2(13)=-0.1,$
$\quad y2(15)=0.1, y2(17)=0.0,$ If no distortion is generated at all by the sub-band dividing in the vertical direction at the vertical 2:1 sub-sampling circuits 157a–157d of the succeeding stage and by the sub-band-synthesizing in the vertical direction at the vertical 1:2 interpolating circuits 160a–160d, the output of the operating unit 163a becomes y1(n) (n=1,3,5,... , 255), and the output of the calculating unit 163b becomes y2(n) (n=1,3,5,..., 255). The same folding is performed according to the formula (5) on the output of each operating unit 163a, 163b.

Namely, $$\begin{cases} y1(-n) = y1(n) \\ y1(256+n) = y1(256-n) \end{cases}$$

$(n = 1, 3, 5, \ldots, 255)$ $$\begin{cases} y2(-n) = y2(n) \\ y2(256+n) = y2(256-n) \end{cases}$$

At this time, the outputs y1'(n) (n=−255,−254,..., 511) and y2'(n) (n=−255,−254,..., 511) of the horizontal 1:2 interpolating circuits 164a, 164b are $$y1'(n) = \begin{cases} y1(n) & (n \text{ being an odd number}) \\ 0 & (n \text{ being an even number}) \end{cases}$$

$$y2'(n) = \begin{cases} y2(n) & (n \text{ being an odd number}) \\ 0 & (n \text{ being an even number}) \end{cases}$$

Accordingly, the output x1(n) of the horizontal LPF 165 becomes, by the formula (3);

$x1(1)=46.3, x1(2)=77.9, x1(3)=129.4, x1(4)=156.1,$
$\quad x1(5)=151.0, x1(6)=153.2, x1(7)=169.1,$
$\quad x1(8)=182.0, x1(9)=191.3,$ And, the output x2(n) of the horizontal HPF 166 becomes, by the formula (4);

$x2(1)=45.5, x2(2)=-27.4, x2(3)=-1.8,$
$\quad x2(4)=11.9, x2(5)=0.7, x2(6)=-6.0,$
$\quad x2(7)=-0.7, x2(8)=2.1, x2(9)=1.4,$ Therefore, the output X(n) of the calculating unit 167 is, when rounded off to intergers as follows;

$X(1)=0, X(2)=105, X(3)=131, X(4)=144,$
$\quad X(5)=150, X(6)=159, X(7)=170, X(8)=180,$
$\quad X(9)=190,$ Since $X(n) \neq x(n)$ in the vicinity of the end point of the image ($n=1, \ldots, 4$), the image is impossible to be correctly reproduced.

SUMMARY OF THE PRESENT INVENTION

A main object of this invention is to provide a coding apparatus and a coding method capable of compressing high efficiently data amount of a digital video signal such as a color television signal.

One object of this invention is to provide a high-efficient coding apparatus and method which can compress a digital video signal by dividing the digital video signal into a plurality of sub-bands, formatting the video signal of each sub-band into blocks per every plurality of picture elements, performing an orthogonal transform to each formatted block and coding coefficients obtained by the orthogonal transform.

An essential object of this invention is to provide a method and apparatus for coding whereby the redundancy of a digital video signal is eliminated by appropriate one-dimensional scanning when the signal, after sub-divided, is processed by a three-dimensional orthogonal transform.

Another object of this invention is to provide a method and an apparatus for coding whereby the redundancy of a digital video signal is eliminated even in the interlaced scanning form.

A further object of this invention is to provide a method and an apparatus for coding whereby an image of good quality can be obtained at the decoding side even in a flat part of an image where the quality deterioration is conspicuous.

A yet further object of this invention is to provide a method and an apparatus for coding whereby the effective reduction of data is achieved by performing weighting adapted to a frequency response on a coefficient of each sub-band block.

A still object of this invention is to provide a method and an apparatus for coding designed to suppress the quality deterioration and to reduce the coding rate.

A further object of this invention is to provide a band dividing and synthesizing method which realizes correct reproduction of an image at an end point thereof.

In one method and apparatus for coding according to this invention, a digital video signal is divided into sub-bands, every divided sub-band is processed by two or more dimensional orthogonal transform, and when the obtained coefficient is coded through one-dimensional scanning, the position of the coefficient to start the one-dimensional scanning is changed based on the strength of the power distribution by every sub-band.

In another method and apparatus for coding according to this invention, when a digital video signal is divided into sub-blocks and respective divided components are formed into block and coded, components, with which image deterioration is not so conspicuous, are coded after thinned out periodically.

In a further method and apparatus for coding according to this invention, either the odd-number field or even-number field of a digital video signal in the interlaced scanning form is allowed to pass through a vertical filter with odd number taps, while the other field is passed through a vertical filter with even number taps, thereby forming a three-dimensional block by banding the odd-number and the even-number fields in time direction.

In a further method and apparatus for coding according to this invention, when a digital video signal is divided into sub-bands, and each divided band component is processed by orthogonal transform, and the resultant coefficient is quantized and coded, the quantizing step width is determined on the bases of the value of picture elements in a high frequency block before orthogonal transform.

In a yet further method and apparatus for coding according to this invention, when a digital video signal is divided into sub-bands, and the divided band components are formed into a block for coding, it is detected whether the block is an effective image block or not on the basis of the variance of the value of picture elements, and only an effective image block is coded.

In a still further method and apparatus for coding according to this invention, a digital video signal is divided into sub-bands to form blocks, and each block is processed by orthogonal transform to obtain a coefficient which is processed by suitable weighting for each band.

In one band dividing/synthesizing method of this invention, when a signal is divided or synthesized by the use of a filter with even number taps when it is divided, filtering is performed after adding the image folded at the end point of the image, while, when it is synthesized the image folded at the end point of the image is added before passing through a low pass filter and the image folded at the end point, with each value of picture element multiplied by −1 added before passing through a high pass filter. In another band dividing/synthesizing method of this invention, when a signal is divided or synthesized by the use of filter with odd number taps, the image folded at the end point of the image with one picture element subtracted is added before filtering.

The above and further objects and features of the invention will more fully be apparent from the following detailed description with accompanying drawings.

BRIEF DESCRIPTION OF THE DRAWINGS

FIGS. 50(a)-(d) are a diagram of weighting in a weighting circuit in the apparatus of FIG. 49;

FIGS. 53(a)-(g) are a conceptual diagram for explanation of the operation of the sub-band dividing and synthesizing circuit in FIGS. 51, 52.;

FIGS. 56(a)-(g) are a conceptual diagram for explanation of the operation of the sub-band dividing and synthesizing circuit in FIGS. 54, 55.

DESCRIPTION OF THE PREFERRED EMBODIMENTS

Now, a coding apparatus of this invention will be discussed more in detail with preferred embodiments thereof.

Figure 17:
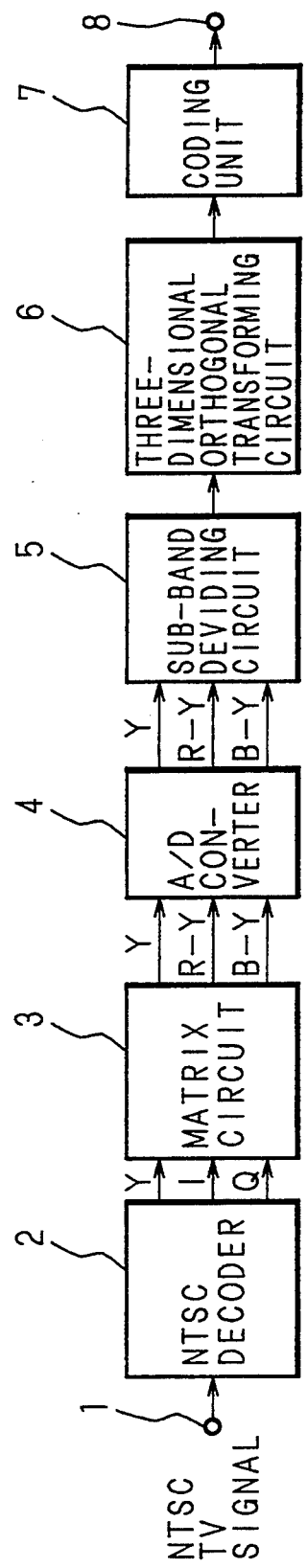
FIG. 17 is a block diagram showing the structure of a coding apparatus at the coding side according to this invention.
Figure 18:
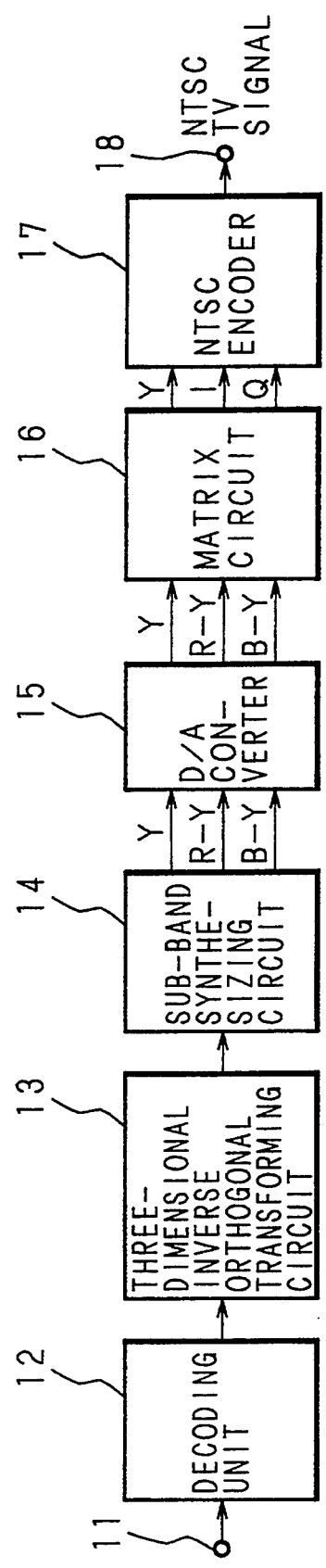
FIG. 18 is a block diagram showing the structure of a coding apparatus at the decoding side according to this invention.

FIGS. 17 and 18 are block diagrams showing an example of the general structure of a coding apparatus of this invention, specifically, FIG. 17 showing the coding side, and FIG. 18 showing the decoding side.

Referring first to FIG. 17, a color television signal in NTSC system inputted through an input terminal 1 is divided into a luminance signal (Y signal) and color signals (I,Q signals) at an NTSC decoder 1. These Y, I, Q signals are then outputted to a matrix circuit 3, and converted to a luminance signal (Y signal) and color difference signals (R-Y, B-Y signals). The matrix circuit 3 outputs the signals to an A/D converter 4. The A/D converter 4 changes the Y, R-Y, B-Y signals to digital signals, and outputs them to a sub-band dividing circuit 5. The sub-band dividing circuit 5 divides each of the signals Y, R-Y, B-Y into four sub frequency bands corresponding to the respective frequencies, thereby forming blocks by each sub-frequency band. The blocks are outputted to a three-dimensional orthogonal transforming circuit 6. The three-dimensional orthogonal transforming circuit 6 processes each block by Discrete Cosine Transform (referred to as DCT hereinafter) thereby to obtain a coefficient. The obtained coefficients are outputted to a coding unit 7. The coding unit 7 quantizes the coefficients inputted thereto and outputs the coded data through an output terminal 8.

Referring now to FIG. 18, numerals 11–18 designate composing members of the coding apparatus at the decoding side. The coded data obtained in the manner as described hereinabove is inputted to an input terminal 11. A decoder 12 connected to the input terminal 11 decodes the coded data into three-dimensional data, outputting the same to a three-dimensional inverse orthogonal transforming circuit 13. The three-dimensional inverse orthogonal transforming circuit 13 processes the three-dimensional data by inverse DCT. A sub-band synthesizing circuit 14 synthesizes the inverse-transformed data in each frequency band and returns the same to the original field images. As a result, digital Y, R-Y, B-Y signals are outputted to a D/A converter 15. The D/A converter 15 changes the signals to analog signals and outputs them to a matrix circuit 16. The matrix circuit 16 changes the analog Y, R-Y, B-Y signals into Y, I, Q signals respectively, and outputs them to an NTSC encoder 17. The NTSC encoder 17 changes the Y, I, Q, signals to an NTSC color television signal and outputs it through an output terminal 18.

Figure 19:
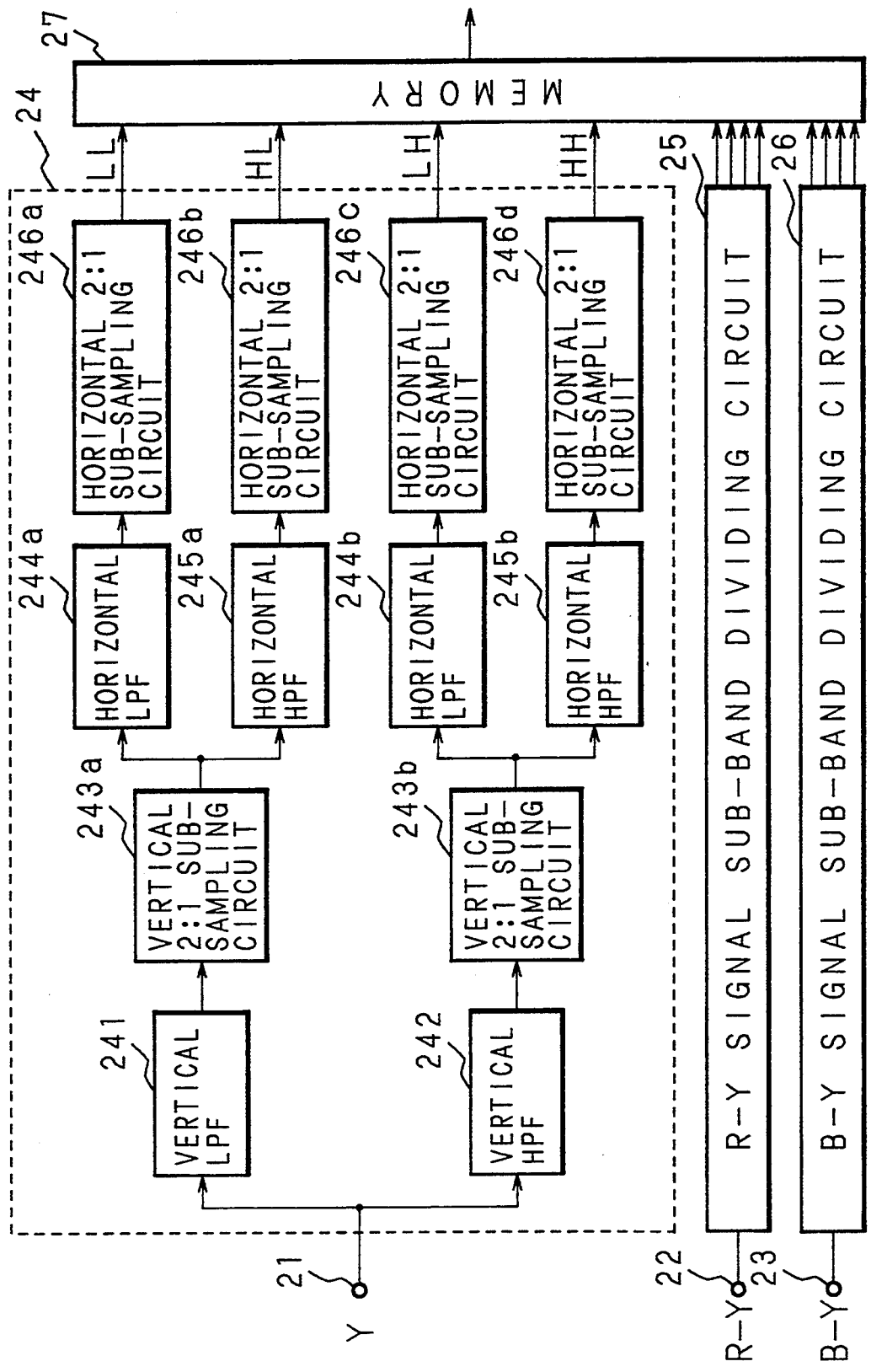
FIG. 19 is a block diagram showing the inner structure of a sub-band dividing circuit of the apparatus of FIG. 17.

The internal structure of the sub-band dividing circuit 5 will be described with reference to a block diagram of FIG. 19. Y, R-Y, B-Y signals outputted from the A/D converter 4 are inputted to respective input terminals 21, 22, 23. A Y signal sub-band dividing circuit 24, and a R-Y signal sub-band dividing circuit 25 and a B-Y signal sub-band dividing circuit 26 are connected to the input terminals 21, 22, 23 respectively. Since each of the dividing circuits 24–26 has the same internal structure, FIG. 19 illustrates the internal structure of the circuit 24 alone. Specifically, the Y signal sub-band dividing circuit 24 is comprised of a vertical low pass filter (vertical LPF) 241, a vertical high pass filter (vertical HPF) 242, vertical 2:1 sub sampling circuits 243a, 243b for sampling respective outputs from the vertical. LPF 241 and vertical HPF 242 so as to reduce the number of picture elements in a vertical direction to half, horizontal low pass filters (horizontal LPF) 244a, 244b, horizontal high pass filters (horizontal HPF) 245a, 245b, and horizontal 2:1 sub-sampling circuits 246a, 246b, 246c, 246d for sampling respective outputs from the horizontal LPF 244a, horizontal HPF 245a, horizontal LPF 244b and horizontal HPF 245b to reduce the number of picture elements in a horizontal direction to half. The three-dimensional data outputted from each circuit 24, 25, 26 is stored in a memory 27.

Figure 20:
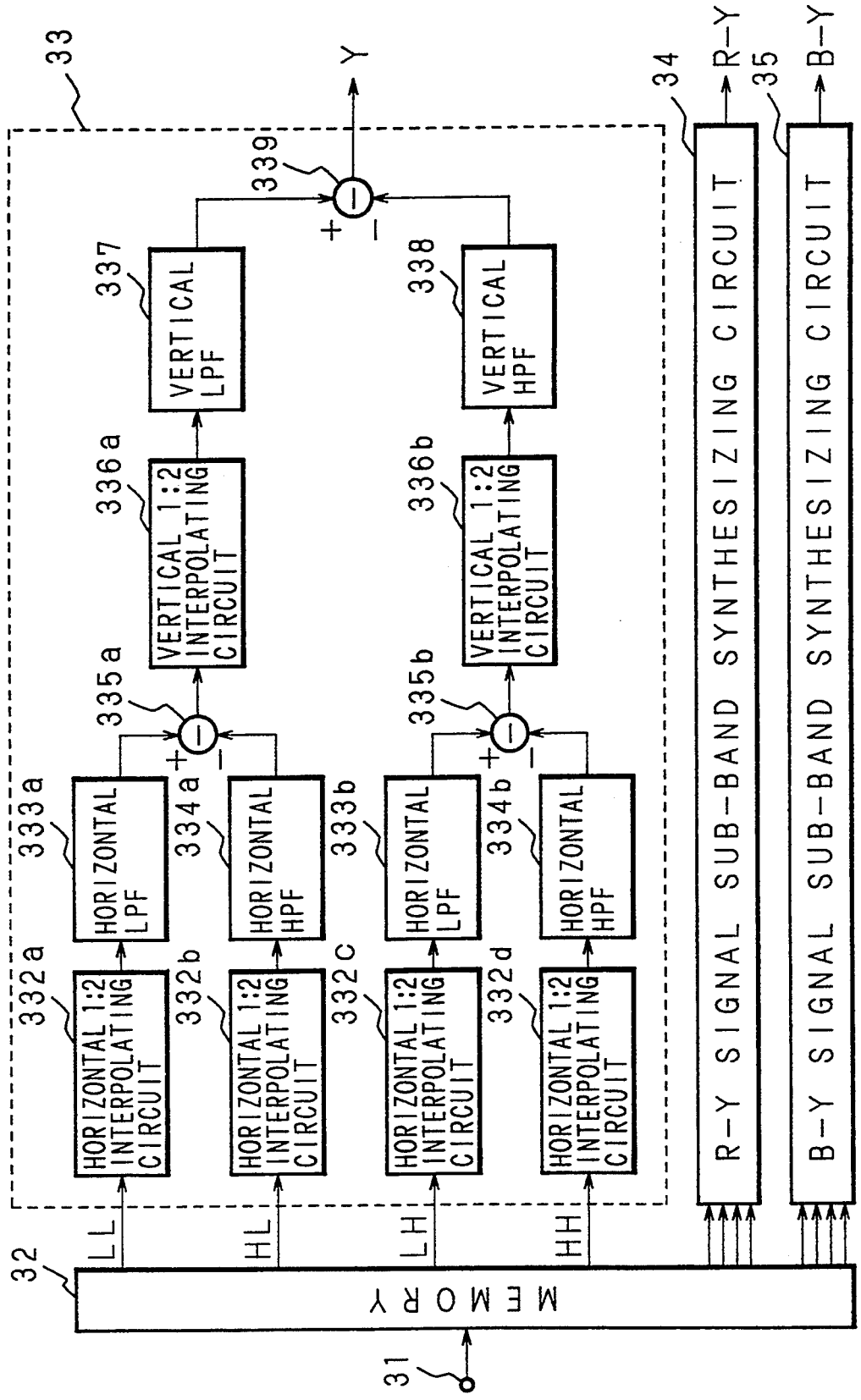
FIG. 20 is a block diagram showing the inner structure of a sub-band synthesizing circuit of the apparatus of FIG. 17.

FIG. 20 is a block diagram showing the internal structure of the sub-band synthesizing circuit 14. In FIG. 20, a memory 32 stores the three-dimensional data outputted from the three-dimensional inverse orthogonal transforming circuit 13 through an input terminal 31. The memory 32 is connected to a Y signal sub-band synthesizing circuit 33, an R-Y signal sub-band synthesizing circuit 34 and a B-Y signal sub-band synthesizing circuit 35. Since the internal structure of the sub-band synthesizing circuits 33-35 has the same internal structure, FIG. 20 shows the internal structure of the Y signal sub-band synthesizing circuit 33 alone. The Y signal sub-band synthesizing circuit 33 is composed of horizontal 1:2 interpolating circuits 332a, 332b, 332c, 332d for increasing the number of picture elements in the horizontal direction twice by interpolation of 0, horizontal LPFs 333a, 333b, horizontal HPFs 334a, 334b, subtractors 335a, 335b, vertical 1:2 interpolating circuit 336a, 336b for increasing the number of picture elements in the vertical direction twice by interpolation of 0, a vertical LPF 337, a vertical HPF 338 and a subtractor 339. The synthesizing circuits 33, 34, 35 output the Y-signal, R-Y signal, B-Y signal respectively to the D/A converter 15.

The coding apparatus of this invention operates in the following manner. In general, for compression of a video signal, it is often practiced to process a luminance signal and a color signal independently. Therefore, an NTSC color television signal inputted through the input terminal 1 is separated at the NTSC decoder 2 to Y signal and I,Q signals, and further converted at the matrix circuit 3 to Y signal and R-Y, B-Y signals. Thereafter, the Y signal and R-Y, B-Y signals are converted to digital signals at the A/D converter 4. A sampling frequency is 13.5 MHz for Y signal, and 6.75 MHz for R-Y and B-Y signals. Therefore, the effective number of samples from one horizontal line of the NTSC color television signal is, for example, 704 for Y signal and 352 for each of the R-Y and B-Y signals. One field consists of 262.5 horizontal lines. Among the 262.5 horizontal lines, e.g., 240 lines constituting one field are outputted as effective lines. In the sub-band dividing circuit 5, each field of Y, R-Y, B-Y signals is divided into a plurality of frequency bands respectively for example, Y signal is divided into four frequency bands LL, HL, LH, HH as in FIG. 21, and R-Y, B-Y signals are respectively divided into four frequency bands LL, HL, LH, HH as in FIG. 22.

Figure 23:
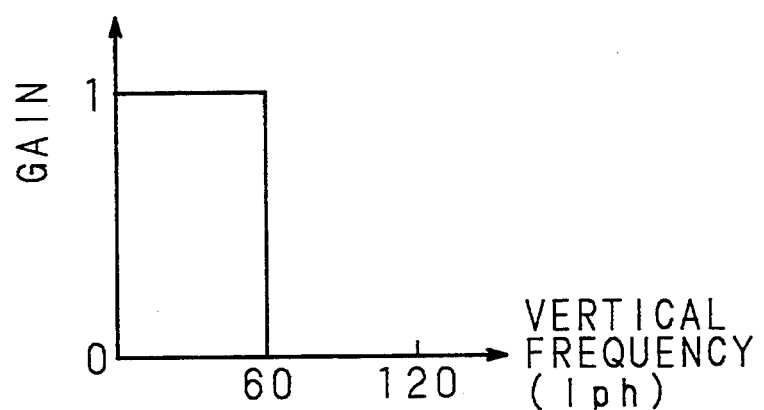
FIG. 23 is a frequency response diagram of a vertical LPF in the coding apparatus of this invention.
Figure 25:
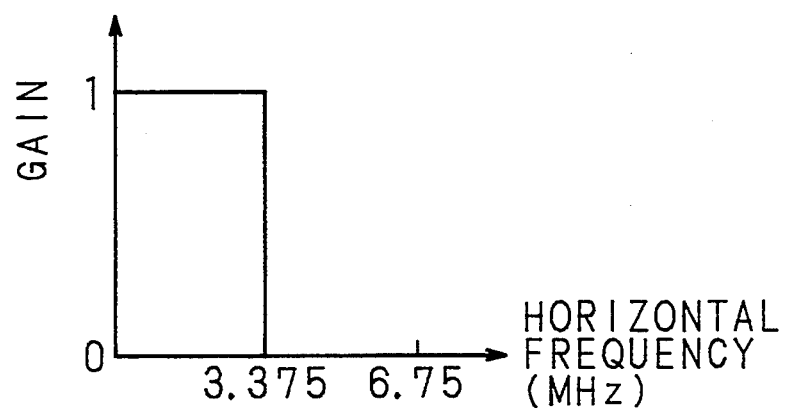
FIG. 25 is a frequency response diagram of a horizontal LPF in the coding apparatus of this invention.
Figure 26:
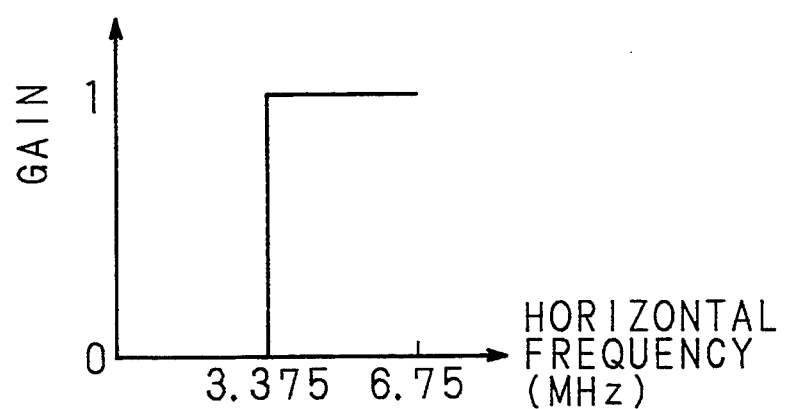
FIG. 26 is a frequency response diagram of a horizontal LPF in the coding apparatus of this invention.
Figure 27A:
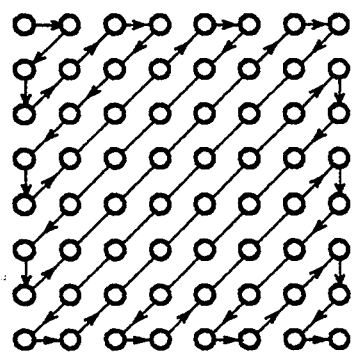
FIGS. 27(a)-(d) are a diagram of the one-dimensional scanning according to this invention.
Figure 27B:
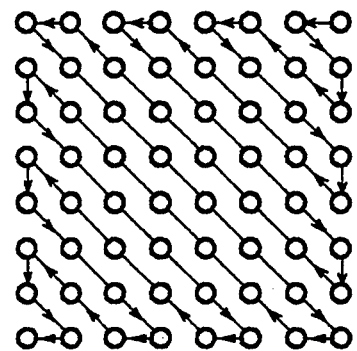
Figure 27C:
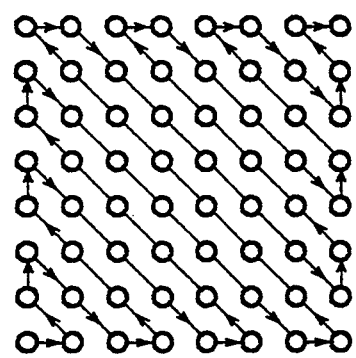
Figure 27D:
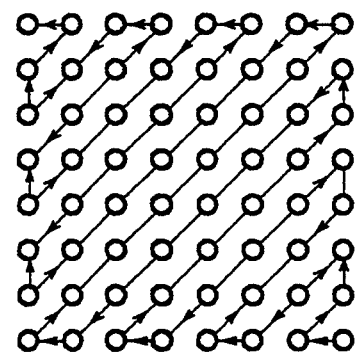

The operation of the sub-band dividing circuit 5 will be described with reference to FIG. 19. Y signal inputted from the input terminal 21 is divided into four frequency bands at the Y signal sub-band dividing circuit 24. The inputted Y signal is band-restricted at the vertical LPF 241 having a frequency response as shown in FIG. 23, and then, the signal is thinned out by the vertical 2:1 sub-sampling circuit 243a so that the number of picture elements in the vertical direction is reduced to half. An output of the vertical 2:1 sub-sampling circuit 243a passes through the horizontal LPF 244a having a frequency response shown in FIG. 25, so that the number of picture elements in the horizontal direction is reduced to half. The output of this horizontal 2:1 sub-sampling circuit 246a is a signal in the LL band of FIG. 21, with the number of picture elements reduced to ¼ as compared with the inputted signal. This signal is called as an LL band of Y signal. Meanwhile, the output of the vertical 2:1 sub-sampling circuit 243a is inputted also to the horizontal HPF 245a having a frequency response shown in FIG. 26, and further to the horizontal 2:1 sub-sampling circuit 246b, so that the number of picture elements in the horizontal direction is reduced to half. The output of the horizontal sub-sampling circuit 246b is a signal in the HL band in FIG. 21, with the number of picture elements reduced to ¼ as compared with the input signal. This signal is called as an HL band of Y signal.

Figure 24:
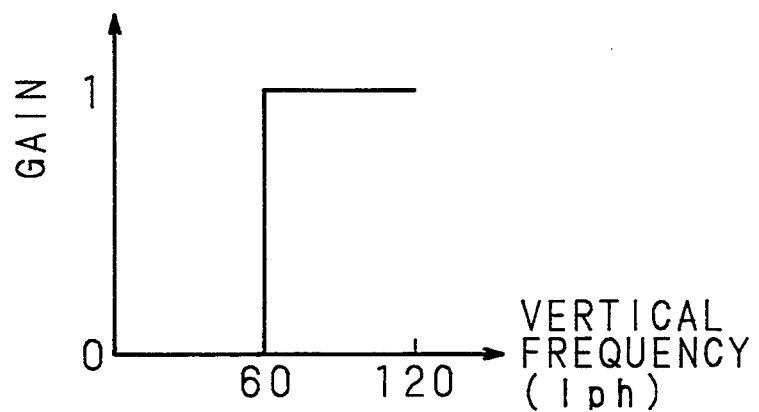
FIG. 24 is a frequency response diagram of a vertical HPF in the coding apparatus of this inventions.

In the meantime, Y signal inputted through the input terminal 21 is similarly inputted to the vertical HPF 242 having a frequency response shown in FIG. 24. The output of the vertical HPF 242 is downsampled at the vertical 2:1 sub-sampling circuit 243b so that the number of picture elements in the vertical direction is reduced to half. The output of the vertical sub sampling circuit 243b is band restricted at the horizontal LPF 244b having a frequency response shown in FIG. 25, and downsampled at the horizontal 2:1 sub-sampling circuit 248c to reduce the number of picture elements in the horizontal direction to half. The output of the horizontal 2:1 sub-sampling circuit 246c is a signal in the LH band in FIG. 21, with the number of picture elements reduced to ¼ as compared with the inputted signal. The signal is called as an LH band of Y signal. On the other hand, the output of the vertical 2:1 sub-sampling circuit 243b is inputted to the horizontal HPF 245b having a frequency response shown in FIG. 26 and downsampled out at the horizontal 2:1 sub- sampling circuit 246d to reduce the number of picture elements to half. The output of this horizontal 2:1 sub-sampling circuit 246d is a signal in the HH band of FIG. 21, with the number of picture elements reduced to ¼ as compared with the inputted signal. The obtained signal is called as an HH band of Y signal.

As mentioned above, Y signal is divided into four LL, HL, LH, HH bands at the Y signal sub-band dividing circuit 24, and each sub-band component is outputted to the memory.

Figure 22:
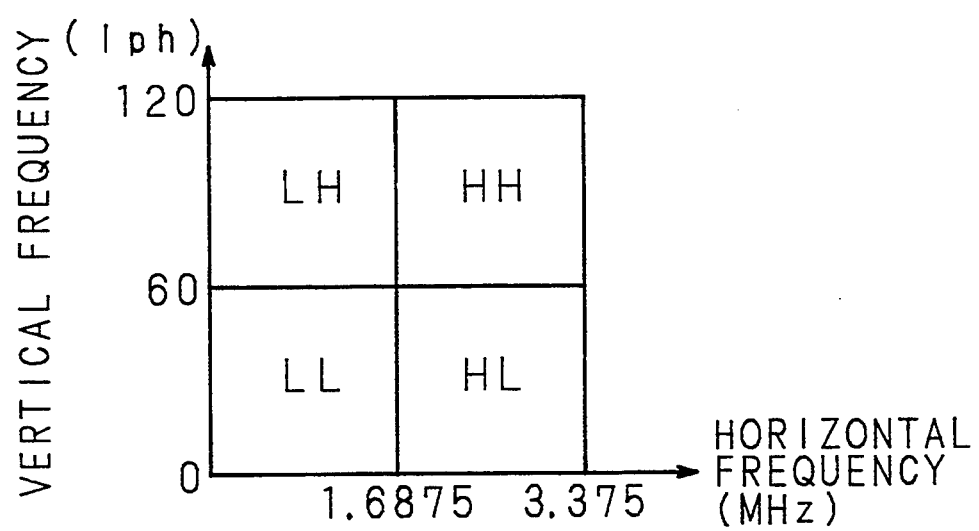
FIG. 22 is a diagram of sub-band dividing of an R-Y signal and a B-Y signal according to this invention.

R-Y signal inputted through the input terminal 22 is divided into four bands, namely LL, HL, LH, HH bands as shown in FIG. 22 at the R-Y signal sub-band dividing circuit 25. Likewise, B-Y signal inputted through the input terminal 23 is divided into four bands, namely LL, HL, LH, HH bands as shown in FIG. 22 at the B-Y signal sub-band dividing circuit 26. The R-Y signal sub-band dividing circuit 25 and B-Y signal sub-band dividing circuit 26 operate in the same manner as the Y signal sub-band dividing circuit 24.

LL band, HL band, LH band, HH band of Y signal outputted from the Y signal sub-band dividing circuit 24, LL band, HL band, LH band, HH band of R-Y signal outputted from the R-Y signal sub-band dividing circuit 25, and LL band, HL band, LH band, HH band of B-Y signal outputted from the B-Y signal sub-band dividing circuit 26 are all inputted to the memory 27, where the bands of 8 fields are stored. Before the bands of next 8 fields are stored in the memory 28, the memory 27 forms each band into a three-dimensional block composed of a plurality of adjacent picture elements and outputs each block. For example, adjacent 8 lines with 8 picture elements per line are combined, thereby forming a two-dimensional block, and the consecutive 8 fields of the adjacent two-dimensional blocks are combined, thereby forming a three-dimensional block of 8 picture elements $\times$ 8 lines $\times$ 8 fields. Y, R-Y, B-Y signals formed in three-dimension are outputted from the memory 27 in the order from LL, HL, LH to HH bands.

Each block outputted from the sub-band dividing circuit 5 is processed by three-dimensional DCT at the three-dimensional orthogonal transforming circuit 6.

The coefficients obtained at the three-dimensional orthogonal transforming circuit 6 are quantized and scanned in one dimension at the coding unit 7, and to each non-zero value, the value itself and the length of the sequence of zero value to the non-zero value are variable-length-coded by the use of Huffman code or the like, and outputted from the output terminal 8. Each variable-length-coding table of each sub-band can be different from each other or can be same.

After each of the four sub-band blocks of Y signal of a natural moving picture (one sub-band block being formed of 8 picture elements×8 lines×8 fields) is processed by three-dimensional DCT, it is quantized in 10 bits and a square root (RMS) of the average of squares of the coefficients d (i.j.k) is obtained. With reference to this RMS, the difference at the starting position of the one-dimensional scanning in each sub-band block will be discussed hereinbelow.

RMS of the coefficients in the LL band of Y signal are shown in Tables 2 and 3 below.

As is clear by Tables 2 and 3, power distribution is concentrated around (i,j)=(0,0) in the two-dimensional plane in the LL band. Therefore, it is suitable in the LL band to scan in one dimension from a coefficient with a lower sequence both in the horizontal and in the vertical directions to a coefficient with a higher sequence as indicated in FIG. 27 (a). In a three-dimensional block, scanning in the two-dimensional block as above is respected 8 times.

Tables 4 and 5 below show RMS of coefficients in the HL band of Y signal.

Figure 28:
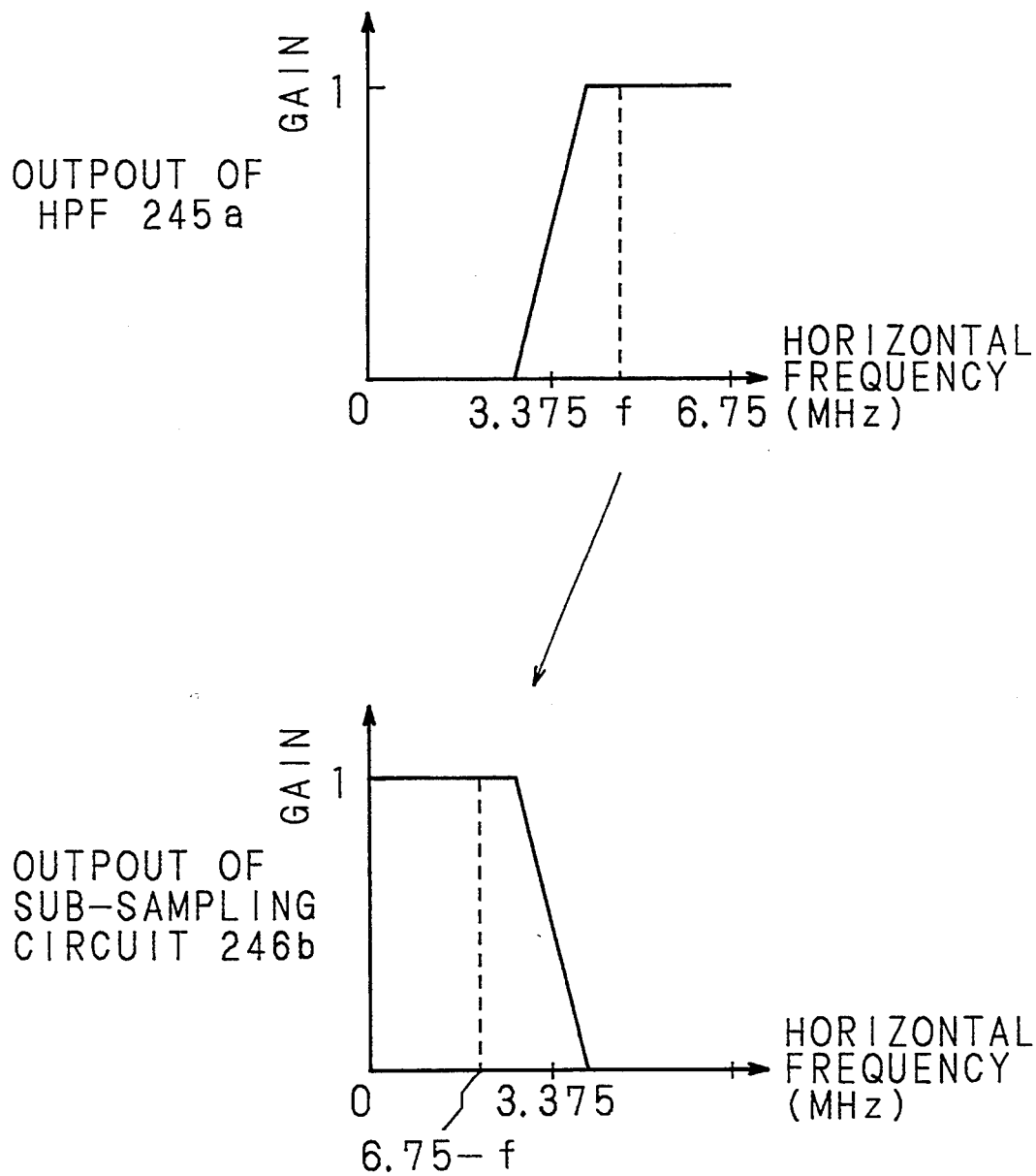
FIG. 28 is a diagram explanatory of folding of frequency in the horizontal HPF of the coding apparatus of this invention.

As is clear by Table 4 and 5, power distribution is concentrated around (i,j)=(7,0) in a block within the two-dimensional plane in the HL band. The reason for this is that the signal is sampled at the ratio 2:1 after passing through the horizontal HPF 245a having the frequency response shown in FIG. 26. As is illustrated in FIG. 28, the HL band is a signal folded in the horizontal direction, e.g., a 6.75 MHz signal becomes 0 MHz. Consequently although the power distribution is naturally concentrated at a lower sequence of coefficients after DCT, it is concentrated at a higher sequence only in the horizontal direction since the signal is folded in the horizontal direction. Accordingly, it is suitable in the HL band to scan in the one dimension from a coefficient at the upper right being a higher sequence in the horizontal direction and a lower sequence in the vertical direction to coefficient at the lower left as in FIG. 27(b).

Tables 6 and 7 below show RMS of coefficients in the LH band of Y signal.

As is clear by Table 6 and 7, power distribution is concentrated around (i,j)=(0,7), in the two dimensional plan in the LH band, since the LH band is a signal folded in the vertical direction. Therefore, it is suitable in the LH band to scan in the one dimension from a coefficient at the lower left being a lower sequence in the horizontal direction and a higher sequence in the vertical direction, to coefficient at the upper right, as in FIG. 27(c).

RMS of coefficients in the HH band of Y signal are also shown in Tables 8 and 9 below.

As is clear by Tables 8 and 9 above, power distribution is concentrated around (i,j)=(7,7) in the two-dimensional plane in the HH band. Therefore, it is appropriate in the HH band to scan in the one dimension, from a coefficient of a higher sequence both in the horizontal and in the vertical directions to a coefficient of lower sequence in both directions as showin in FIG. 27(d).

Now, the operation at the decoding side will be discussed hereinbelow.

Data is processed from the input terminal 11 to the output terminal 18 at the decoding side totally in an inverse direction to that of the coding side. In other words, the data inputted through the input terminal 11 is decoded to the original three-dimensional data at the decoder 12 and processed by inverse DCT at the three-dimensional inverse orthogonal transforming circuit 13. The four sub-bands of the three-dimensional block obtained in the circuit 13 are combined at the sub-band synthesizing circuit 14. The circuit 14 outputs one field by one field.

The sub-band synthesizing circuit 14 operates completely in an inverse direction to the sub-band dividing circuit 5. More specifically, the three-dimensional block inputted through the input terminal 31 is stored in the memory 32 by 8 fields. The memory 32 inputs the LL, HL, LH, HH bands of Y signal to the Y signal sub-band synthesizing circuit 33, LL, HL, LH, HH bands of R-Y signal to the R-Y signal sub-band synthesizing circuit 34 and LL, HL, LH, HH bands of B-Y signal to the B-Y signal sub-band synthesizing circuit 35 respectively by each field before the next 8 fields are stored therein.

The operation of the above-mentioned Y signal sub-band synthesizing circuit 33 is as follows. The LL band of Y signal outputted from the memory 32 is interpolated with 0 at the horizontal 1:2 interpolating circuit 332a, so that the number of picture elements in the horizontal direction is increased twice, then is inputted to the horizontal LPF 333a with a frequency response shown in FIG. 25. Moreover, the HL band of Y signal outputted from the memory 32 is, after being interpolated with 0 at the horizontal 1:2 interpolating circuit 332b, inputted to the horizontal HPF 334a with a frequency response shown in FIG. 26. The subtractor 335a subtracts the output of the horizontal HPF 334a from the output of the horizontal LPF 333a. The output of the subtractor 335a is interpolated with 0 at the vertical 1:2 interpolating circuit 336a, thereby increasing the number of picture elements in the vertical direction twice, and then is inputted to the vertical LPF 337 with a frequency response shown in FIG. 23. Meanwhile the LH band of Y signal outputted from the memory 32 is interpolated with 0 at the horizontal 1:2 interpolating circuit 332c, and accordingly the number of picture elements in the horizontal direction is increased twice, and then is inputted to the horizontal LPF 333b with a frequency response shown in FIG. 25. Similarly, the HH band of Y signal ouotputted from the memory 32 is interpolated with 0 at the horizontal 1:2 interpolating circuit 332d, then inputted to the horizontal HPF 334b with a frequency response shown in FIG. 26. The subtractor 335b subtracts the output of the horizontal HPF 334b from the output of the horizontal LPF 333b. The output of the subtractor 335b is interpolated with 0 at the vertical 1:2 interpolating circuit 336b, so that the number of picture elements in the vertical direction is increased twice, and then is inputted to the vertical HPF 338 with a frequency response shown in FIG. 24. The subtractor 339 subtracts the output of the vertical HPF 338 from the output of the vertical LPF 337, and outputs the result. It is to be noted here that the R-Y signal sub-band synthesizing circuits 34 and B-Y signal sub-band synthesizing circuit 35 operate in the same manner as the above-described Y signal sub-band synthesizing circuit 33.

In the manner as above, Y, R-Y, B-Y signals outputted from the sub-band synthesizing circuit 14 are converted to analog signals at the D/A converter 18 and further converted to Y, I, Q signals at the matrix circuit 16. Then the signals are encoded at the NTSC encoder 17 to an NTSC color television signal and outputted from the output terminal 18.

Figure 29A:
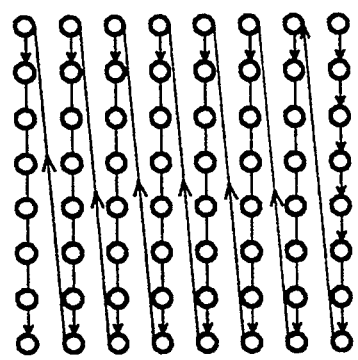
FIGS. 29(a)-(b) are a diagram of the other one-dimensional scanning according to this invention.
Figure 29B:
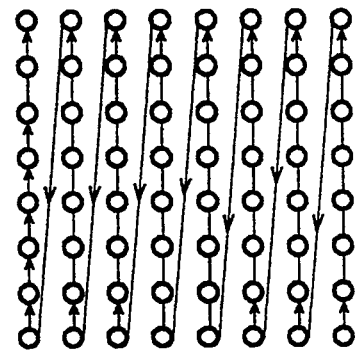

In the aforementioned embodiment, a so-called zig-zag scan is performed as illustrated in FIG. 27. It is particularly important that the one-dimensional scan at the coding unit 7 is to be stored from a coefficient of a lower sequence both in the horizontal and in the vertical directions in the LL band, from a coefficient of a higher sequence in the horizontal direction and a lower sequence in the vertical direction in the HL band, from a coefficient of a lower sequence in the horizontal direction and a higher sequence in the vertical direction in the LH band and from a coefficient of a higher sequence both in the horizontal and vertical directions in the HH band. Therefore, for example, it is possible to scan in the one dimension in the vertical direction as shown in FIGS. 29(a) for the HL band, and 29(b) for the HH band.

Figure 1:
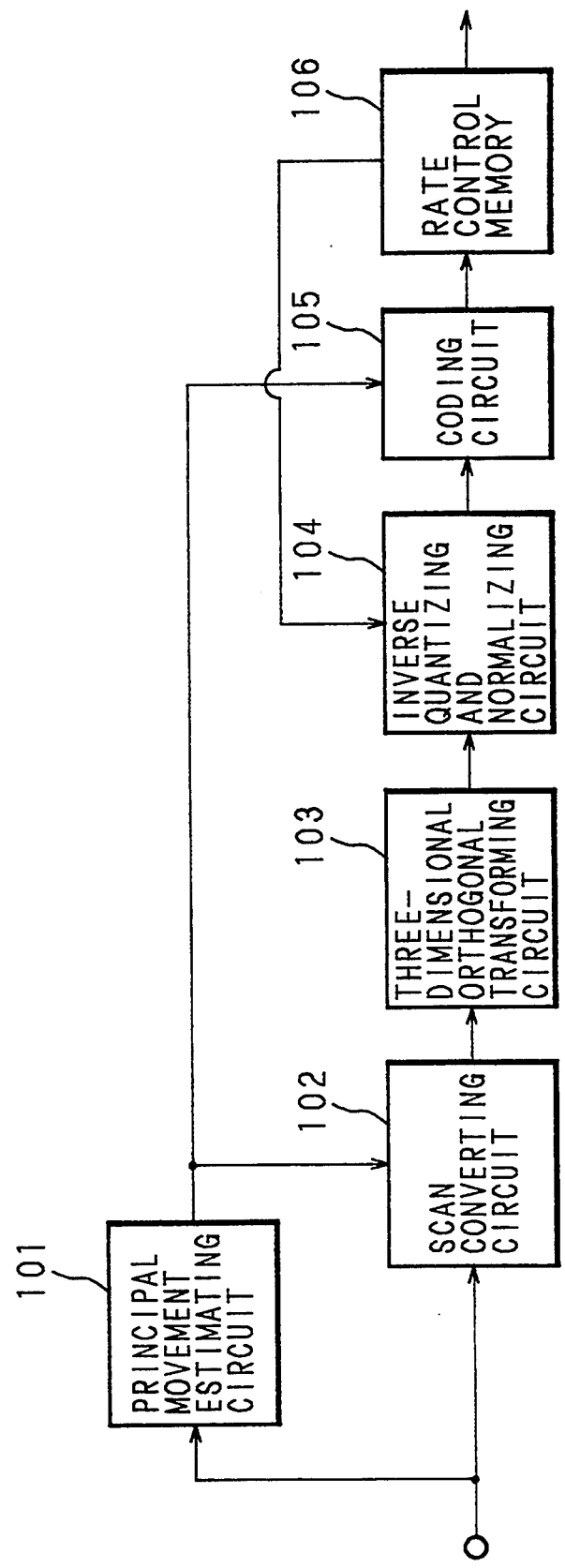
FIG. 1 is a block diagram showing the structure of a conventional digital video signal coding apparatus.
Figure 2:
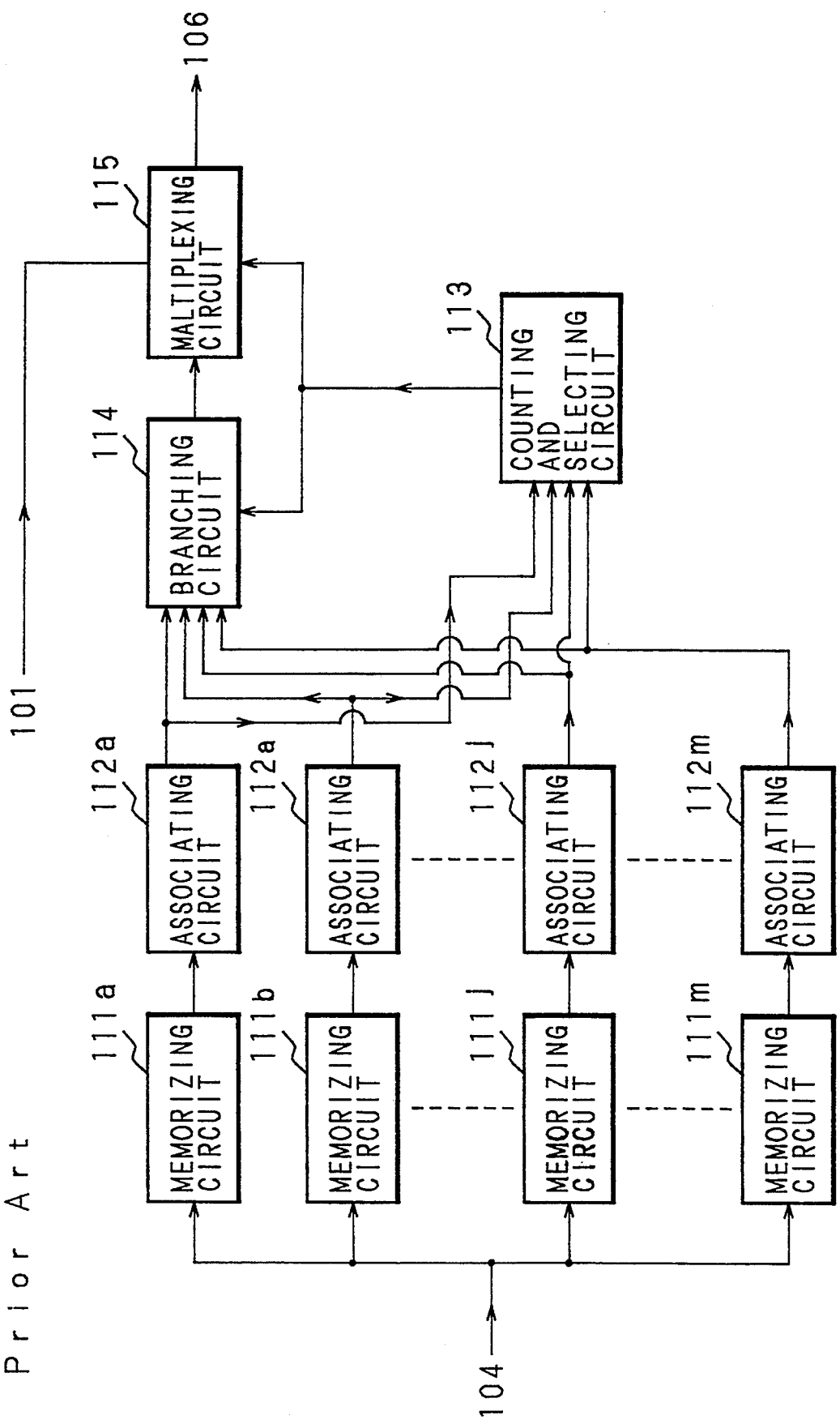
FIG. 2 is a block diagram showing the inner structure of coding circuit of the apparatus in FIG. 1.
Figure 3A:
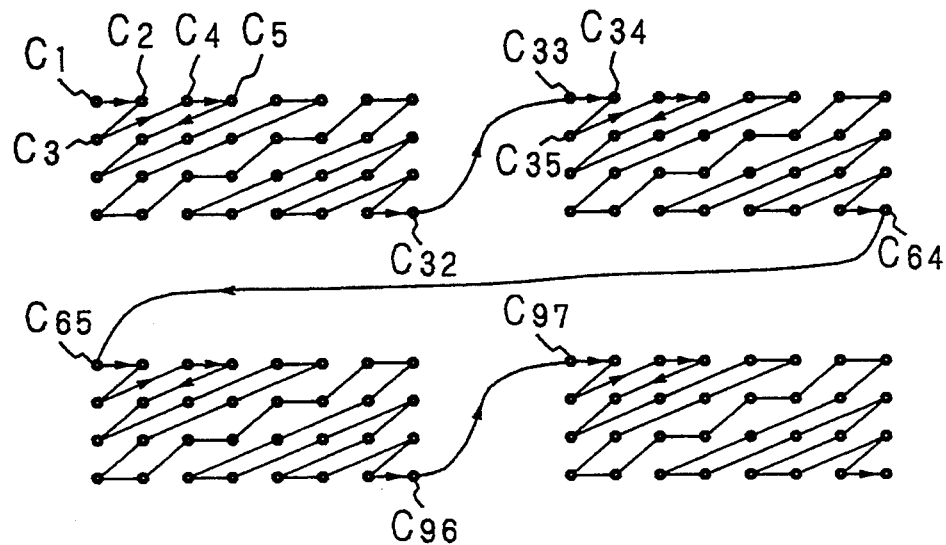
FIGS. 3(a)-(b) are a conceptual diagram explanatory of the scanning in the coding circuit of FIG. 2.
Figure 3B:
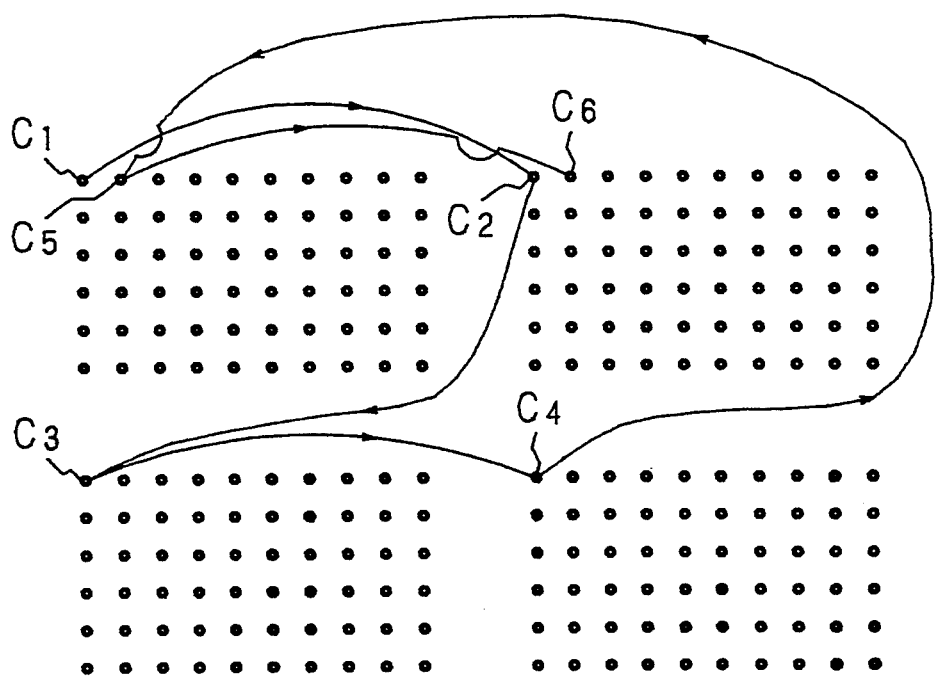
Figure 4:
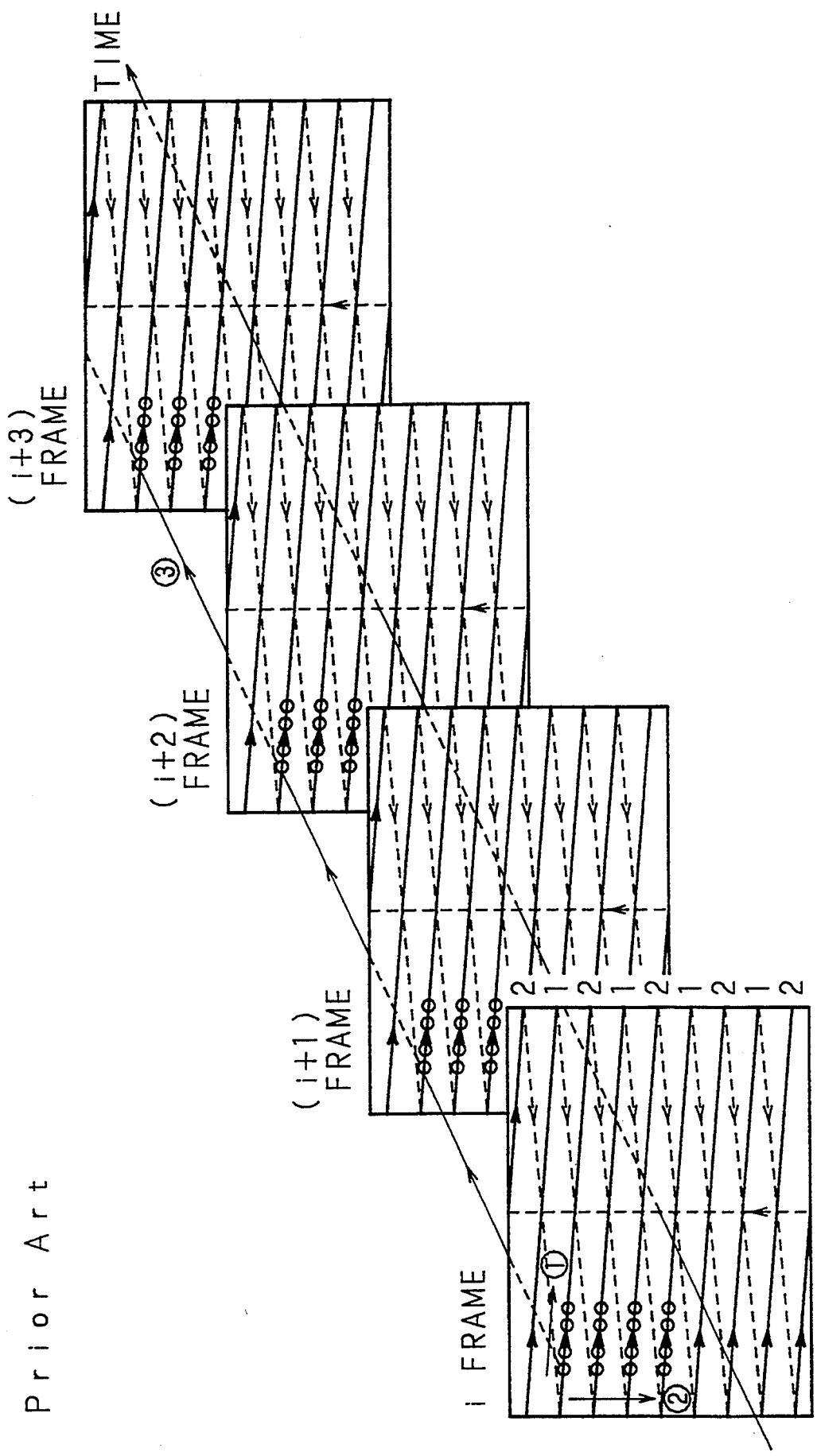
FIG. 4 is a conceptual diagram explanatory of a conventional three-dimensional block in the sequential scanning system.
Figure 5:
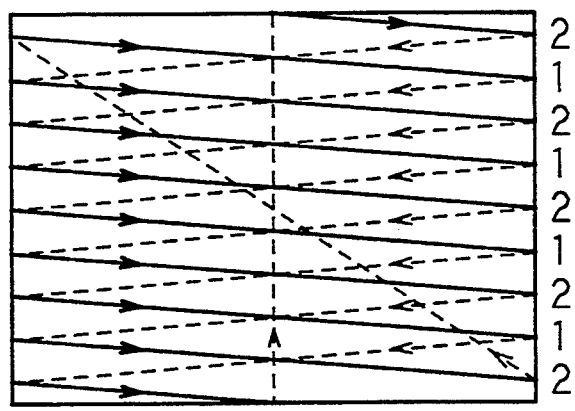
FIG. 5 is a diagram showing the principle of the interlaced scanning system of a television screen.
Figure 6:
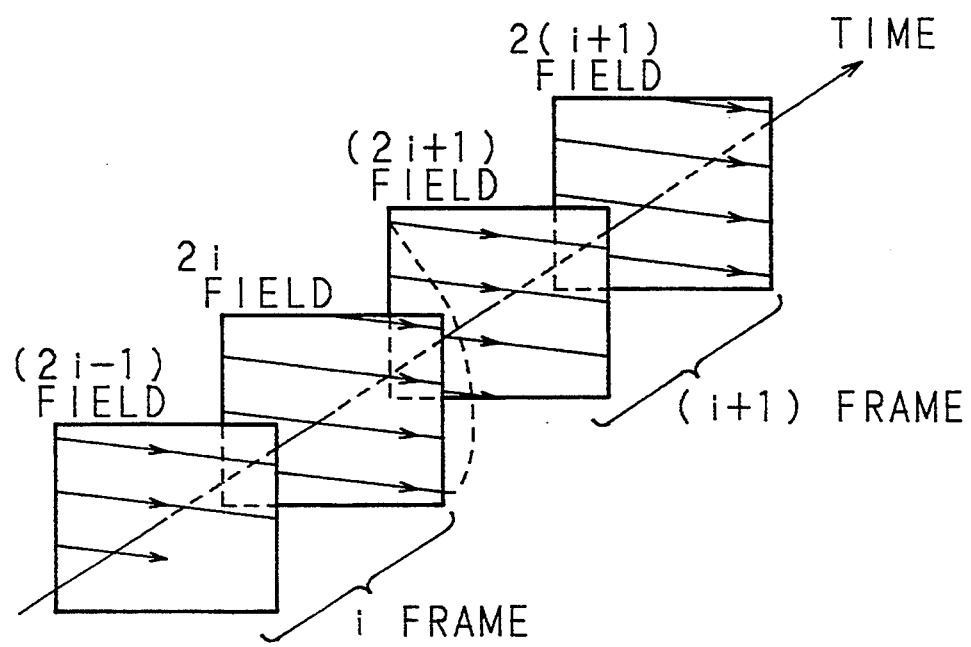
FIG. 6 is a conceptual diagram showing the relationship between a field and a frame in a standard television signal.
Figure 7:
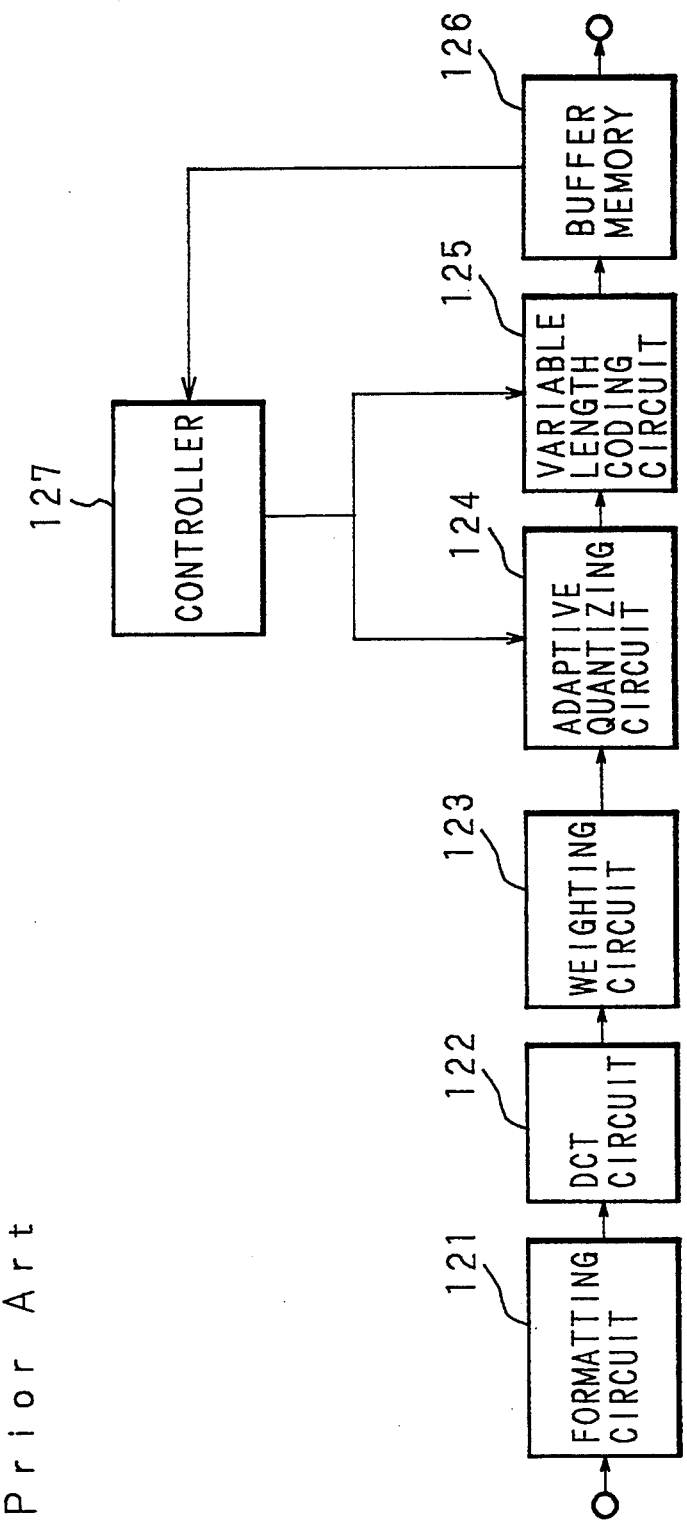
FIG. 7 is a block diagram showing the structure of a conventional coding apparatus.
Figure 8:
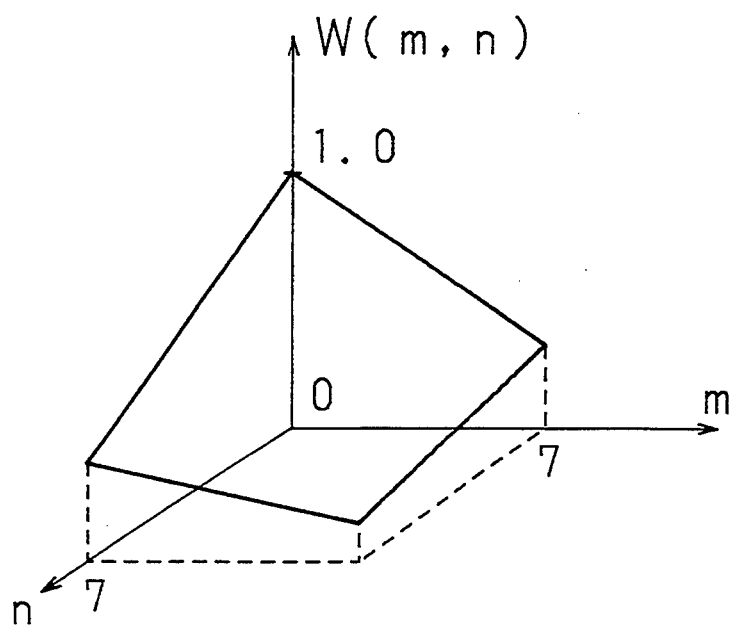
FIG. 8 is a diagram explanatory of weighting in a weighting circuit of a conventional coding apparatus.
Figure 9:
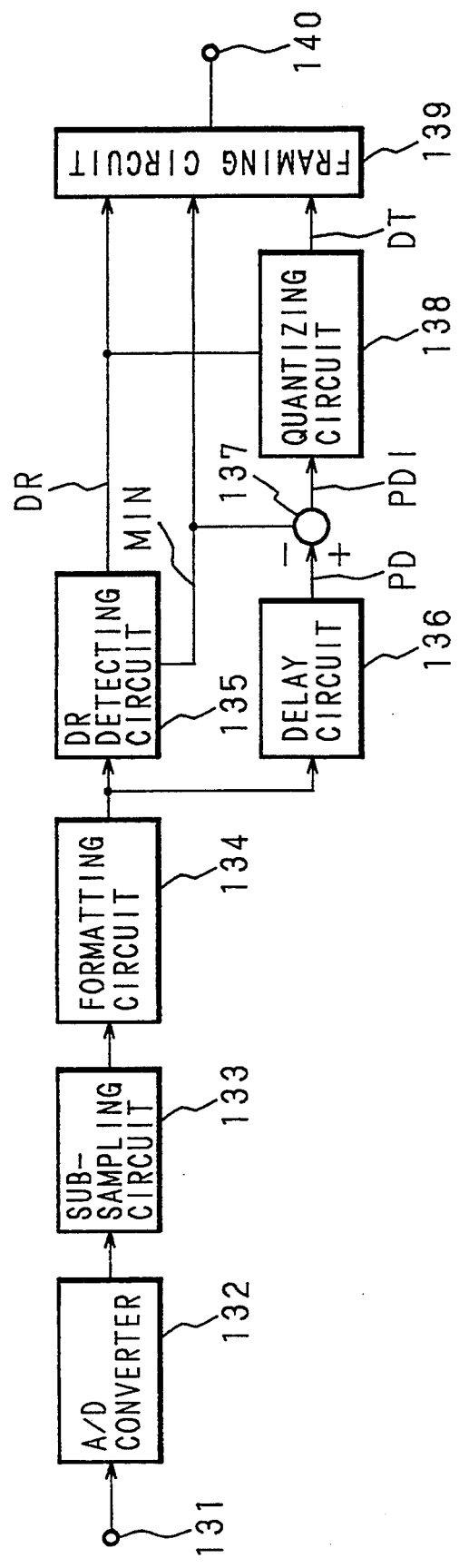
FIG. 9 is a block diagram showing the structure of a conventional coding apparatus at the transmission side.
Figure 10:
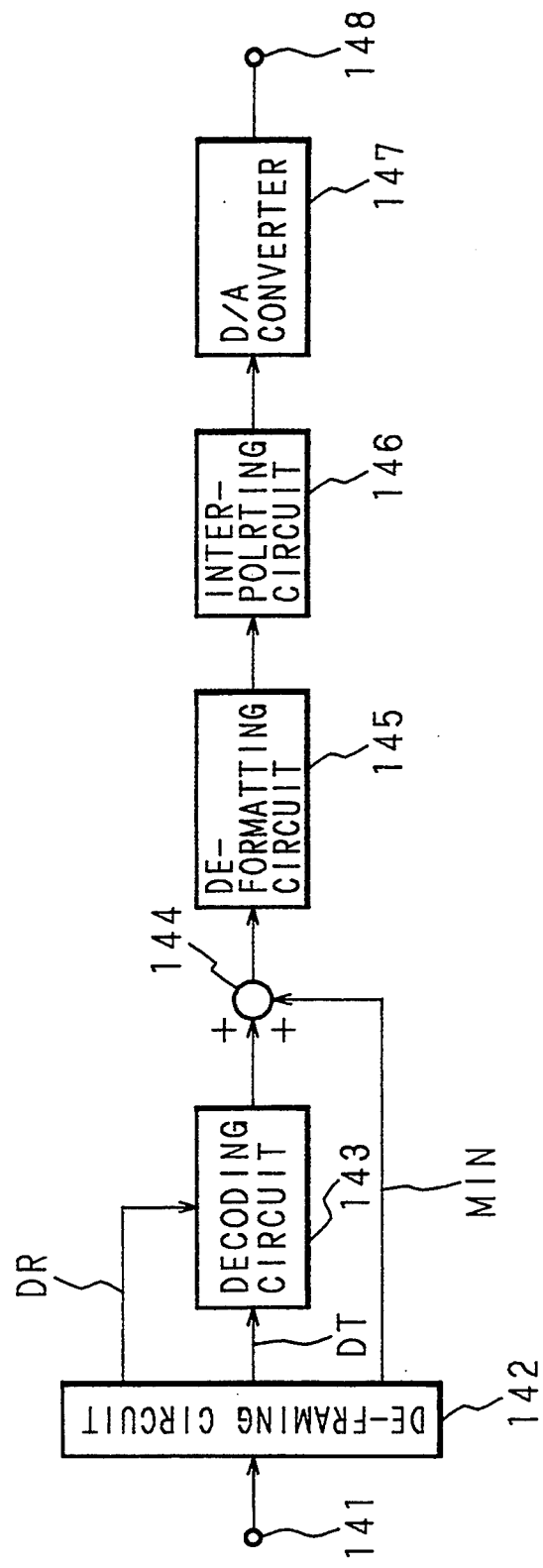
FIG. 10 is a block diagram showing the structure of a conventional coding apparatus at the receiver side.
Figure 11:
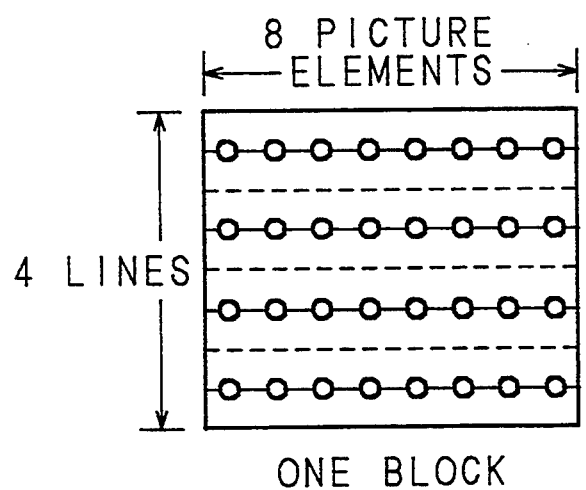
FIG. 11 is a diagram of an example of sampling in a conventional coding apparatus.
Figure 12:
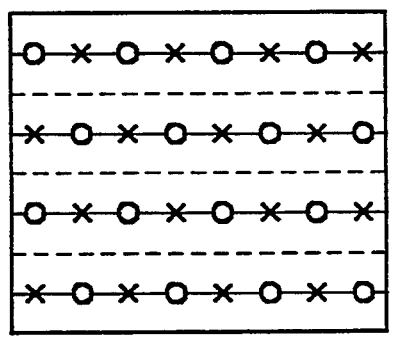
FIG. 12 is a diagram of an example of sub-sampling in a conventional coding apparatus.
Figure 13:
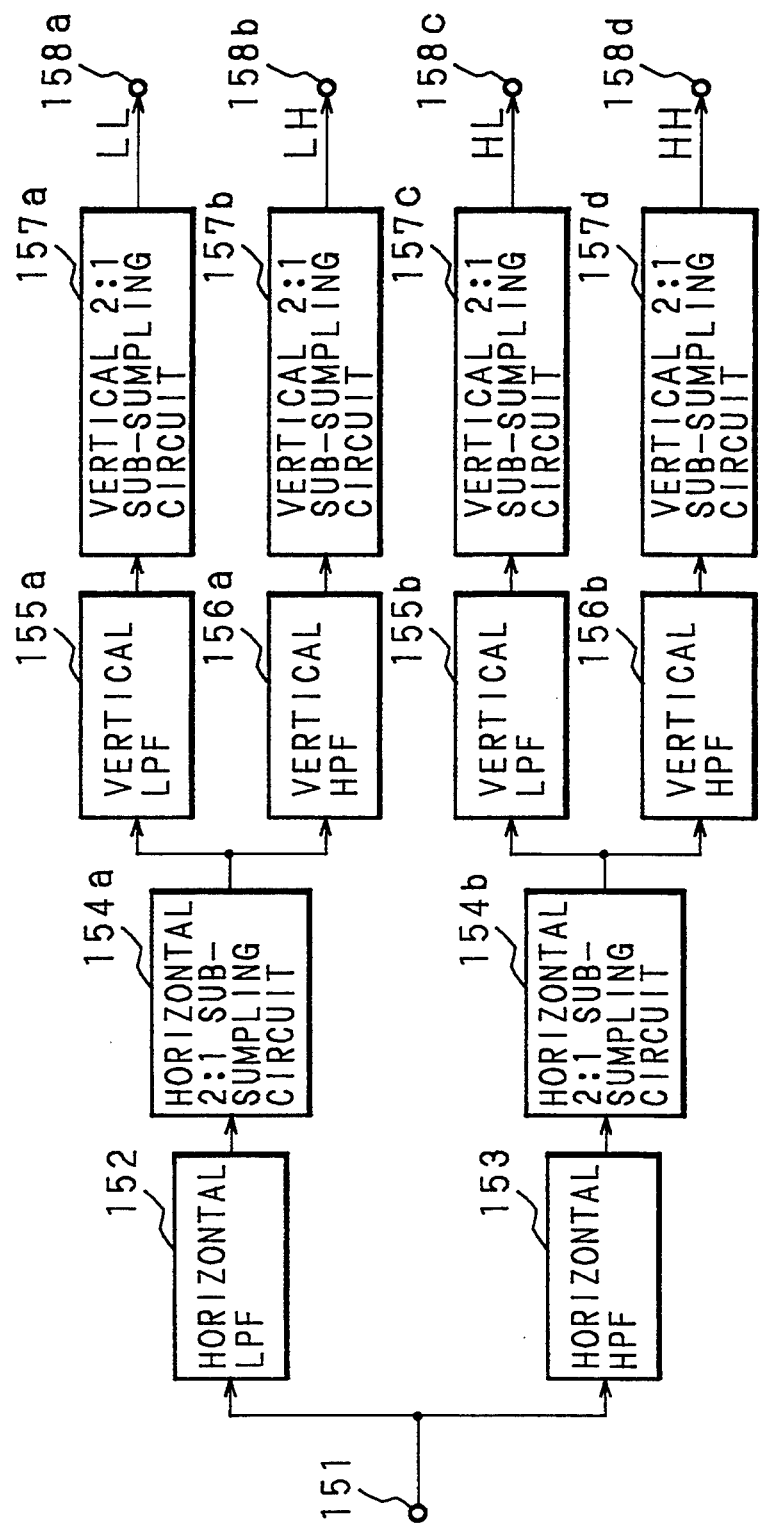
FIG. 13 is a block-diagram showing the structure of a conventional sub-band dividing circuit.
Figure 14:
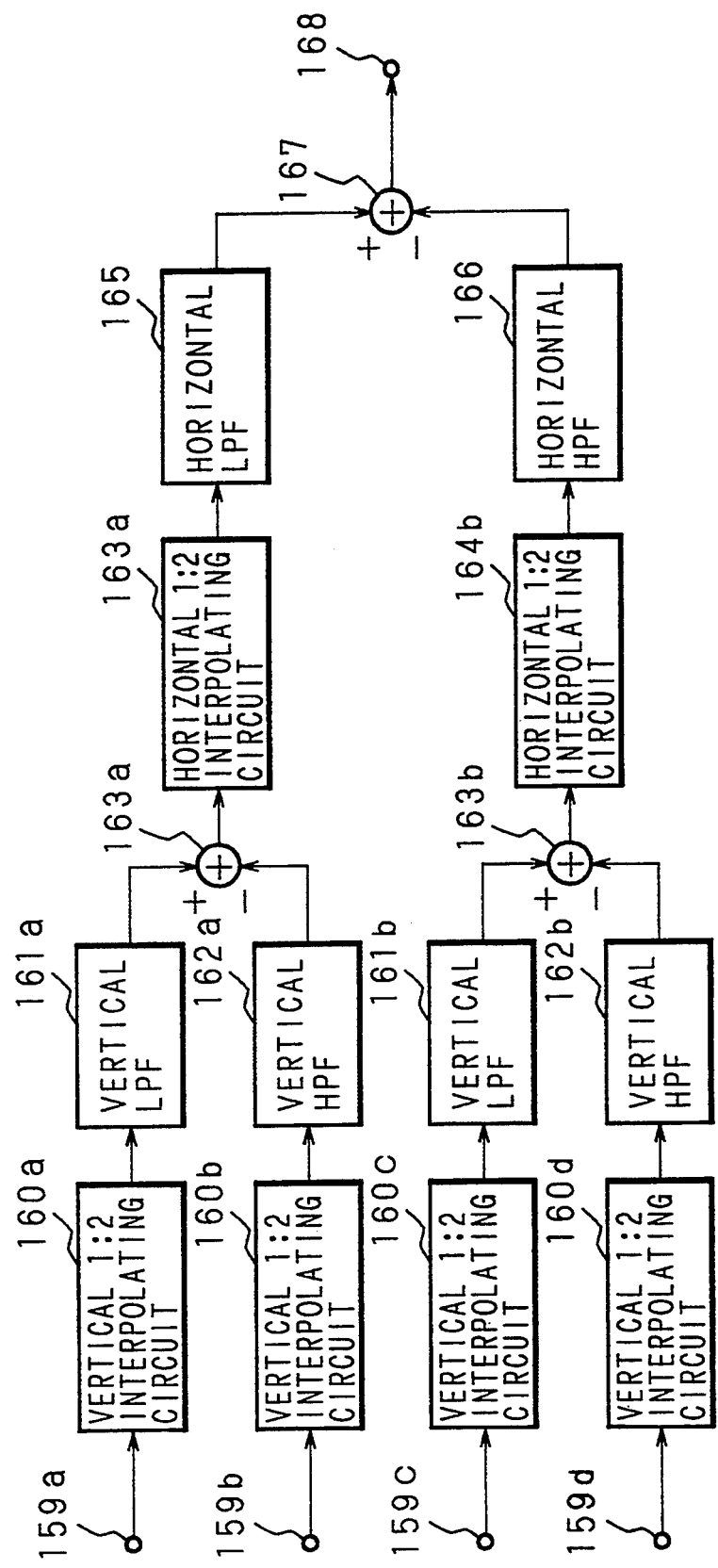
FIG. 14 is a block diagram showing the structure of a conventional sub-band synthesizing circuit.
Figure 15:
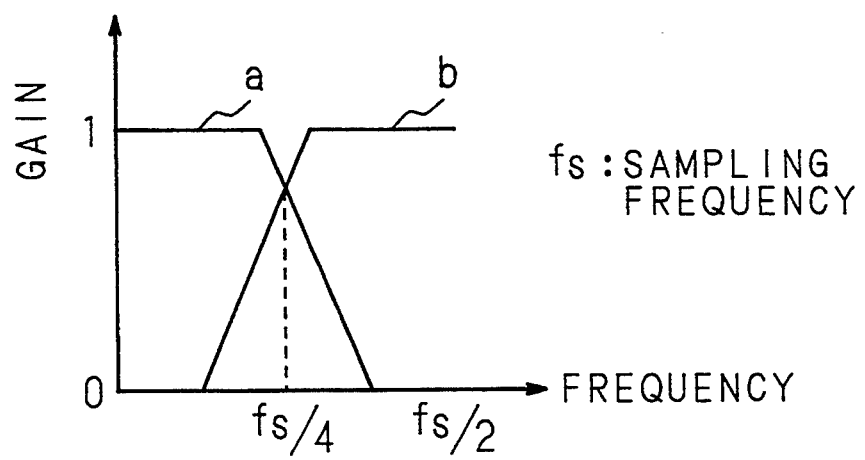
FIG. 15 is a frequency response diagram of a filter employed in FIGS. 13, 14.
Figure 16:
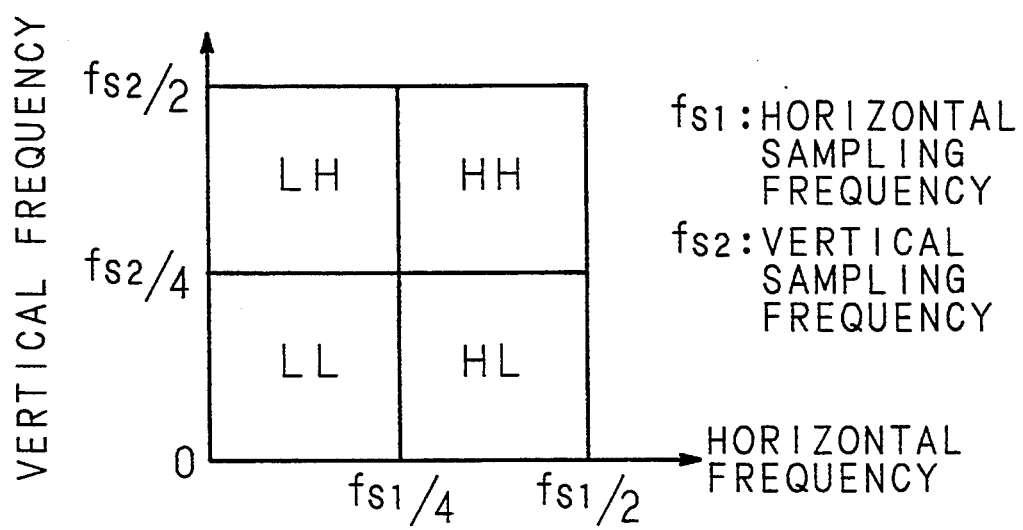
FIG. 16 is a conceptual diagram of band dividing in the sub-band dividing circuit of FIG. 13.
Figure 30A:
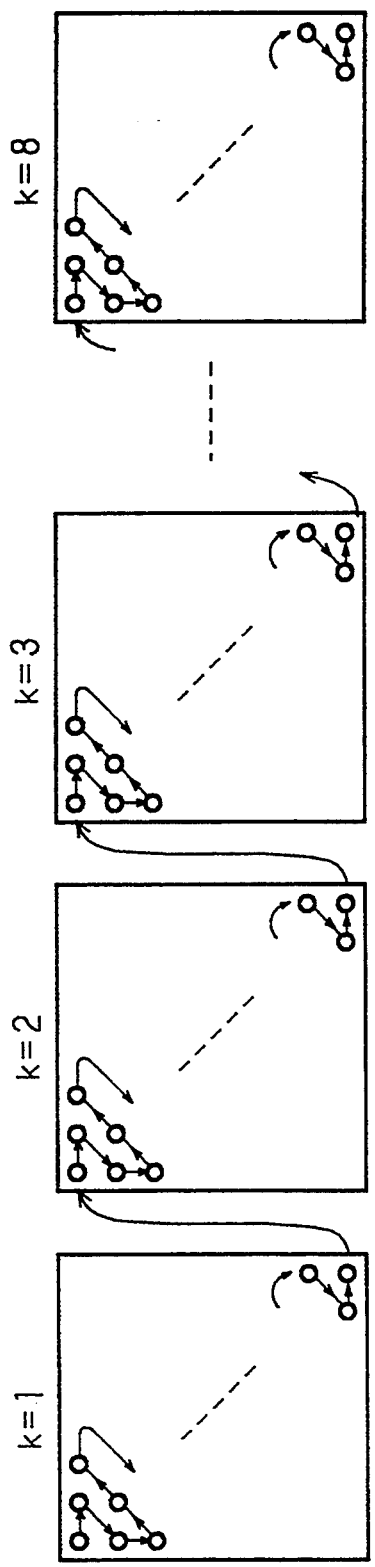
FIGS. 30(a)-(b) are a diagram of the other scanning of a three-dimensional block according to this invention.
Figure 30B:
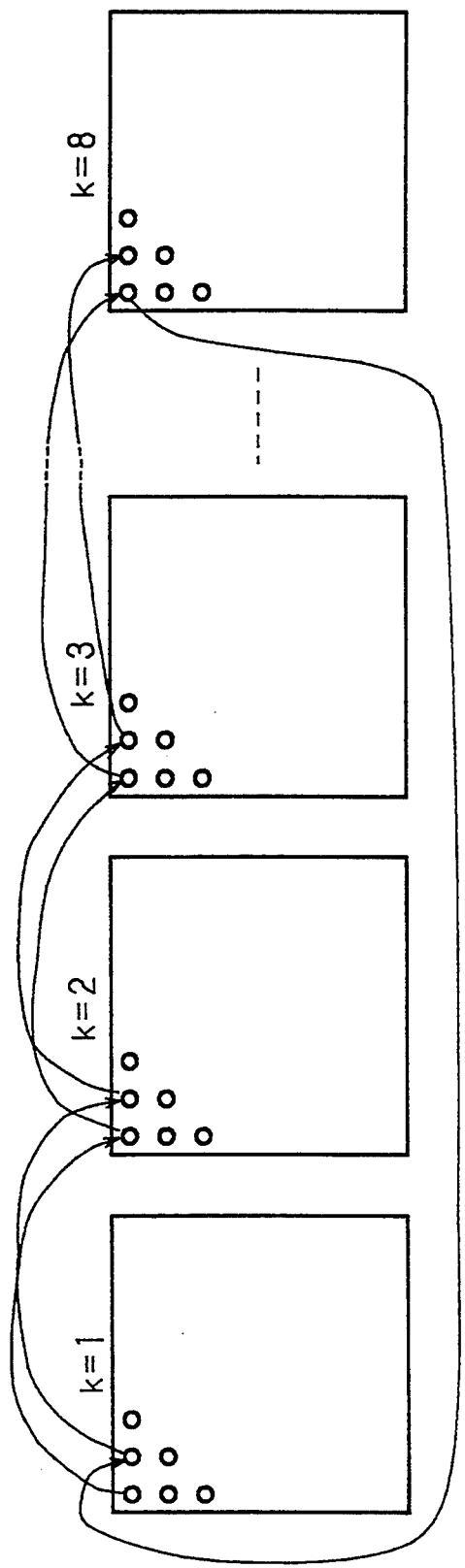

Moreover, in the aforementioned embodiment, a three-dimensional block of the size $8 \times 8 \times 8$ is scanned by scanning in two-dimensional block of the size $8 \times 8$ as in FIG. 27 8 times. In other words, the LL band is scanned in a manner as shown in FIG. 30(a). However, a moving picture can be scanned first in time axis as shown in FIG. 30(b).

A coding apparatus according to a different embodiment of this invention will be discussed hereinbelow, wherein some of the sub-band components are thinned out without being processed by orthogonal transform.

Figure 31:
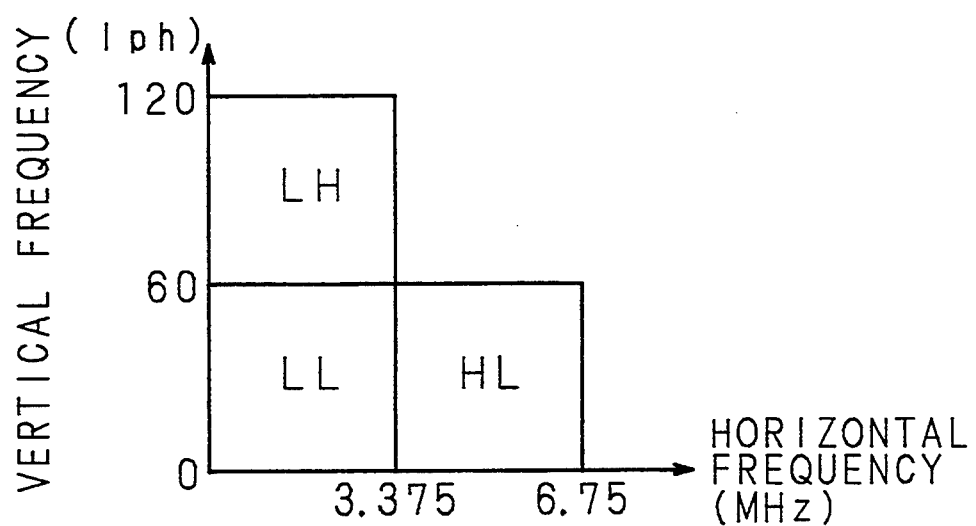
FIG. 31 is a diagram of the sub-band of the Y signal to be coded in this invention.
Figure 32:
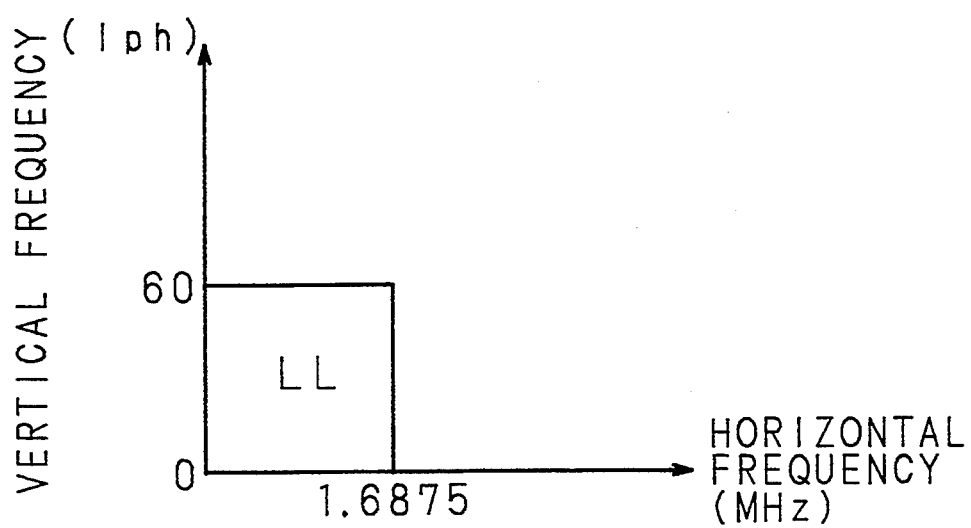
FIG. 32 is a diagram of the sub-band of the R-Y signal, B-Y signal to be coded in this invention.

Each block outputted from the sub-band dividing circuit 5 is processed by DCT at the three-dimensional orthogonal transforming circuit 6. According to the instant embodiment, however, only the LL, HL, LH bands of Y signal are processed by orthogonal transform as shown in FIG. 31, and only the LL band of R-Y, B-Y signals is processed by orthogonal transform as shown in FIG. 32. The coefficients processed by the orthogonal transform and outputted from the three-dimensional orthogonal transforming circuit 6 are coded at the coding unit 7 and then scanned in the one dimension. A Huffman code set beforehand to indicate a non-zero value and a Huffman code indicating the length of the sequence of zero value to the non-zero value are outputted from the output terminal 8.

The following description is related to the case where a sample image is coded and decoded. Each of the LL, HL, LH, HH bands obtained by dividing a sample image into four in the horizontal and in the vertical directions is formed into a three-dimensional block of 8 picture elements $\times 8$ lines $\times 8$ fields. It is processed by three-dimensional orthogonal transform, quantized, processed by three-dimensional inverse orthogonal transform, sub-band synthesized, and finally combined to reproduce the original image. Table 10 shows the result when four frames of sample image as above are coded. The S/N ratio is calculated with an equation (6) below;

$$S/N= 10 \log_{10}\left( \frac{255^2}{\frac{1}{N} \sum_{i=1}^{N} (x_i - x'_i)^2} \right) \quad (6)$$

$X_i$: value of an original picture
$X'_i$: value of a reproduced picture

According to the method 1, an image divided into sub-bands is processed by three-dimensional orthogonal transform, and the obtained coefficients are multiplied with a suitable weight (1–0.4) in correspondence to the frequency band. Then, the one-dimensional scan is performed to code the coefficients by Huffman code. Method 2 is the instant embodiment of this invention, whereby the HH band of Y signal and HL, LH, HH bands of R-Y, B-Y signals are thinned out and coded. Almost all the main components are concentrated in the LL band, and the energy is decreased sequentially from the LH, HL bands to HH band. In the method 2, the total bit rate is reduced 10% or more in comparison with that in the method 1, particularly, the total bit for the R-Y, B-Y signals is reduced nearly 40%. Although the S/N ratio is 1–2 dB lower in the method 2 than in the method 1, the quality deterioration of the reproduced image is hardly recognized by human eyes.

Figure 33:
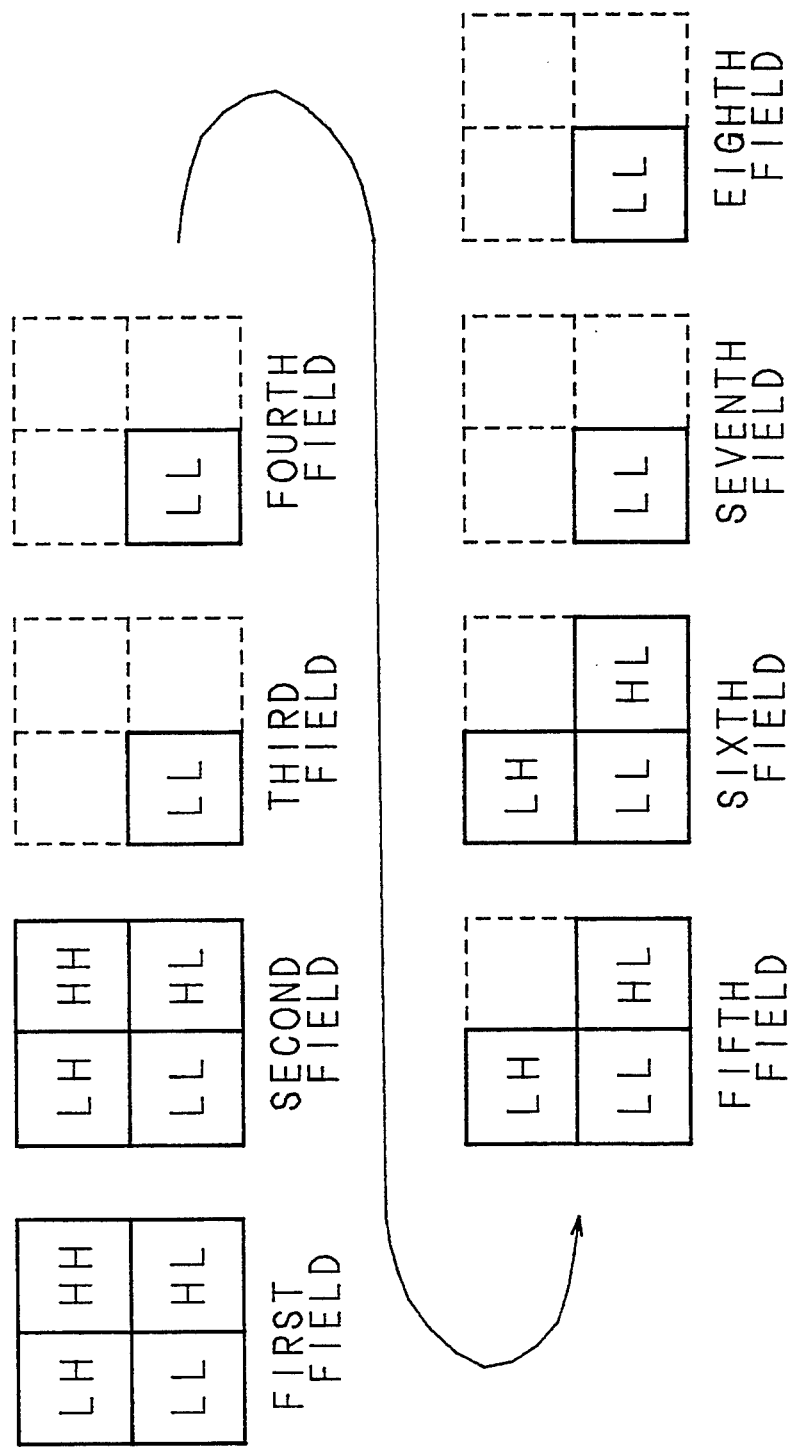
FIG. 33 is a diagram of the other example of the sub-band of the Y signal to be coded in this invention.

Although the HH band of Y signal and LH, HL, HH bands of R-Y, B-Y signals are thinned out in each field in the above-mentioned embodiment, it is possible to thin out each band at a predetermined constant cycle as shown in FIG. 33. In FIG. 33, each band of Y signal is thinned out at a cycle of 8 fields, i.e., LH, HL bands are thinned out at the third, fourth, seventh, eighth fields and HH band is thinned out from the third to the eighth fields. Since the visual sense is poorer to a moving picture, the quality deterioration is hardly recognized even when the high pass components are regularly thinned out. All the components are coded at in first and the second fields, and therefore the static image in this frame has sufficient, resolution and S/N ratio.

A coding apparatus according to a further embodiment of this invention will be described below. According to the further embodiment, it is so arranged as to code only the effective image blocks by judging whether the image is effective.

Figure 34:
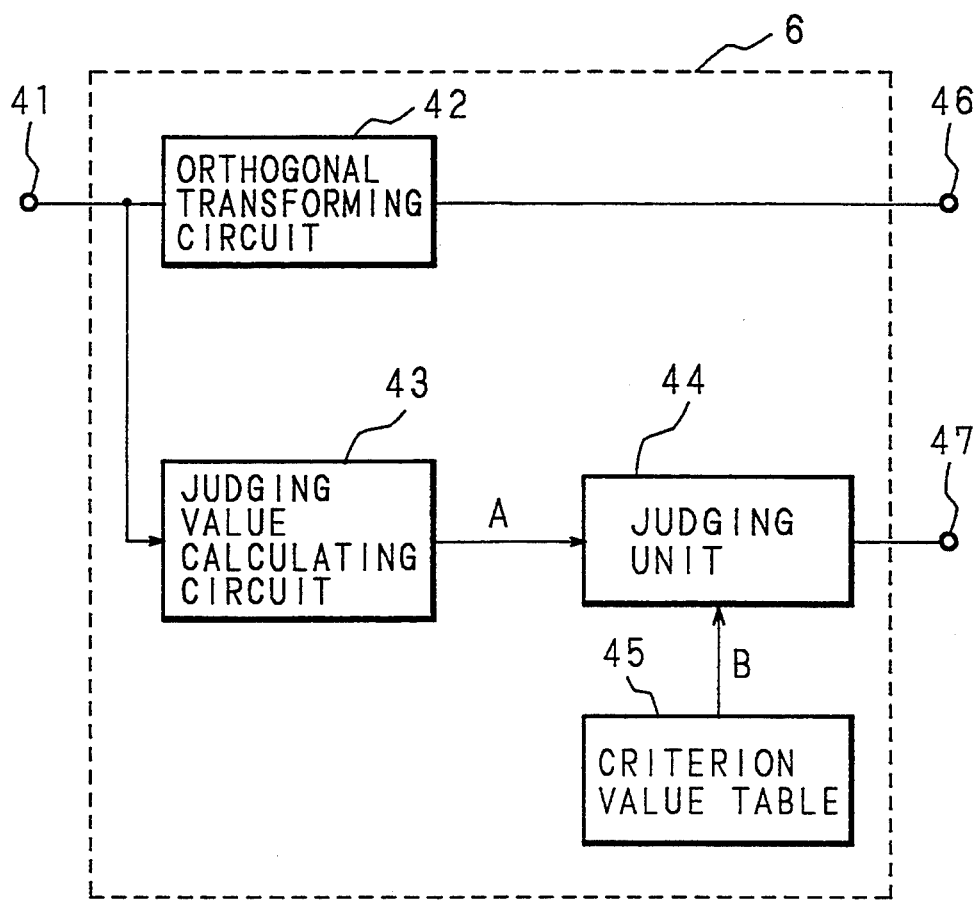
FIG. 34 is a block diagram showing the inner structure of a three-dimensional orthogonal transforming circuit of this invention.

FIG. 34 is a block diagram showing the inner structure of the three-dimensional orthogonal transforming circuit 6. The three-dimensional orthogonal transforming circuit 6 is comprised of an orthogonal transforming circuit 42, a judging value calculating circuit 43, a criterion value table 45 and a judging unit 44. At the orthogonal transforming circuit 42, each block outputted from the sub-band dividing circuit 5 through an input terminal 41 is processed by DCT thereby to obtain coefficients. The judging value calculating circuit 43 calculates a judging value A for judging whether the block outputted from the circuit 5 is effective on the basis of the size of the image signal in each block. The criterion value table 45 stores a crieterion value B. The judging unit 44 finally judges whether the sub-band block is effective by comparing the judging value A with the criterion value B. The obtained coefficients are outputted to the coding unit 7 through an output terminal 46, and the judging result is outputted to the coding unit 7 from the judging unit 44 through an output terminal 47.

Each block outputted from the sub-band dividing circuit 5 is processed by three-dimensional DCT at the three-dimensional orthogonal transforming circuit 6. The operation of the three-dimensional transforming circuit 6 will be explained with reference to FIG. 34.

Each block of Y, R-Y, B-Y signals inputted from the input terminal 41 is processed by three-dimensional DCT at the orthogonal transforming circuit 42. The resultant coefficients are outputted to the coding unit 7 through the output terminal 46 and also to the judging value calculating circuit 43. The judging value A for judging whether the sub-band block is effective is obtained in the calculating circuit 43 on the basis of a variance of the image signal in each block. Supposing that a variance in each block is represented by $\sigma AC^2$, the value calculating circuit 43 obtains a value A expressed by an equation below as the value, and outputs it to the judging unit 44.

$$A = \sigma AC^2 / 512$$

The variance $\sigma AC^2$ is obtained by the following equation;

$$\sigma^2_{AC} = \frac{1}{512} \sum_{i=0}^{7} \sum_{j=0}^{7} \sum_{k=0}^{7} \{X_m - X(i,j,k)\}^2$$

Xm: average value within a block
X(i,j,k): image signal within a block

Respective criterion values B corresponding to Y, R-Y, B-Y signals are stored in the table 45 as a memory and outputted to the judging unit 44 as necessity requires. The judging unit 44 compares the judging value A outputted from the circuit 43 with the criterion value B outputted from the table 45, thereby determining that the block is effective when $A \geq B$, or that the block is not effective when $A < B$. The judging result is outputted to the coding unit 7 through the output terminal 47.

The three-dimensional DCT coefficients are quantized and coded at the coding unit 7 based on the judging result at the judging unit 44. In the case where the block is judged as effective at the three-dimensional orthogonal transforming circuit 6, the coding unit 7 not only outputs the block information indicating that the block is an effective image block, but quantizes and codes the three-dimensional DCT coefficients of the block. On the other hand, in the case where the block is judged as ineffective at the three-dimensional orthogonal transforming circuit 6 and the block is one of the LL band of Y, R-Y or B-Y signals, the coding unit 7 outputs the block information indicating that the block is not effective, and at the same time quantizes and codes the DC components alone of the three-dimensional DCT coefficients. Moreover, in the case where the block is judged as ineffective and the block is one of the HL, LH, or HH bands of Y, R-Y or B-Y signals, the coding unit 7 outputs only the block information indicating that the block is not effective without quantizing the three-dimensional DCT coefficients.

It will be described hereinbelow when a sample image is coded and decoded. The sample image is divided into four in the horizontal and in the vertical directions thereby to obtain LL, HL, LH, HH bands. Each band is formed into three-dimensional blocks of 8 picture elements × 8 lines × 8 fields, which are processed by three-dimensional orthogonal transform and quantized, processed by the three-dimensional inverse orthogonal transform, and bombined to reproduce the original image. Table 11 shows the result when four frames of the sample image are coded. The S/N ratio is calculated with the equation (6) described earlier.

Method 1 is a method of coding carried out without judging as to the effectiveness of a sub-band block. Method 2 is the instant embodiment of this invention. It is judged in the method 2 whether the sub-band block is effective or not. When the sub-band block is not effective, any coefficients except the DC components of LL band are not coded. It is to be noted here that the criterion value B used for judgment of the sub-band block is set to be 0 in the LL, LH bands of Y signal, 0.2 in the HL, HH bands thereof, 0 in the LL band of R-Y, B-Y signals, and 0.2 in the LH, HL, HH bands of R-Y, B-Y signals respectively.

By Table 11 hereinabove, it is understood that the total bit rate is reduced more or less 17% in the method 2 as compared with in the method 1. The S/N ratio is decreased approximately 2-3 dB in the method 2 in comparison with in the method 1. However, since the quality deterioration of the reproduced image can hardly be recognized by human eyes, it causes no problem.

According to the further embodiment discussed above, the judgment of the sub-band block is carried out on the basis of the variance $\sigma AC^2$ of each block, but it is also possible to judge on the basis of the maximum value or dynamic range of each block. Moreover, when the sub-band block is not effective, the coefficients except the DC components are not coded in the LL band, but it is possible to code only the DC components also in the other LH, HL, HH bands.

Figure 35:
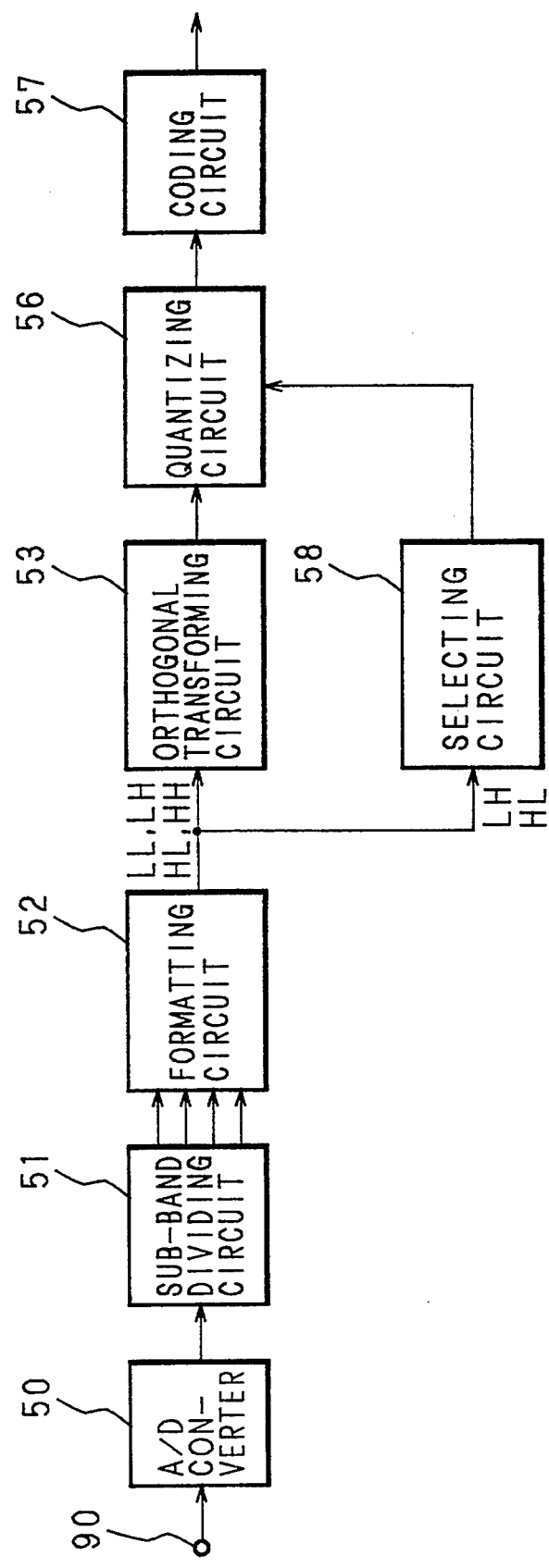
FIG. 35 is a block diagram showing the structure of a coding apparatus at the coding side according to this invention.
Figure 36:
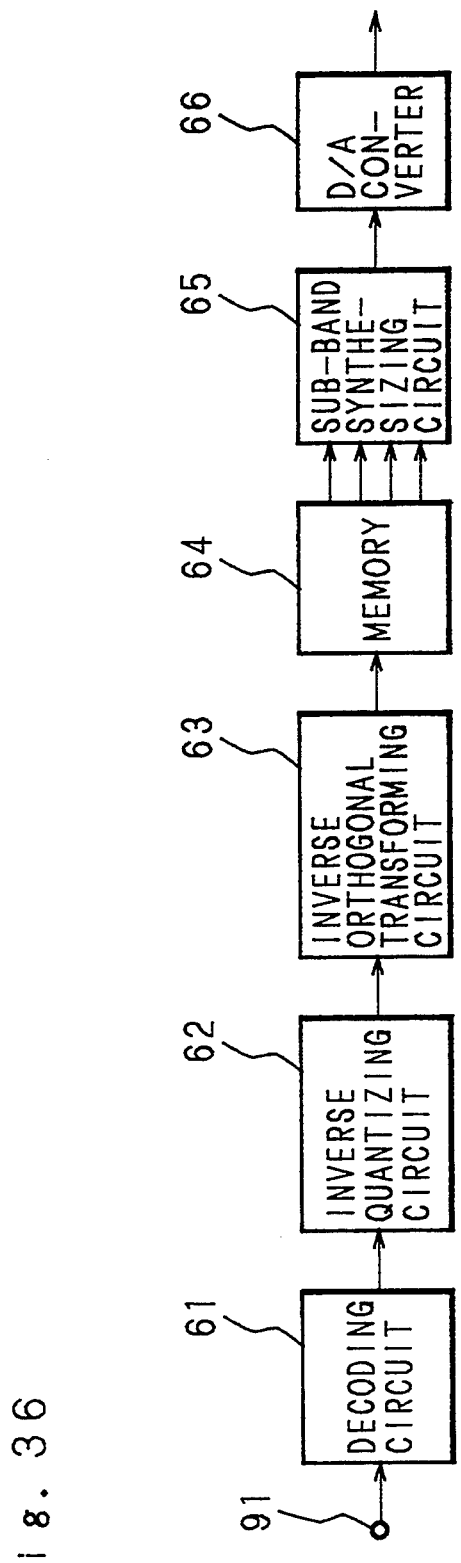
FIG. 36 is a block diagram showing the structure of a coding apparatus at the decoding side according to this invention.

A still embodiment of this invention will be described below. FIGS. 35 and 36 are respectively block diagrams of a coding apparatus of the still embodiment at the coding side and the decoding side. Referring to FIG. 35 showing the coding 0 side of the apparatus, 90 is an input terminal of a video signal and 50 represents an analog/digital converter (referred to as an A/D converter hereinafter). A digitized video signal is separated into four frequency bands at a sub-band dividing circuit 51 corresponding to the respective frequencies. The divided signals are outputted to a block formatting circuit 52, which forms signals of each band into blocks of 8 picture elements × 8 lines × 8 fields, and outputs them sequentially to an orthogonal transforming circuit 53 and to a selecting circuit 58. The orthogonal transforming circuit 53 processes the blocks outputted from the block formatting circuit 52 by orthogonal transform thereby to obtain coefficients. The obtained coefficients are outputted to a quantizing circuit 56 having a plurality of quantization tables with different quantizing step width. The selecting circuit 58 selects the optimum quantization table using blocks of high frequency components outputted from the block formatting circuit 52. The selected quantization table is outputted to the quantizing circuit 56. Subsequently, the quantizing circuit 56 quantizes the coefficients outputted from the orthogonal transforming circuit 53 based on the quantization table selected at the selecting circuit 58, and outputs the quantized coefficients to a coding circuit 57. The coding circuit 57 codes the output of the quantizing circuit 56.

In FIG. 36 indicating the decoding side of the apparatus, a reference numeral 91 is an input terminal to which the data coded in the manner as above is inputted. A decoding circuit 61 connected to the input terminal 91 performs transform inverse to that of the coding circuit 57, and outputs the decoded data to an inverse quantizing circuit 62. The inverse quantizing circuit 62 extends the output of the decoding circuit 61 in accordance with the quantization table, and outputs inverse quantized coefficients to an inverse orthogonal transforming circuit 63. The inverse orthogonal transforming circuit 63 processes the output of the inverse quantizing circuit 62 by inverse orthogonal transform, thereby outputting the data processed by the inverse orthogonal transform to a memory 64. The output of the inverse orthogonal transforming circuit 63 is stored by 8 fields in the memory 64. Components outputted from the memory 64 are combined at a sub-band synthesizing circuit 65. The combined data is outputted to a digital/analog converter (referred to as a D/A converter hereinafter) 66. The D/A converter 66 changes the digital video signal outputted from the sub-band synthesizing circuit 65 to an analog signal.

Figure 37:
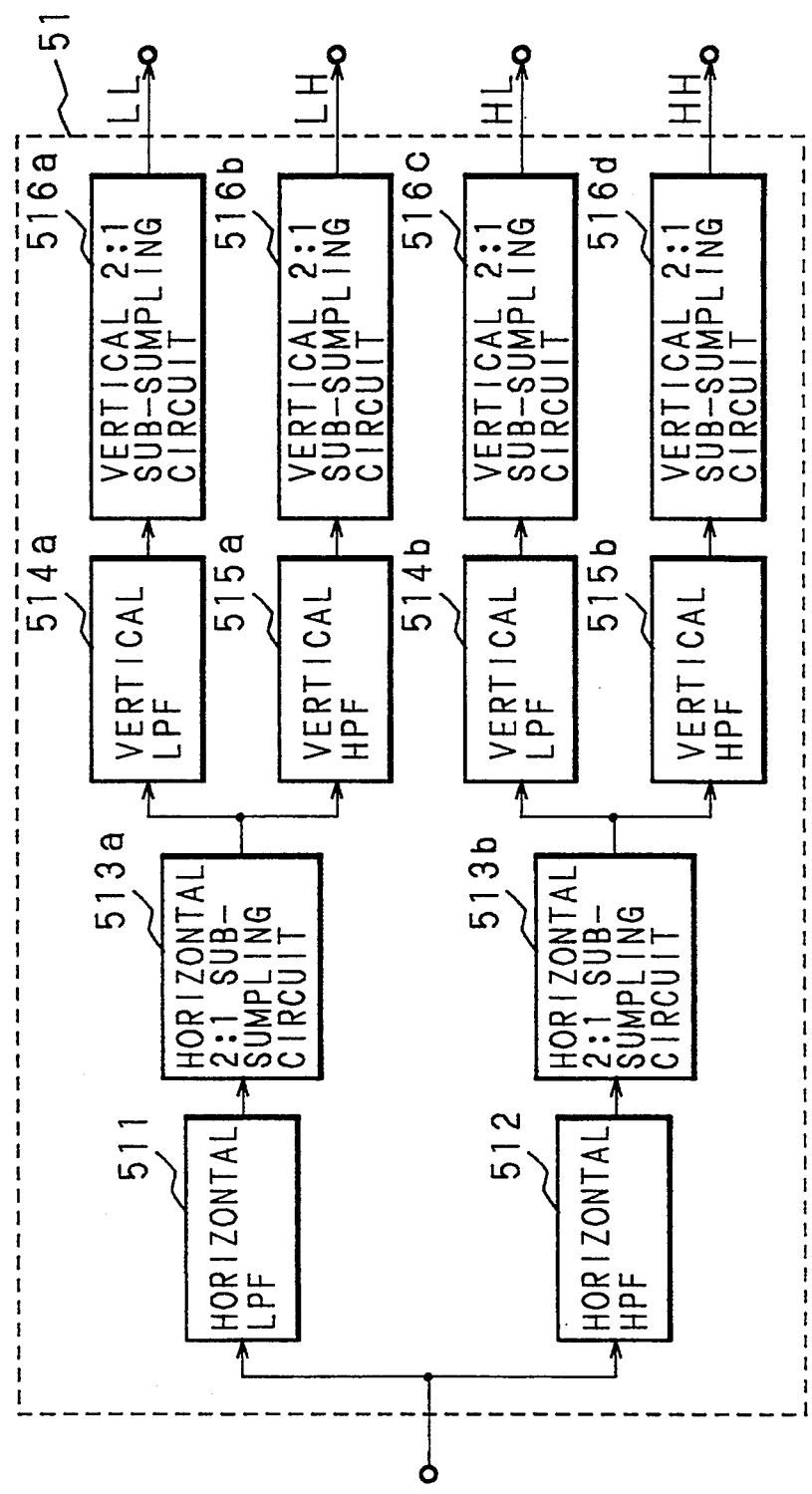
FIG. 37 is a block diagram showing the inner structure of a sub-band dividing circuit of the apparatus of FIG. 35

In FIG. 37, there is shown an example of the structure of the sub-band synthesizing circuit 51. It is provided with a horizontal LPF 511 and a horizontal HPF 512 for allowing the digital video signal outputted from the A/D converter 50 to pass therethrough, horizontal 2:1 sub-sampling circuits 513a, 513b for reducing the number of picture elements in the horizontal direction to half, vertical LPFs 514a, 514b, vertical HPFs 515a, 515b and vertical 2:1 sub-sampling circuits 516a, 516b, 516c and 516d for reducing the number of picture elements in the vertical drection to half.

Figure 38:
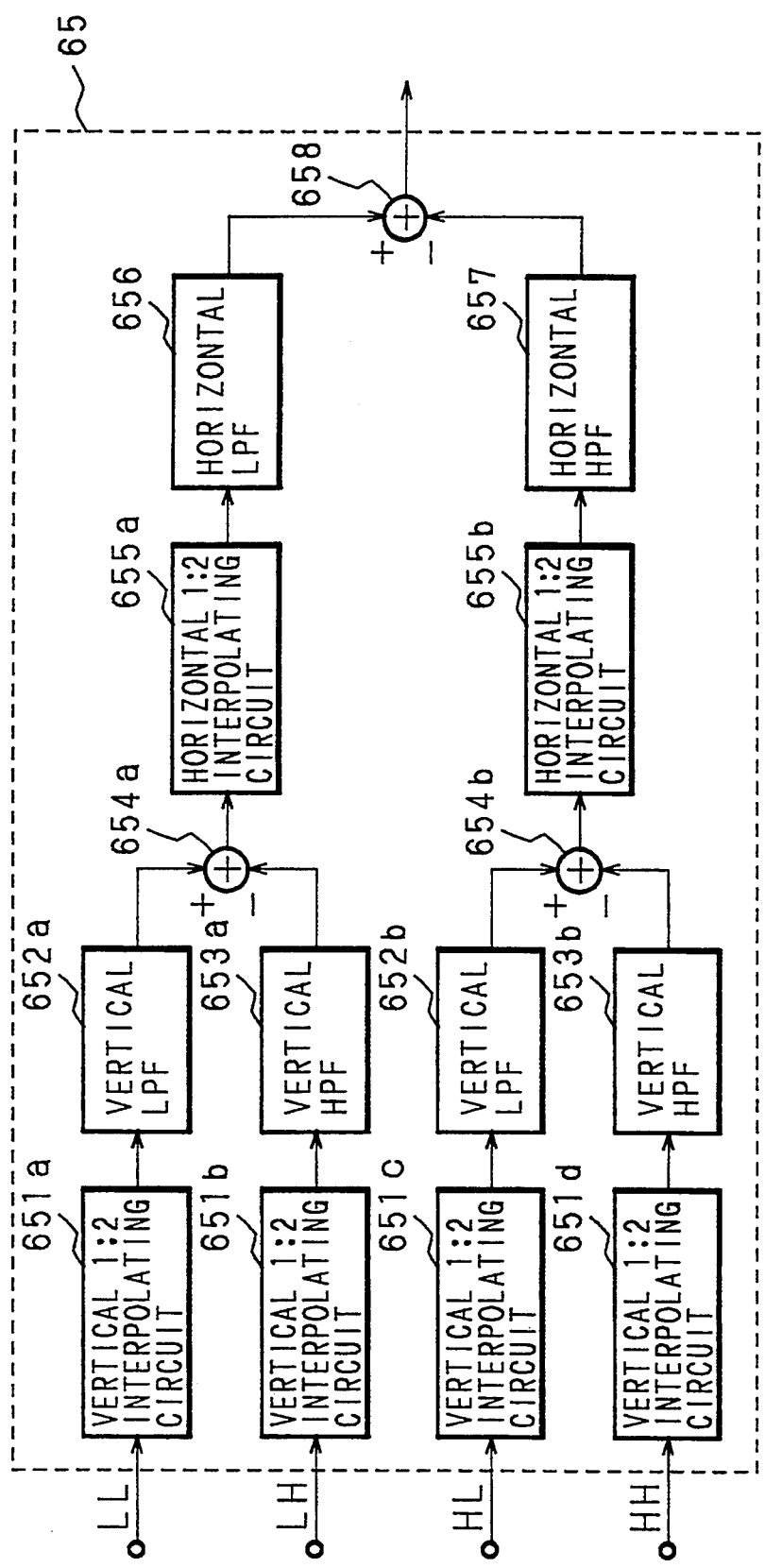
FIG. 38 is a block diagram showing the inner structure of a sub-band synthesizing circuit of the apparatus of FIG. 36.

FIG. 38 is an example of the structure of the sub-band synthesizing circuit 65. The sub-band synthesizing circuit 65 is provided with vertical 1:2 interpolating circuits 651a, 651b, 651c, 651d for increasing the number of picture elements in the vertical direction twice by interpolation of 0, vertical LPFs 652a, 652b, vertical HPFs 653a, 653b, adders 654a, 654b, horizontal 1:2 interpolating circuits 655a, 655b for increasing the number of picture elements in the horizontal direction twice by interpolation of 0, a horizontal LPF 656, a horizontal HPF 657 and an adder 658.

The operation of the coding apparatus having the above structure will be explained below. An analog video signal inputted through the input terminal 90 is converted to a digital signal at the A/D converter 50. The sampling frequency at this time is 13.5 MHz when the input signal is a luminance signal, and 6.75 MHz when the input signal is a color difference signal. Therefore, the effective number of samples in one horizontal line is 704 in the case of the luminance signal, and 352 in the case of the color difference signal. 262.5 lines constitute one field. Among the 262.5 lines, for example 240 lines constituting one field are outputted as effective lines.

Figure 21:
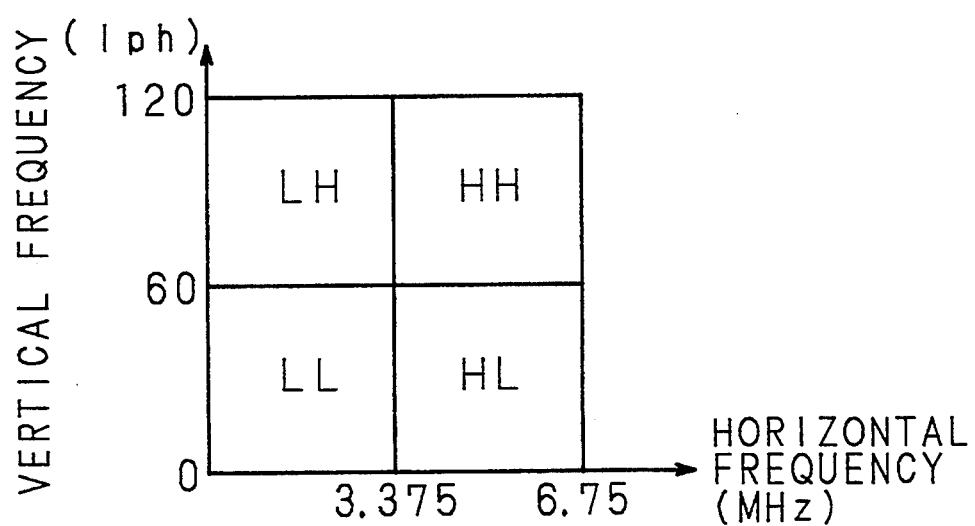
FIG. 21 is a diagram of sub-band dividing of a Y signal according to this invention.

The sub-band dividing circuit 51 divides each field of the digital video signal outputted from the A/D converter 50 into a plurality of frequency bands. For example, when the sampling frequency is 13.5 MHz, the digital video signal is divided into four bands, i.e., LL, LH, HL, HH frequency bands as indicated in FIG. 21.

The operation of the above sub-band dividing circuit 51 will be described with reference to FIG. 37. The inputted digital video signal is band-restricted at the horizontal LPF 511 having the frequency response shown in FIG. 25, and then downsampled out at the horizontal 2:1 sub-sampling circuit 513a so that the number of picture elements in the horizontal direction is reduced to half. Moreover, the digital video signal is inputted also to the horizontal HPF 512 having the frequency response shown in FIG. 26. The output from the horizontal HPF 512 is downsampled at the horizontal 2:1 sub-sampling circuit 513b so that the number of picture elements in the horizontal direction is reduced to half. Outputs from the horizontal 2:1 sub-sampling circuits 513a, 513b are band-restricted at vertical LPFs 514a, 514b having the frequency response as shown in FIG. 23 and downsampled at the vertical 2:1 sub-sampling circuits 516a, 516c so as to reduce the number of picture elements in the vertical direction to half respectively. On the other hand, the outputs from the horizontal 2:1 sub-sampling circuits 513a, 513b are inputted to the vertical HPFs 515a, 515b having the frequency response as shown in FIG. 24 to be band-restricted, and then downsampled out at the vertical 2:1 sub-sampling circuits 516b, 516d respectively, to reduce the number of picture elements in the vertical direction to half. The output from the vertical 2:1 sub-sampling circuit 516a is the LL band in FIG. 21, output from the vertical 2:1 sub sampling circuit 516b is the LH band in FIG. 21, output from the vertical 2:1 sub-sampling circuit 516c is the HL band and output from the vertical 2:1 sub-sampling circuit 516d is the HH band in FIG. 21.

The four outputs from the sub-band dividing circuit 51 are formed into blocks of 8 picture elements×8 lines×8 fields at the block formatting circuit 52. Blocks of the four components at the same position are consecutively outputted. These blocks are inputted to the orthogonal transforming circuit 53 and processed by orthogonal transform, for example, three-dimensional DCT.

Meanwhile, the blocks in the LH,HL bands among the blocks of the four components outputted from the block formatting circuit 52 are inputted to the selecting circuit 58. The selecting circuit 58 detects whether a flat part or a part with large change exists at the subject position on the screen by the value of picture elements of the blocks in the LH,HL bands. This detection determines the quantization table of the block of the four components at the same position.

Figure 39:
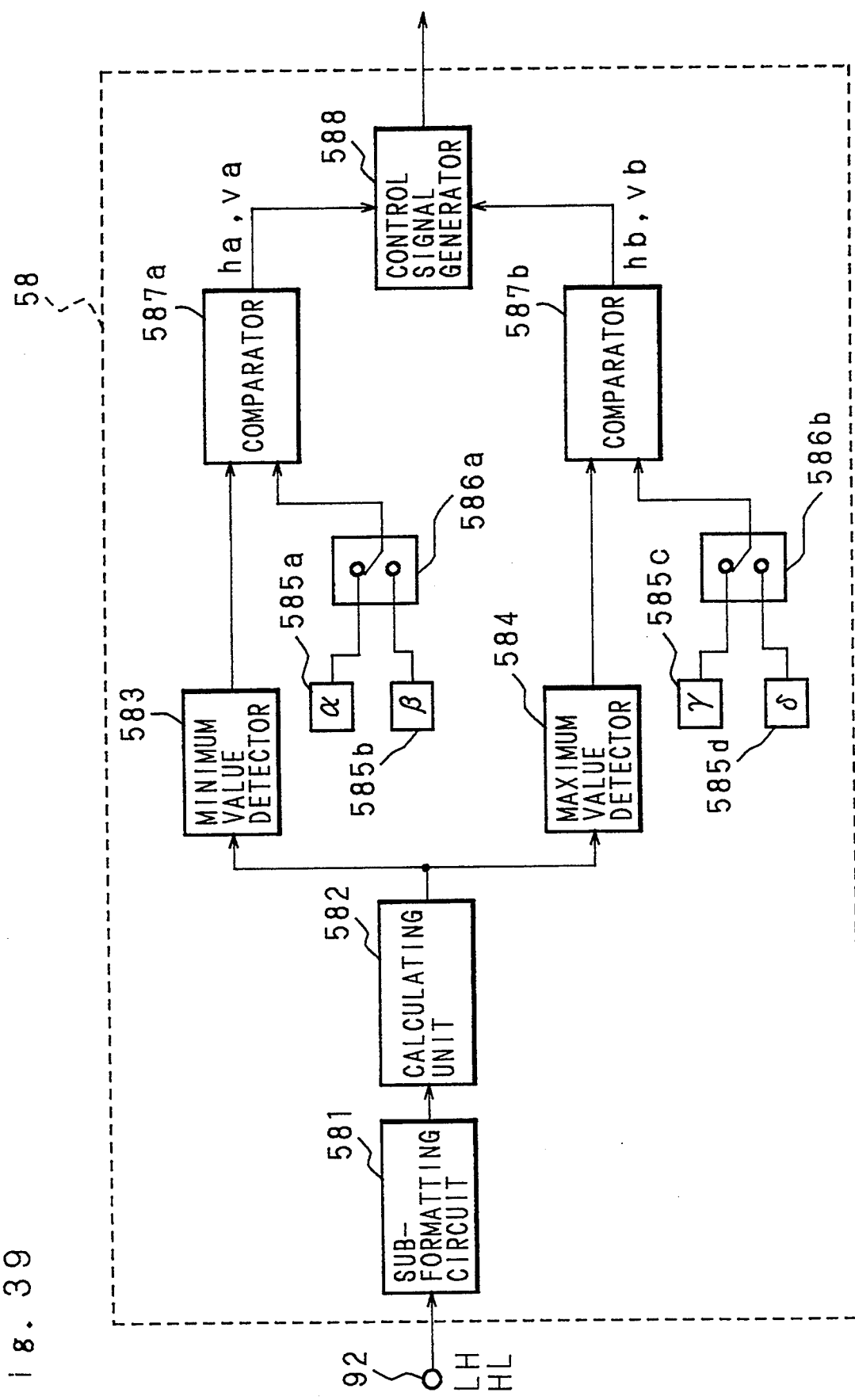
FIG. 39 is a block diagram showing the inner structure of a selecting circuit of the apparatus of FIG. 35.

FIG. 39 illustrates an example of the structure of the selecting circuit 58. In FIG. 39, 92 is an input terminal through which the blocks of the LH, HL bands among the four components outputted from the block formatting circuit 52 are inputted. The selecting circuit 58 is provided with a sub-block formatting circuit 581 for dividing each inputted block into a plurality of sub-blocks, a calculating unit 582 for obtaining the maximum value among absolute values of the value of picture elements in each sub-block outputted from the sub-block formatting circuit 581, a minimum value detector 583 for detecting the minimum value among the outputs from the calculating unit 582, a maximum value detector 584 for detecting the maximum value among outpus from the calculating unit 582, constant generators 585a, 585b, 585c, 585d for outputting a predetermined value α, β, γ, σ respectively, a switch 586a for selecting and outputting the output from either the constant generator 585a or 585b, a switch 586b for selecting and outputting the output from either the constant generator 585c or 585d, a comparator 587a for comparing the output of the minimum detector 583 with that of switch 586a, a comparator 587b for comparing the outputs from the maximum detector 584 with that of switch 586b, and a control signal generator 588 for determining the quantization table at the quantizing circuit 56 in accordance with the outputs from the comparators 587a, 587b.

Figure 41:
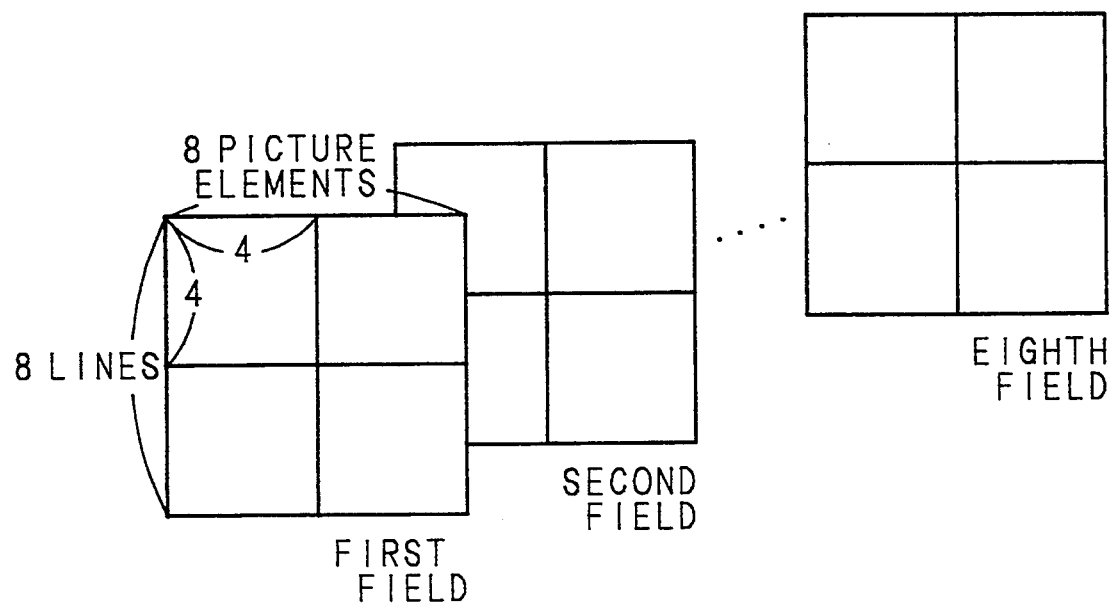
FIG. 41 is a conceptual diagram for explanation of the operation of a sub-formatting circuit in FIGS. 39, 40.

The selecting circuit 58 in the above-described structure operates in a manner as follows. The blocks of the LH, HL bands are sequentially inputted to the input terminal 92 from the block formatting circuit 52. Each inputted block is divided into four in the two-dimensional plane at sub-block forming circuit 581 as shown in FIG. 41, so that 32 sub-blocks, each 4 picture elements×4 lines, are formed. The calculating unit 582 obtains the maximum value among the absolute values by each sub-block. In other words, supposing that the value of picture elements in the sub-block is expressed by s(i,j) (i,j=0,1,2,3), the calculating unit 582 obtains and outputs a value represented by (7) below;

$$\text{Max } \{|s(i,j)|; i,j=0,1,2,3\} \tag{7}$$

Since the LH,HL bands are considered to represent an edge part in the vertical direction and in the horizontal direction respectively, the output from the calculating unit 582 represented by the above (7) indicates the degree of the change in each sub-block. More specifically, when the output of the calculating unit 582 is very small, the subject sub-block is a flat part. On the other hand, when the output of the calculating unit 582 is large, the subject sub-block includes a large change.

The output of the calculating unit 582 is inputted to the minimum value detector 583 and maximum value detector 584. The minimum value detector 583 obtains the minimum value among the values expressed by (7) by 32 sub-blocks constituting one block. Namely, the minimum value detector 583 outputs the minimum value of 32 values outputted consecutively from the calculating unit 582. On the other hand, the maximum value detector 584 obtains the maximum value among the values expressed by (7) by the 32 sub-blocks, that is, the maximum value among the 32 values outputted consecutively from the calculating unit 582. Therefore, when the output of the minimum value detector 583 is very small, the subject block includes a flat part, whereas, when the output of maximum value detector 584 is large, the subject block includes a large change.

The constant generator 585a, 585, 585c, 585d output respective predetermined values $\alpha$, $\beta$, $\gamma$, $\sigma$. The switch 586a selects the output from the constant generator 585a when the value outputted from the minimum value detector 583 is a value of the LH band, and selects the output from the constant generator 585b when the output from the minimum value detector 583 is a value of the HL band. Moreover, the switch 586b selects the output of the constant generator 585c when the output from the maximum value detector 584 is a value of the LH band, and selects the output from the constant generator 585d when the output from the maximum value detector 584 is a value of the HL band. The comparator 587a outputs "1" when the output of the minimum value detector 583 is smaller than that of the switch 586a, and outputs "0" in other cases. The comparator 587b outputs "1" when the output from the maximum value detector 584 is larger than that of the switch 586b, and outputs "0" in other cases.

More specifically, when the output corresponding to the LH band from the minimum value detector 583 is smaller than the predetermined value $\alpha$, the comparator 587a judges that the subject block includes a flat part in the vertical direction, and outputs "1", and outputs "0" in other cases. Similarly, when the output corresponding to the HL band is smaller than the predetermined value $\beta$, the comparator 587a judges that the block includes a flat part in the horizontal direction, and outputs "1", and outputs "0" in other cases. The predetermined values $\alpha$, $\beta$ are set beforehand among the values expressed by (7) by each sub-block in the LH, HL bands.

When the output corresponding to the LH band from the maximum value detector 584 is larger than the predetermined value $\gamma$, the comparator 587b judges, that a large change is included in the subject block in the vertical direction, and outputs "1", in other cases outputs "0". Similary when the output corresponding to the HL band from the maximum value detector 584 is larger than the predetermined value $\sigma$, the comparator 587b judge that the subject block includes a large change in the horizontal direction, and outputs "1", in other cases outputs "0". The afore-mentioned predetermined values $\gamma$, $\sigma$ are set beforehand among the values expressed by (7) by each sub-block in the LH,HL bands.

The blocks in the LH, HL bands are inputted to the input terminal 92 in this order. The comparators 587a, 587b output criteria ha, hb in the horizontal direction after outputting criteria va, vb in the vertical direction respectively.

The outputs of the comparators 587a, 587b are inputted to the control signal generator 588. The control signal generator 588 determines the quantization table at the quantizing circuit 56 by the use of the two values va, ha outputted consecutively from the comparator 587a and also the two values vb, hb outputted consecutively from the comparator 587b, thereby outputting a control signal. In other words, the criterion va for judging whether a flat part exists in the vertical direction is outputted from the comparator 587a, and then, the criterion ha for judging whether a flat part exists in the horizontal direction is outputted therefrom. On the other hand, the criterion vb for judging whether a large change exists in the vertical direction is outputted from the comparator 587b and then the criterion hb for judging whether a large change exists in the horizontal direction is outputted from the comparator 587b. With the use of these four criteria, the control signal generator 588 determines the quantization table. By way of example, in the case where the quantizing circuit 56 possesses three kinds of quantization tables, one that has the finest quantizing step width is called a quantization table of high rate, one that has an intermediate quantizing step width is called a quantization table of medium rate, and one that has the most rough quantizing step width is called a quantization table of low rate. When va=0 and ha=0, the subject block includes no flat part where quality deterioration is easily recognized. Therefore the quantization table of low rate is selected. While, when va=1 or ha=1, the block includes a flat part. Accordingly, when (va=1 or ha=1) and (vb=1 or hb=1), a flat part and a part with a great change both exist in the subject block, and the quality deterioration is conspicuous. Therefore, the quantization table of high rate is selected. When (va=1 or ha=1) and vb=0 and hb=0, the subject block includes a flat part, but not a large change, so the quantization table of medium rate is selected. The control signal generator 588 outputs to the quantizing circuit 56 which quantization table is selected. The selecting circuit 58 operates in the manner as described hereinabove.

The quantizing circuit 56 quantizes the coefficients outputted from the orthogonal transforming circuit 53 in accordance with the output of the selecting circuit 58. At this time, the selecting circuit 58 determines the quantization table by the blocks of the LH, HL bands at the same position and outputs a control signal. The quantizing circuit 56 applies this control signal from the selecting circuit 58 to the blocks of the four bands (LL, LH, HL, HH) at the same position. For example, when the output of the circuit 58 means that the quantization table of high rate is selected, the coefficients of the LL band are quantized based on the quantization table having the finest quantizing step width among the three kinds of quantization tables of the LL band. The coefficients of the LH band are quantized based on the quantization table having the finest quantizing step width among the three kinds of quantization tables of the LH band. Similarly, the coefficients of the HL, HH bands are quantized based on the quantization tables having the finest quantizing step width among the three kinds of quantization tables of the HL, HH bands respectively.

The quantization table of each band can be either the same or different each other. Furthermore, the quantization table can be either a uniform quantization table with a fixed quantizing step width, or a non-linear quantization table having an inconstant quantizing step width.

The coefficients quantized at the quantizing circuit 56 are inputted to the coding circuit 57 and coded by one-dimensional scanning and variable length coding of the three-dimensional blocks. The coding circuit 57 also codes and outputs an index indicating the quantization table used at the quantizing circuit 56.

On the decoding side, the coded data is inputted to the input terminal 91, and decoded to an index indicating the original three-dimensional coefficient and quantization table at the decoding circuit 61. The coefficients are inversely quantized at the inverse quantizing circuit 62 in accordance with the index indicating the quantization table. The coefficients outputted from the inverse quantizing circuit 62 are processed by the inverse orthogonal transform at the inverse orthogonal transforming circuit 63. The block of 8 picture elements×8 lines×8 fields after inverse orthogonal transform is stored in the memory 64. The memory 64 stores the blocks by 8 fields and outputs each component by each field before the block of next 8 fields is stored there. The signal of each component outputted from the memory 64 is combined at the sub-band synthesizing circuit 65.

Now, the operation of the sub-band synthesizing circuit 65 will be described with reference to FIG. 38. Signals of the LL, LH, HL, HH bands outputted from the memory 64 are itnerpolated with 0 at the vertical 1:2 interpolating circuits 651a, 651b, 651c, 651d respectively, so that the number of picture elements in the vertical direction is increased twice. The outputs from the vertical 1:2 interpolating circuits 651a, 651c are band-restricted at the vertical LPFs 652a, 652b having the frequency response respectively shown in FIG. 23. On the other hand, the outputs of the vertical 1:2 interpolating circuits 651b, 651d are band-restricted at the vertical HPFs 653a, 653b having the frequency response respectively shown in FIG. 24. The outputs of the vertical LPF 652a and vertical HPF 653a are added at the adder 654a. Moreover, the outputs of the vertical LPF 652b and vertical HPF 653b are added at the adder 654b. The outputs from the adders 654a, 654b are interpolated with 0 at the horizontal 1:2 interpolating circuits 655a, 655b respectively, so that the number of picture elements in the horizontal direction is increased twice. The output of the horizontal 1:2 interpolating circuit 655a is band-restricted at the horizontal LPF 656 having the frequency response shown in FIG. 25. The output of the horizontal 1:2 interpolating circuit 655b is band-restricted at the horizontal HPF 657 having the frequency response shown in FIG. 26. The outputs from the horizontal LPF 656 and horizontal HPF 657 are added at the adder 658 and outputted therefrom.

The digital video signal combined at the sub-band synthesizing circuit 65 in the manner as above is converted to an analog signal at the D/A converter 66.

In the selecting circuit 58, the control signal generator 588 selects the quantization table on the basis of the signal va indicating whether a flat part is included in the vertical direction, the signal ha indicating whether a flat part is included in the horizontal direction, the signal vb indicating whether a large change exists in the vertical direction, and the signal hb indicating whether a large change exists in the horizontal direction. Especially in the case of video signal in the interlaced scanning form, since it is very rare that a part is flat only in the vertical direction and the flat part in the vertical direction is not particularly recognized, the presence of a flat part can be judged by the flat part in the horizontal direction. That is, using ha, vb, hb only, when ha=1 and (vb=1 or hb=1), it is so judged that the subject block includes both the flat part and part with a large change, and the quantization table of high rate is selected. When ha=1 and (vb=0 and hb=0), it is judged that the subject block has a flat part, but not a part with a large change, so that the quantization table of medium rate is selected. When ha=0, it is judged that no flat part is found in the subject block, and the quantization table of low rate is selected.

Figure 40:
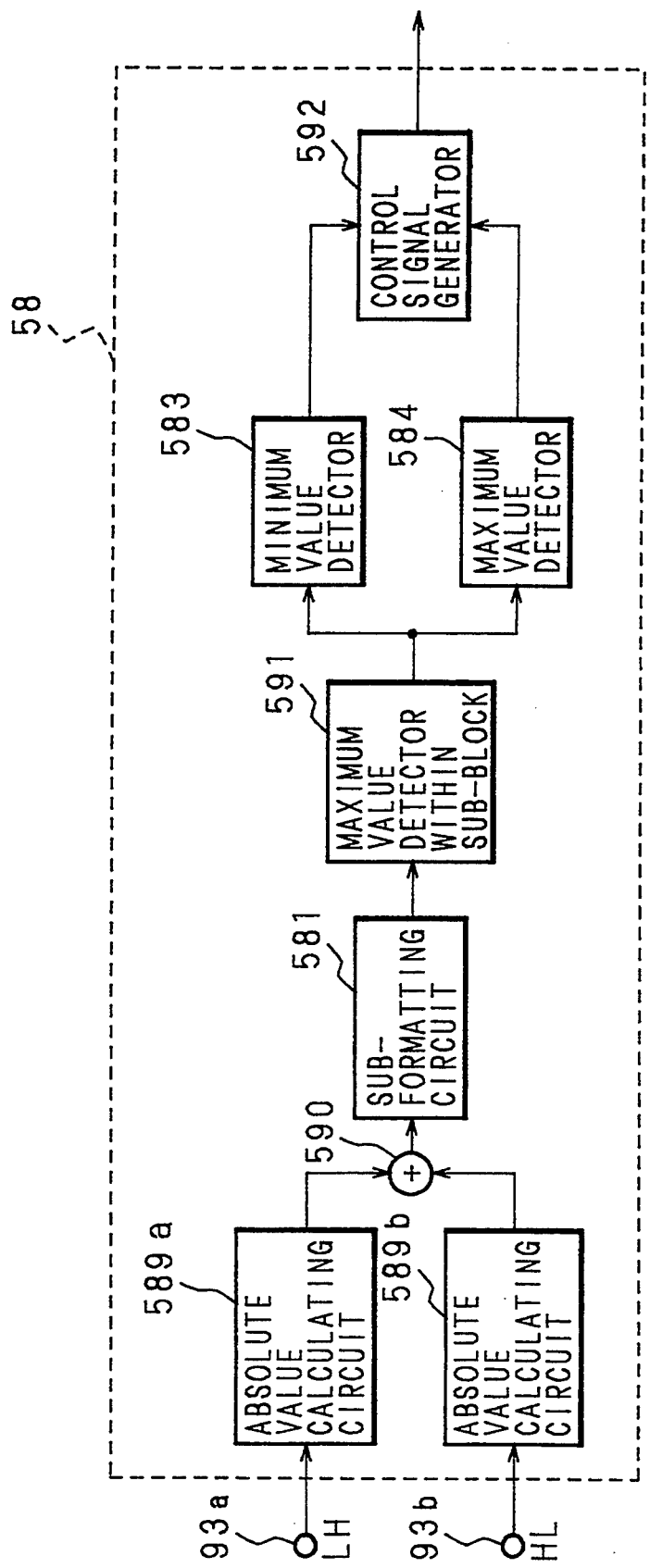
FIG. 40 is a block diagram showing the other inner structure of the selecting circuit.

In the above example, the calculating unit 582 obtains the maximum value among the absolute value of the value of picture elements in each sub-block at the selecting circuit 58. The same effect may be gained by obtaining the dynamic range of each sub-block. Another example of the structure of the selecting circuit 58 is shown in FIG. 40, in which the same parts are designated by the same reference numerals as in FIG. 39. 93a is an input terminal of the LH band and 93b is an input terminal of the HL band. 589a, 589b represent absolute value calculating circuits, 590 is an adder. 591 is a maximum value in sub-block detector which detects the maximum value within a sub-block. 592 is a control signal generator.

The operation of the selecting circuit 58 of FIG. 40 will be explained below. The block of the LH band outputted from the block formatting circuit 52 is inputted through the input terminal 93a, while the block of the HL band is inputted through the input terminal 93b. Both blocks are converted to absolute values at the absolute value calculating circuits 589a, 589b respectively. The LH band block and HL band block converted to absolute values at the calculating circuits 589a, 589b are added at the adder 590 and further divided into a plurality of sub-blocks at the sub-block formatting circuit 581. The sub-block formatting circuit 581 divides one block, for example, into 32 sub-blocks as shown in FIG. 41. The maximum value in sub-block detector 591 outputs the maximum value of each sub-block. Namely, supposing that the value of picture elements in each sub-block outputted from the sub-block formatting circuit 581 is expressed by s(i,j) (i,j=0,1,2,3), the maximum value in sub-block detector 591 outputs a value (8) described below by each sub-block;

$$\text{Max } \{s(i,j); i,j=0,1,2,3\} \tag{8}$$

The output from the adder 590 represents an edge in the horizontal direction or in the vertical direction, and therefore, when the value of the detector 591, i.e., the value (8) is considerably small, the subject sub-block is a flat part. When the value of the detector 591 is large, the subject sub-block includes a large change.

The output from the detector 591 is inputted to the minimum value detector 583 and maximum value detector 584. The minimum value detector 583 obtains the minimum value among the values (8) in 43 sub-blocks forming one block. In other words, the minimum value detector 583 outputs the minimum value among the 32 values outputted consecutively from the maximum value in sub-block detector 591. Meanwhile, the maximum value detector 584 obtains the maximum value among the values (8) in 32 sub-blocks. That is, the maximum value detector 584 outputs the maximum value among the 32 values outputted consecutively from the maximum value in sub-block detector 591. Therefore, if the output of the minimum value detector 583 is very small, the block includes a flat part. When the output of the maximum value detector 584 is large, the subject block includes a large change.

Figure 42:
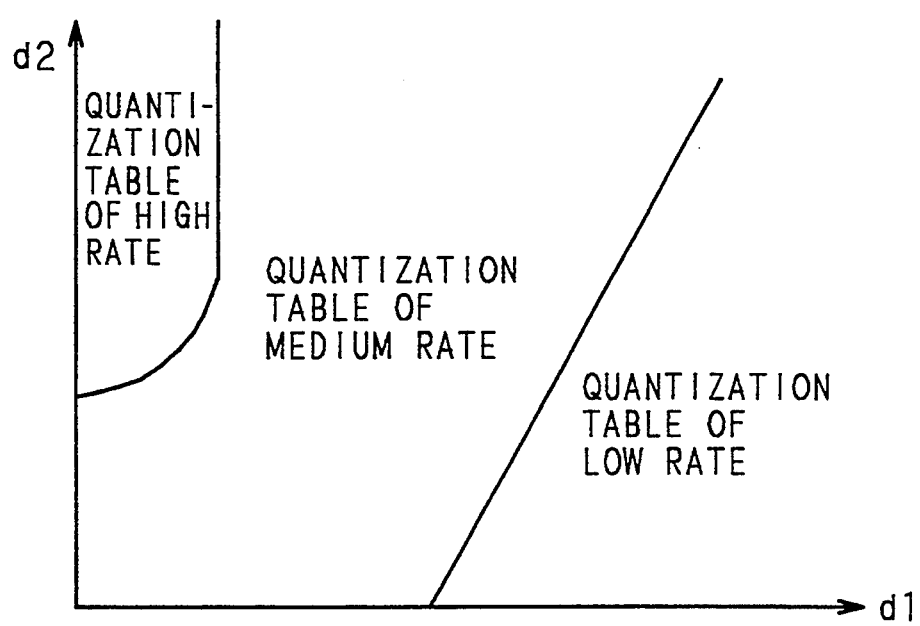
FIG. 42 is a conceptual diagram for explanation of the operation of a control signal generator in FIG. 39, 40.

The control signal generator 592 determines which of the quantization tables should be selected, on the basis of the outputs from the minimum value detector 583 and the maximum value detector 584. For example, a comparatively small value $\alpha'$ and a comparatively large value $\beta'$ are set beforehand, and when the output d1 of the minimum value detector 583 is not smaller than $\alpha'$, the quantization table of low rate is selected. When $d1 < \alpha'$ and the output d2 of the maximum value detector 584 is not larger than $\beta'$, the quantization table of medium rate is selected. On the other hand, when $d1 < \alpha'$ and $d2 > \beta'$, the quantization table of high rate is selected. Otherwise, the quantization table may be switched in accordance with a two-dimensional graph shown in FIG. 42. This method is readily applied even if there are three or more quantization tables.

Figure 43:
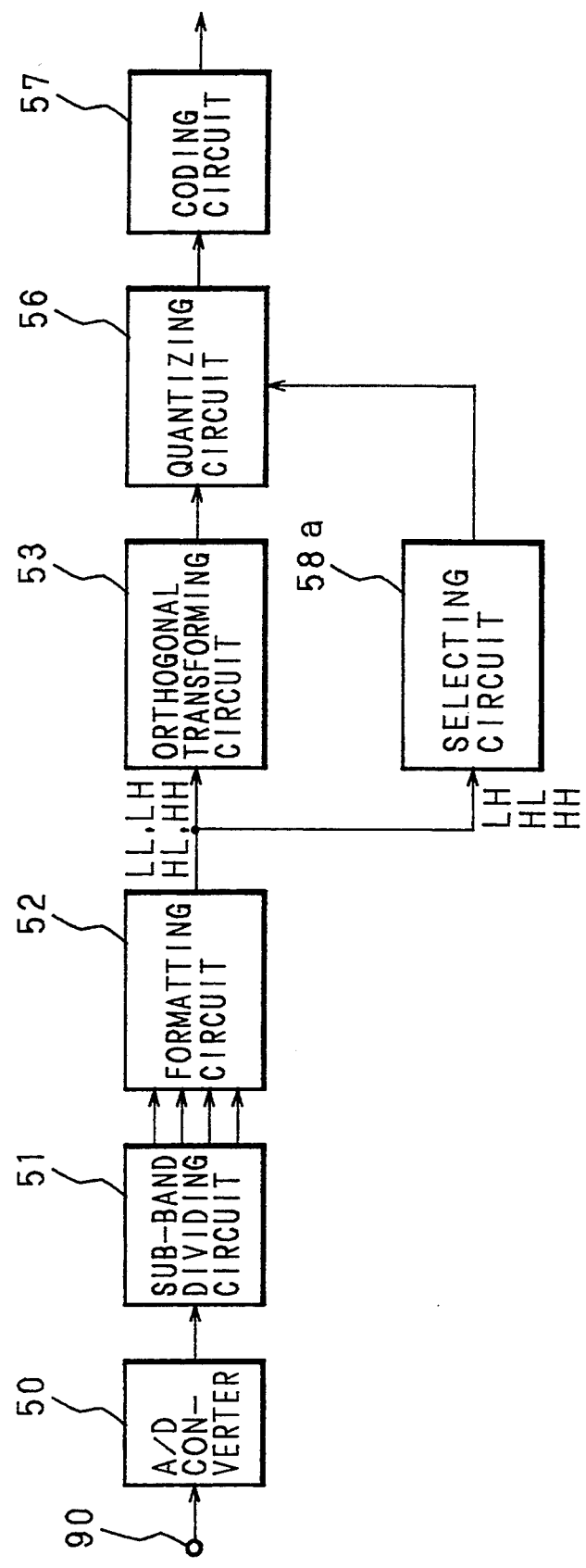
FIG. 43 is a block diagram showing the structure of a coding apparatus at the coding side according to this invention.

In the above embodiment, although the quantization table is selected by the use of the LH, HL bands of the sub-divided four components, it can be selected by using the LH, HL ,HH bands. Such example will be explained with reference to FIG. 43, in which the same parts are designated by the same reference numerals as in FIG. 35. 58a is a judging circuit which determines the quantization table by the use of the LH, HL, HH band blocks outputted from the block formatting circuit 52.

Figure 44:
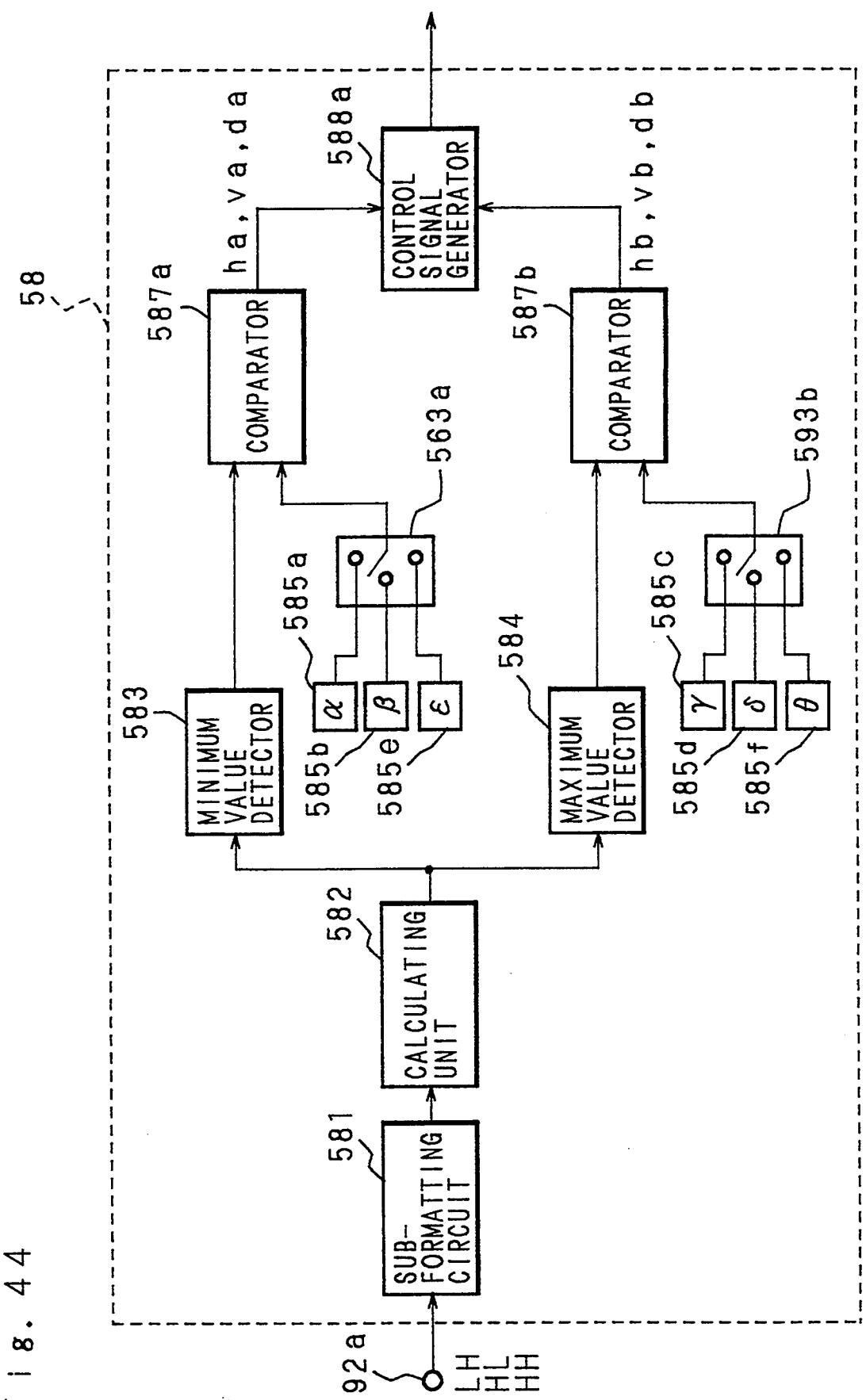
FIG. 44 is a block diagram showing the inner structure of a judging circuit of the apparatus in FIG. 43.

The structure of the circuit 58a is indicated by way of example in FIG. 44. The same parts are designated by the same reference numerals as in FIG. 39. The LH, HL, HH band blocks outputted from the block formatting circuit 52 are sequentially inputted through an input terminal 92a and divided into 32 sub-blocks at the sub-block formatting circuit 581. The calculating unit 582 obtains the maximum value among the absolute values of the value of picture elements in each sub-block. The output of the calculating unit 582 is inputted to the minimum and maximum value detectors 583 and 584. The minimum value detector 583 obtains the minimum value among the values in the 32 sub-blocks constituting one block outputted from the calculating unit 582. The maximum value detector 584 obtains the maximum value among the values in the 32 sub-blocks outputted from the calculating unit 582. The operation of these sub-block formatting circuit 581, calculating unit 582, minimum value detector 583 and maximum value detector 584 is the same as in the preceding embodiment.

Constant generators 585a, 585b, 585c, 585d, 585e, 485f output predetermined values $\alpha$, $\beta$, $\epsilon$, $\gamma$, $\sigma$, $\theta$ respectively. A switch 593a selects the predetermined value $\alpha$ of the constant generator 585a when the output from the minimum value detector 583 is a value of the LH band, and selects $\beta$ of the constant generator 585b when the output is a value of the HL band, and selects $\epsilon$ of the constant generator 585e when the output is a value of the HH band.

593b is a switch, which selects the predetermined value $\gamma$ of the constant generator 585c when the output from the maximum value detector 584 is a value of the LH band, and selects $\sigma$ of the constant generator 585d when the output is a value of the HL band, and selects $\theta$ of the constant generator 585f when the output is a value of the HH band.

When the output of the minimum value detector 583 is smaller than the output of the switch 593a, the comparator 587a outputs "1", and outputs "0" in other cases. The comparator 587b outputs "1" when the output of the maximum value detector 584 is larger than the output of the switch 593b, in other cases outputs "0". In other words, similar to the foregoing embodiment, the comparator 587a outputs "1" when the subject block includes a flat part, while the comparator 587b outputs "1" when the subject block includes a large change.

Since the LH, HL, HH band blocks are inputted through the input terminal 92a in this order, at first the comparators 587a, 587b output criteria ha, hb of the LH band block, and out criteria va, vb of the HL band block then, and finally output criteria da, db of the HH band block. These consecutive three outputs from the comparators 587a, 587b are inputted to a control signal generator 588a, whereby the quantization table is determined..

For example, when the quantizing circuit 56 holds three kinds of quantization tables, i.e., one having the finest quantizing step width is called a quantization table of high rate, one having a medium quantizing step width is called a quantization table of medium rate and one having a rough quantizing step width is called a quantization table of low rate. It is judged that the subject block has no flat part when ha=0 and va=0, the quantization table of low rate is selected at this time. When ha=1 or va=1, since the subject block includes a flat part, the quantization table of high rate is selected. Moreover, when hb=1 or vb=1 or db=1, the subject block includes a great change alike, the quantization table of high rate is selected. In the other cases than the above, the quantization table of medium rate is selected.

Although the quantization table is selected using the LH, HL, HH bands in the above-described embodiment, it is possible to use only one component of these bands.

In any of the foregoing embodiments, the sub-block formatting circuit 581 divides one block into 32 sub-blocks as shown in FIG. 41. However, the size of sub-block is not restricted to that of FIG. 41, i.e., 4 picture elements×4 lines, but can be a three-dimensional sub-block of 4 picture elements in the horizontal direction×2 picture elements in the vertical direction×2 fields in time axis. The size of the sub-block can be decided depending on the size of the block or the constitution of the hardware. Moreover, one block is not necessarily formed of 8 picture elements×8 lines×8 fields, but can be formed of any three-dimensional block or two-dimensional block as a unit of the orthogonal transform.

All of the foregoing embodiments are related to the case where the input signal is divided into four frequency bands. However, the quantization table can be selected by using high frequency components not only in such case as in the foregoing embodiments, but also when the input signal is divided into two frequency bands only in the horizontal direction or when the input signal is divided into 7 bands by repeatedly dividing the low frequency components into four. In other words, generally, when the signal is divided into any number of frequency bands, the same effect as in the foregoing embodiments can be achieved by judging whether the block includes a flat part and a part with a large change with the use of the high frequency components, and selecting the quantization table on the basis of the result.

A yet further embodiment of this invention will be discussed hereinbelow. In the coding apparatus according to the yet further embodiment, either the odd-number field or the even-number field of an inputted digital video signal in the interlaced scanning form is passed through a vertical filter with odd-number taps, while the other field is passed through a vertical filter with even-number taps.

Figure 45:
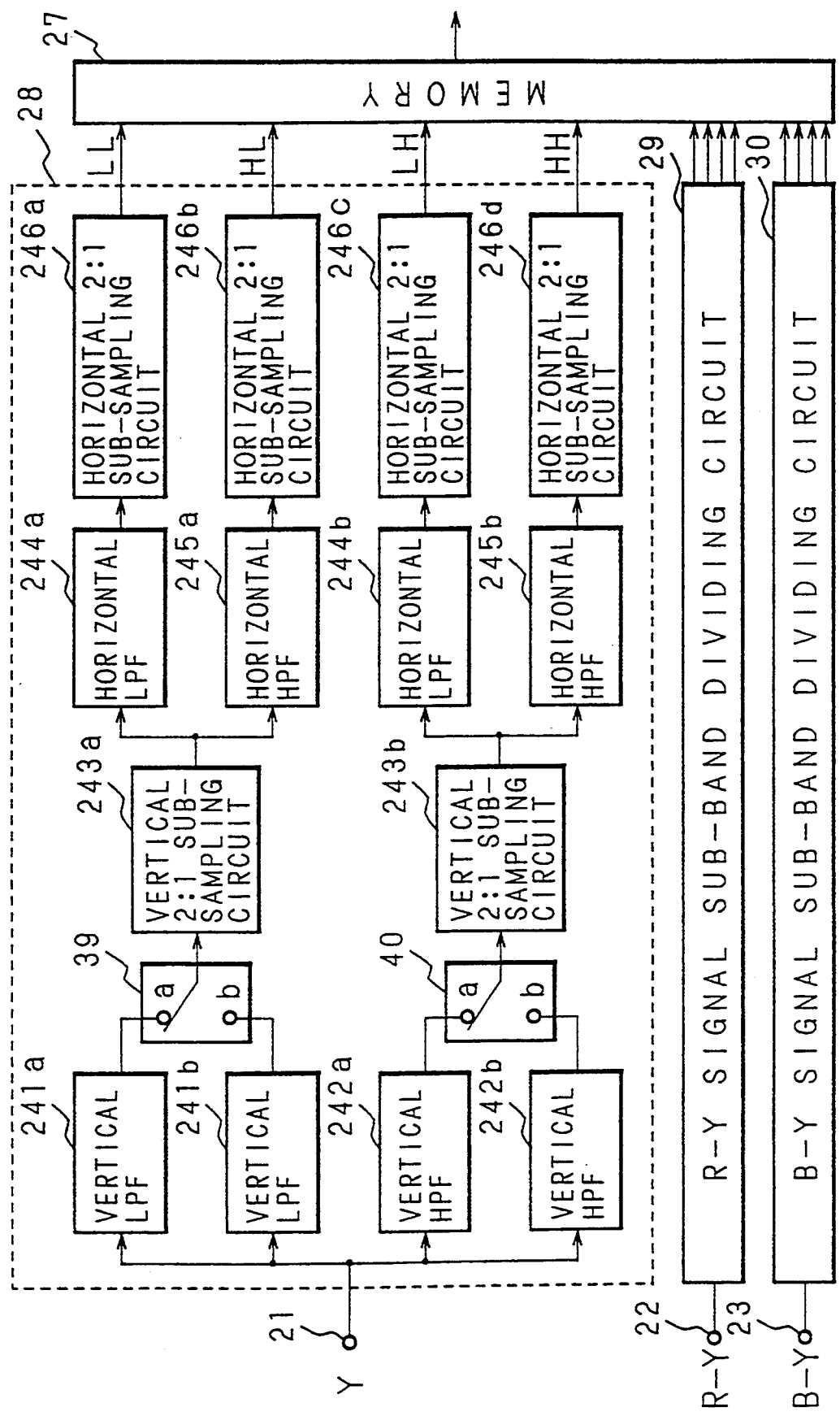
FIG. 45 is a block diagram showing the other inner structure of the sub-band dividing circuit of FIG. 17.

FIG. 45 is a block diagram showing the internal structure of the sub-band dividing circuit 5 according to the yet further embodiment. Parts of the circuit 5 designated by the same reference numerals as in FIG. 19 are identical to those in FIG. 19, with the description thereof being omitted here. A Y signal sub-band dividing circuit 28, an R-Y signal sub-band dividing circuit 29 and a B-Y signal sub band dividing circuit 30 within the sub-band dividing circuit 5 have the same inner structure, and therefore the structure of the Y signal sub band dividing circuit 28 will be described here by way of example. The vertical LPF 241 connected to the input terminal 21 is divided into a vertical LPF 241a and a vertical LPF 241b. Between the vertical LPFs 241a and 241b and a vertical 2:1 sub-sampling circuit 243a is interposed a switch 39. An output terminal of the vertical LPF 241a is connected to one terminal of the switch 39, while an output terminal of the vertical LPF 241b is connected to the other terminal b of the switch 39. Furthermore, the vertical HPF connected to the input terminal 21 is divided into a vertical HPF 242a and a vertical HPF 242b. A switch 40 is provided between the vertical HPFs 242a and 242b, and a vertical 2:1 sub-sampling circuit 243b, having one terminal a connected to an output terminal of the vertical HPF 242a and the other terminal b connected to an output terminal of the vertical HPF 242b.

Figure 46:
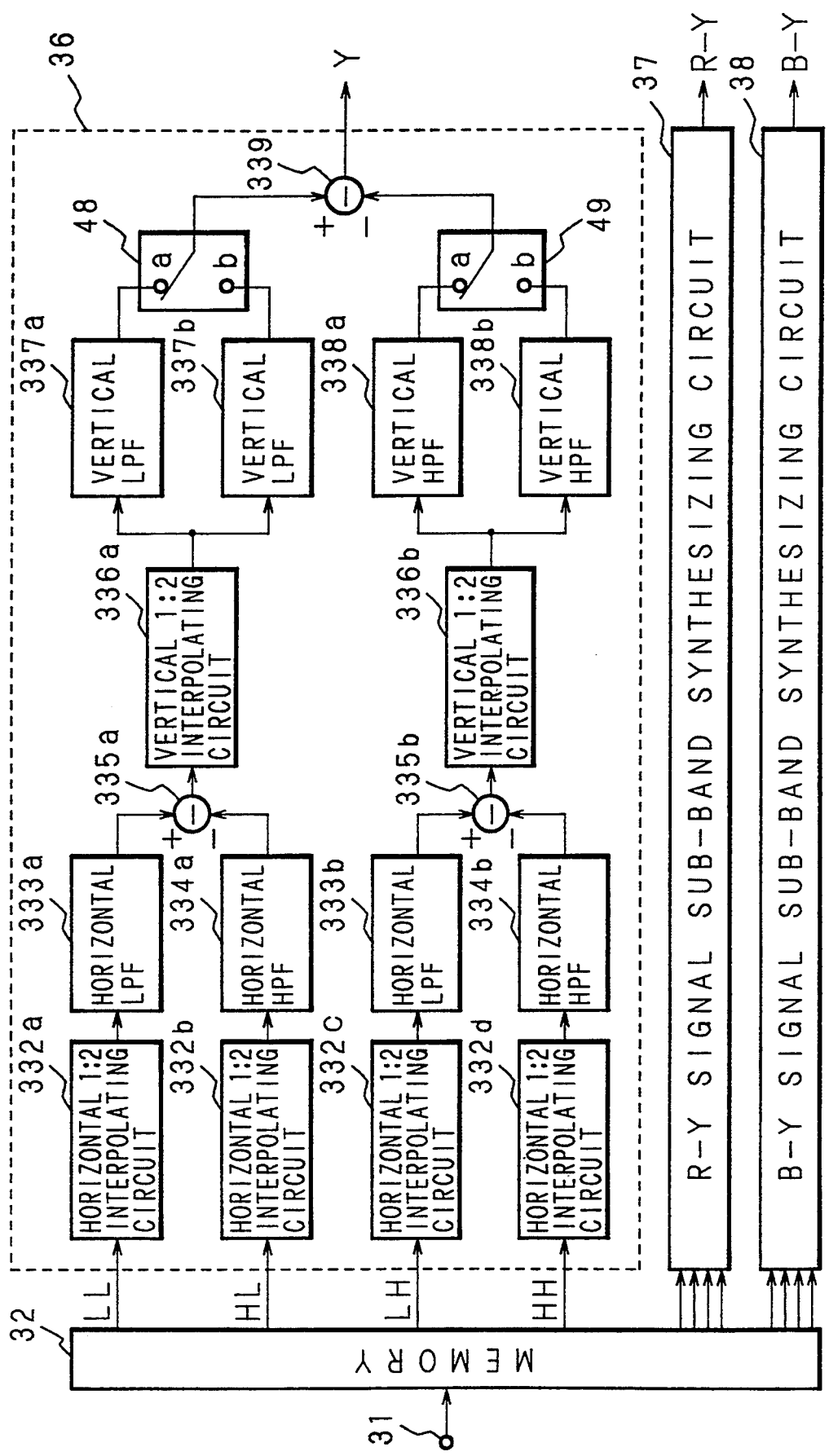
FIG. 46 is a block diagram showing the other inner structure of the sub-band synthesizing circuit of FIG. 18.

FIG. 46 is a block diagram showing the inner structure of the sub-band synthesizing circuit 14 of the coding apparatus according to the yet further embodiment. In FIG. 46, since parts denoted by the same reference numerals as in FIG. 20 are identical to those in FIG. 20, the description thereof will be omitted. A Y signal sub-band synthesizing circuit 36, an R-Y signal sub-band synthesizing circuit 37 and a B-Y signal sub-band synthesizing circuit 38 within the sub-band synthesizing circuit 14 have the same inner structure, and the following description is directed to the structure of the Y signal sub-band synthesizing circuit 36. The vertical LPF connected to the vertical 1:2 interpolating circuit 336a is divided into a vertical LPF 337a and a vertical LPF 337b. There is a switch 48 between the vertical LPFs 337a, 337b and a subtractor 339. One terminal a of the switch 48 is connected to an output terminal of the vertical LPF 337a, whereas the other terminal b of the switch 48 is connected to an output terminal of the vertical LPF 337b. Besides, the vertical HPF connected to the vertical 1:2 interpolating circuit 336b is divided into a vertical HPF 338a and a vertical HPF 338b. Another switch 49 is provided between the vertical HPFs 338a, 338b and subtractor 339, with one terminal a connected to an output terminal of the vertical HPF 338a and the other terminal b connected to an output terminal of the vertical HPF 338b.

Figure 47A:
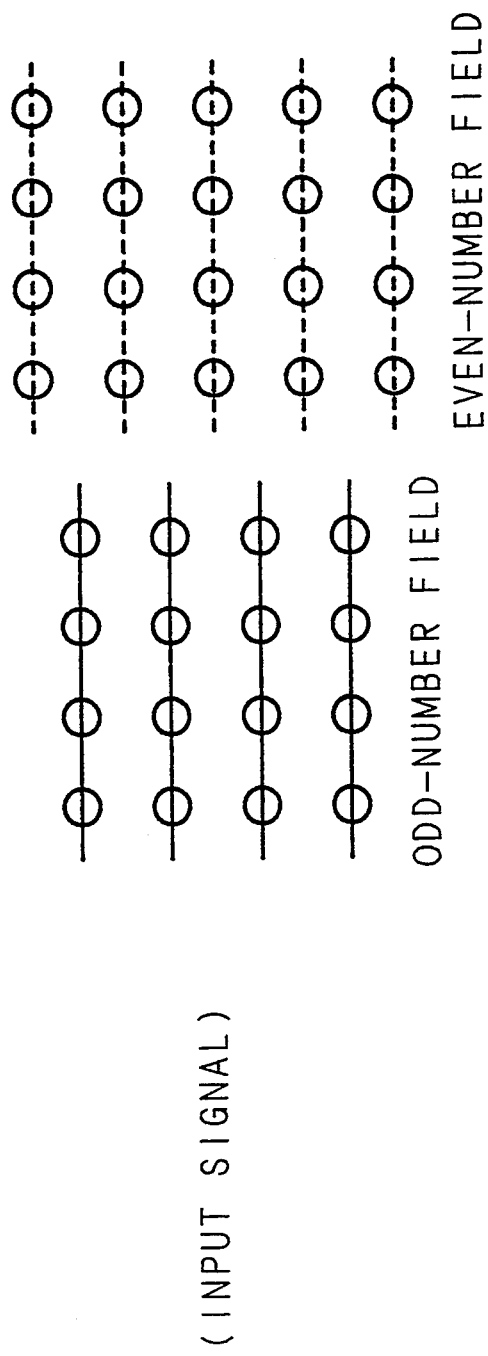
FIGS. 47(a)-(b) are a diagram indicating the spatial sampling position in this invention.
Figure 47B:
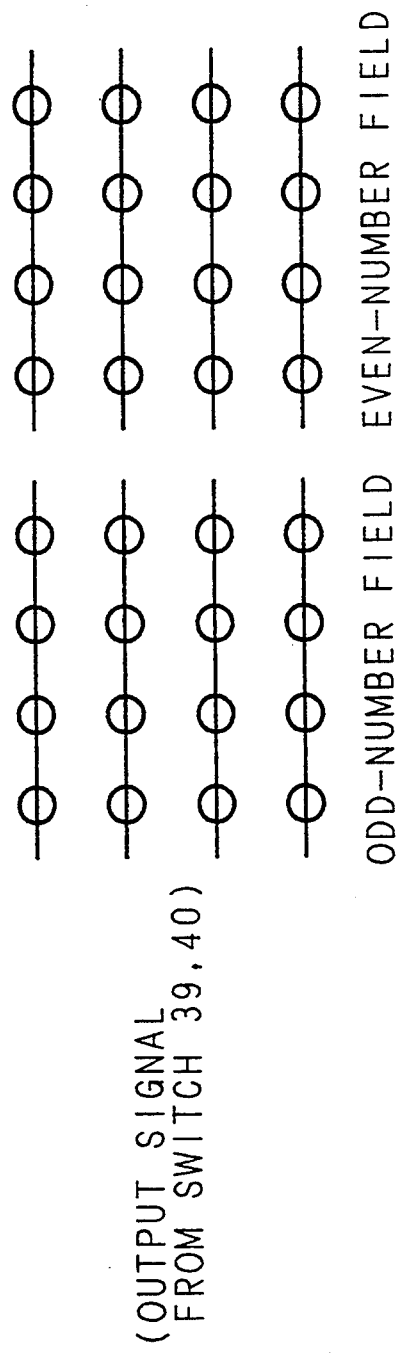

The coding apparatus in the above-discussed structure operates in a manner as follows. A Y signal inputted through the input terminal 21 is divided into four frequency bands at the Y signal sub-band dividing circuit 28. The operation of the Y signal sub-band dividing circuit 28 will now be discussed more in detail. The input Y signal passes through the vertical LPFs 241a and 241b. The switch 39 switches its terminals a and b by each field. For example, the switch 39 selects the terminal a for the odd-number field, while selects the terminal b for the even-number field. Therefore, in the case of the odd-number field, Y signal passing through the vertical LPF 241a with the odd-number taps is outputted. On the other hand, in the case of the even-number field, Y signal passing through the vertical LPF 241b with the even-number taps is outputted. As a result, the outputs from the switch 39 have the same sampling position in space for both the odd-number and in the even-number fields. The subsequent operation goes in the same manner as in the example of FIG. 19. Meanwhile, the inputted Y signal from the inputted terminal 21 passes through the vertical HPFs 242a and 242b as well. The switch 40 switches the terminals a and b by each field, e.g., it selects the terminal a for the odd-number field or the terminal b for the even-number field. As a result, Y signal passing through the vertical HPF 242a with the odd-number tap is outputted in the case of odd-number field, while Y signal passing through the vertical HPF 242b of the even-number taps is outputted in the case of even-number field. Therefore, the output from the switch 40 has, as indicated in FIG. 47, the same sampling position in space for both the odd-number and in the even-number fields. The operation subsequent to the above is the same as in FIG. 19. Further, the R-Y signal sub-band dividing circuit 29 and B-Y signal sub-band dividing circuit 30 operate in the same manner as the Y signal sub-band dividing circuit 28 discussed hereinabove.

Figure 48:
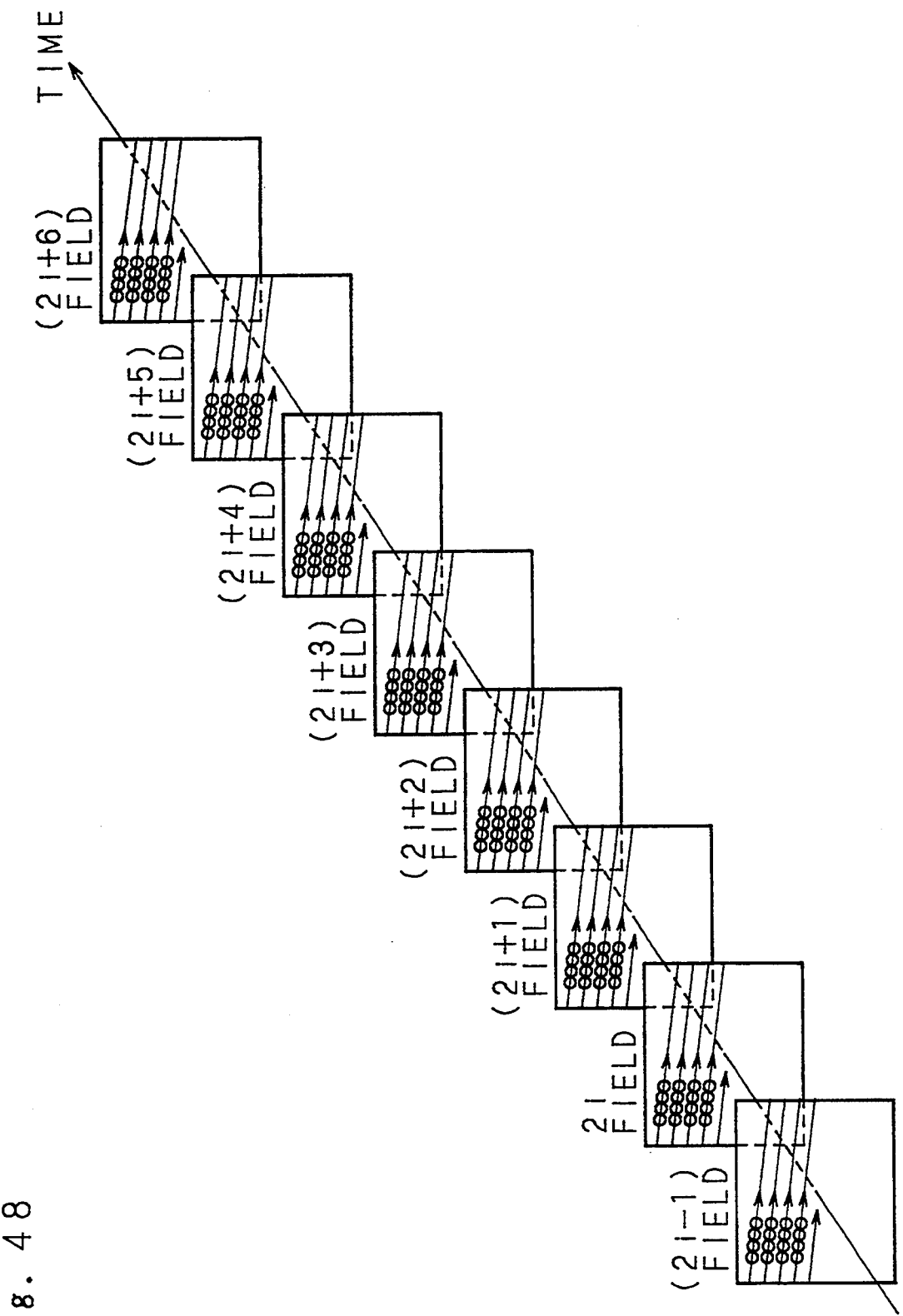
FIG. 48 is a conceptual diagram of the structure of a three-dimensional block of this invention.

FIG. 48 is explanatory of the case where a three-dimensional block composed of 4 picture elements in the horizontal direction 4 picture elements in the vertical direction×8 fields in time axis is outputted from the memory 27. Since each component has the same sampling position in space for both the odd-number and the even-number fields, picture elements within the block are aligned in latticework even when the odd-number and even-number fields are mixed.

The operation at the decoding side will be explained below. The operating process until the vertical 1:2 interpolating circuit 336a in the LL, HL bands goes in the same manner as in the example of FIG. 20, and therefore the description will be omitted here. The output from the vertical 1:2 interpolating circuit 336a is inputted to the vertical LPF 337a with the odd-number taps and the vertical LFP 337b with the even-number taps. When the terminal a of the switch 48 is selected for the odd-number field, the signal passing through the vertical LPF 337a with the odd-number taps is outputted to the subtractor 339. On the other hand, when the terminal b of the switch 48 is selected for the even-number field, the signal passing through the vertical LPF 337b with the even-number taps is outputted to the subtractor 339. Further, since the operating process until the vertical 1:2 interpolating circuit 336b in the LH, HH band goes the same as in FIG. 20, the description thereof will be omitted. The output from the vertical 1:2 interpolating circuit 336b is inputted to the vertical HPF 338a with the odd-number taps and to the vertical HPF 338b with the even-number taps. In the case of the odd-number field, the terminal a of the switch 49 is selected thereby to output the signal passing through the vertical HPF 338a with the odd-number taps to the subtractor 339. On the contrary, in the case of the even-number field, the terminal b of the switch 49 is selected thereby to output the signal passing through the vertical HPF 338b with the even-number taps to the subtractor 339. At the subtractor 339, the output of the switch 49 is subtracted from the output of the switch 48. In consequence, the original Y signal of one field is outputted. The R-Y signal sub-band synthesizing circuit 37 and B-Y signal sub-band synthesizing circuit 38 operate in the same manner as the above-described Y signal sub band synthesizing circuit 36.

In the above embodiment, a three-dimensional block is formed by bundling both the odd-number and the even-number fields after aligning the spatial sampling position thereof, and is processed by three-dimensional orthogonal transform. Accordingly, even a digital video signal in the interlaced scanning form can be compressed.

Figure 49:
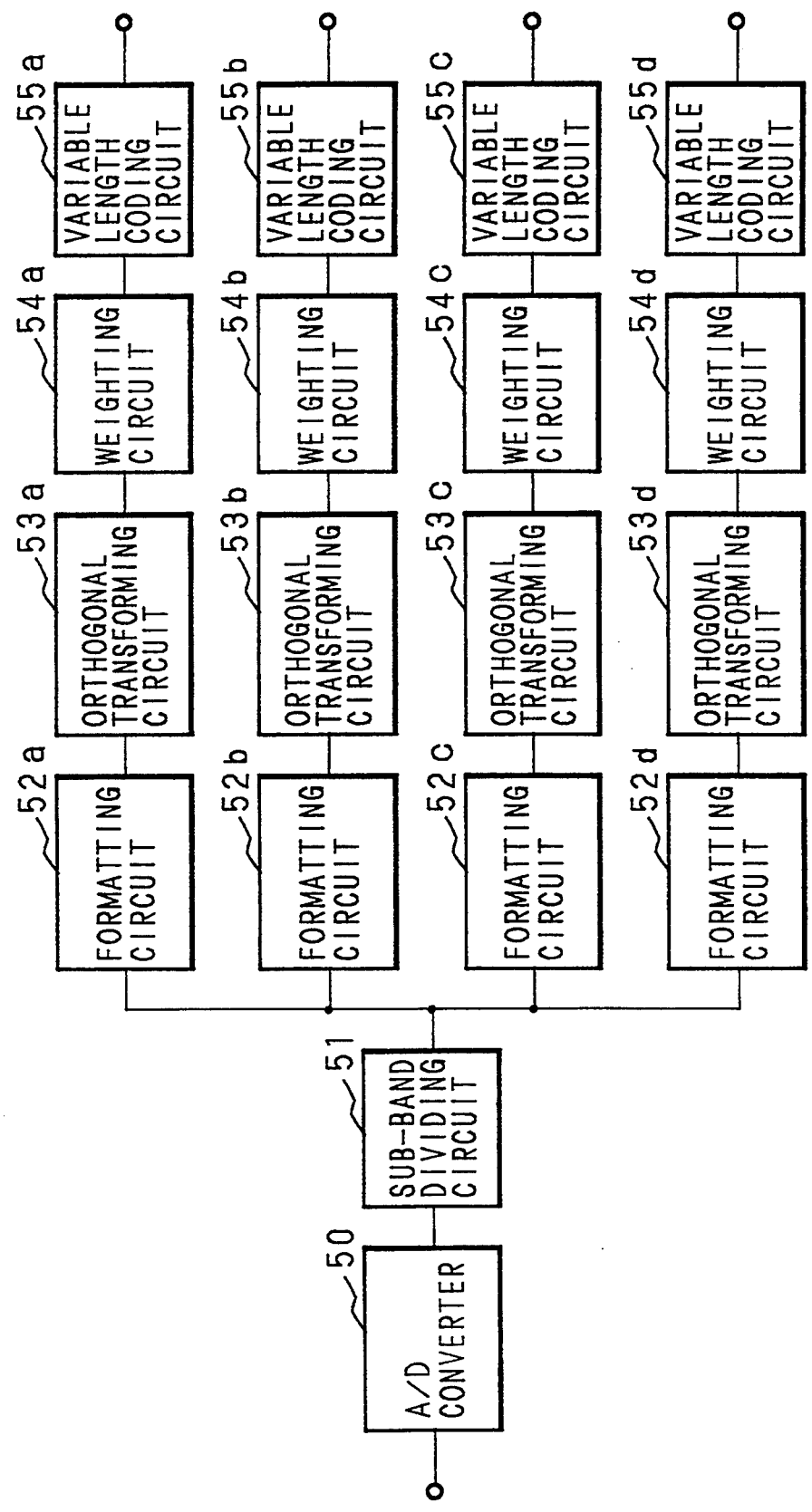
FIG. 49 is a block diagram showing the structure of a coding apparatus at the coding side according to this invention.

A still further embodiment of this invention will be discussed hereinbelow. According to the still further embodiment, the weighting method is changed in each sub-band. FIG. 49 shows a block diagram of a coding apparatus of the still further embodiment at the coding side, wherein the parts denoted by the same reference numerals as in FIG. 38 indicate the same parts.

A digital video signal is frequency-divided at the sub-band dividing circuit 51 in two steps, namely in the horizontal and in the vertical directions, into four kinds of sub-band signals. The sub-band signals are outputted to block formatting circuits 52a, 52b, 82c, 52d respectively. Each block formatting circuit 52a 52b, 82c, 52d forms every plurality of picture elements into a block, and outputs the obtained block to respective orthogonal transforming circuit 53a, 53b, 53c, 53d. The orthogonal transforming circuits 53a, 53b, 53c, 53d process the block by, e.g., three-dimensional DCT, and outputs the resultant coefficients to weighting circuits 54a, 54b, 54c, 54d respectively. On the basis of the frequency response of each sub-band, the weighting circuits 54a, 54b, 54c, 54d perform weighting on the coefficients outputted from the orthogonal transforming circuits 53a, 53b, 83c, 53d, and output the weighted coefficients to variable length coding circuits 85a, 55b, 55c, 55d respectively. Each of the variable length coding circuits 55a, 55b, 55c, 55d performs variable length coding on the output of the respective weighting circuit 54a, 54b, 54c, 54d.

The coding apparatus of the instant embodiment operates in the following manner.

Every plurality of picture elements, e.g., 8 picture elements $\times$ 8 lines $\times$ 8 fields of each sub-band signal from the sub-band dividing circuit 51 are formed into a block at respective block formatting circuits 52a, 52b, 52c, 52d. A block Xo (i,j,k) (i: horizontal direction, j: vertical direction, k: time direction, i,j,k=0, 1, ..., 7) is outputted from each block formatting circuit 52a, 52b, 52c, 52d to the respective orthogonal transforming circuit 53a, 53b, 53c, 53d. These blocks are processed by three-dimensional DCT at the orthogonal transforming circuits 53a, 53b, 53c, 53d, and as a result, $8 \times 8 \times 8$ coefficients X (i,j,k) (i,j,k=0, 1, ..., 7) are outputted to the weighting circuits 54a, 54b, 54c, 54d. The coefficients outputted from the orthogonal transforming circuits 53a, 53b, 53c, 53d to the weighting circuits 54a, 54b, 54c, 54d are processed by weighting. The weighting circuit 54a corresponds to the LL band, weighting circtuit 54b to the LH band, weighting circuit 54c to the HL band, and weighting circuit 54d to the HH band. The outputs from the weighting circuits 54a, 54b, 54c, 54d are variable length coded at the variable length coding circuits 55a, 55b, 55c, 55d respectively.

The operation of each weighting circuit 54a, 5b, 54c, 54d and the size of the weighting thereat will explained below.

From the result of Tables 2 and 3, in a block within the two-dimension plane, the power distribution is concentrated in the periphery (i,j)=(0,0) in the LL band, and therefore it is suitable that a large weighting is performed on the coefficient at the upper left being the lower sequence both in the horizontal and in the vertical directions as shown in FIG. 50(a), and a small weighting is performed on the coefficient being the higher sequence.

From the result of Tables 6 and 7, in a block within the two-dimensional plane, since the power distribution is concentrated in the periphery (i,j)=(0,7) in the LH band, it is suitable, as indicated in FIG. 50(b), that a large weighting is performed on the coefficient at the lower left being the lower sequence in the horizontal direction and the higher sequence in the vertical direction, while a small weighting is performed on the coefficient being the higher sequence in the horizontal direction and the lower sequence in the vertical direction.

Moreover, from the result of Tables 4 and 5, in a block within the two-dimensional plane, the power distribution is concentrated in the periphery (i,j)=(7,0) in the HL band, it is suitable that a large weighting is performed on the coefficient at the upper right being the higher sequence in the horizontal direction and the lower sequence in the vertical direction, as shown in FIG. 50(c), and a small weighting is performed on the coefficient being the lower sequence in the horizontal direction and the higher sequence in the vertical direction.

From the result of Tables 8 and 9, in a block within the two-dimensional plane, since the power distribution is concentrated in the periphery (i,j)=(7,7) in the HH band, it is suitable that as shown in FIG. 50(d), a large weighting is performed on the coefficient at the lower right being the higher sequence both in the horizontal and in the vertical directions, while a small weighting is performed on the coefficient being the lower sequence both in the horizontal and in the vertical directions.

As to the values in time axis in each Table, the power distribution is concentrated on the plane k=0 in any band. The higher the sequence k becomes, the smaller the power distribution is. Therefore, a large weighting should be performed on the coefficient with the lower sequence of k, and a small weighting should be performed on the coefficient with the higher sequence of k. Furthermore, since the human eye is dull to a high spatial frequency, it is preferable that a large weighting is performed in the LL band where low spatial frequencies are concentrated and a small weighting is performed in the HH band where high spatial frequencies are concentrated.

In consideration of the above fact, in order to connect the four sub-bands smoothly in the horizontal and in the vertical frequency directions, the weighing factor in each sub-band is decided as follows.

A weighting factor $W_{LL}(i,j,k)$ for the LL band is set according to the following equation;

$$W_{LL}(i,j,k) = \left\{1 - \frac{1-\alpha_1}{7}i\right\}\left\{1 - \frac{1-\alpha_1}{7}j\right\}\left\{1 - \frac{1-\alpha_t}{7}k\right\}$$

$(i, j, k = 0, 1, \ldots, 7)$
$(2/3 < \alpha 1 \leq 1, 0 < \alpha < 1)$

Similarly, weighting factors $W_{LH}(i,j,k)$, $W_{HL}(i,j,k)$, $W_{HH}(i,j,k)$ for the LH, HL, HH bands are set according to the following equations, respectively;

$$W_{LH}(i,j,k) = \left\{1 - \frac{1-\alpha_1}{7}i\right\}\left(\alpha_1 - \frac{1-\alpha_1}{7}(7-j)\right)\left\{1 - \frac{1-\alpha_t}{7}k\right\}$$

$(i, j, k = 0, 1, \ldots, 7)$
$(2/3 < \alpha_1 \leq 1, 0 < \alpha_t \leq 1)$ $$W_{HL}(i,j,k) = \left(\alpha_1 - \frac{1-\alpha_1}{7}(7-i)\right)\left\{1 - \frac{1-\alpha_1}{7}j\right\}\left\{1 - \frac{1-\alpha_t}{7}k\right\}$$

$(i, j, k = 0, 1, \ldots, 7)$
$(2/3 < \alpha_1 \leq 1, 0 < \alpha_t \leq 1)$ $$W_{HH}(i,j,k) = \left(\alpha_1 - \frac{1-\alpha_1}{7}(7-i)\right)\left(\alpha_1 - \frac{1-\alpha_1}{7}(7-j)\right)\left\{1 - \frac{1-\alpha_t}{7}k\right\}$$

$(i, j, k = 0, 1, \ldots, 7)$
$(2/3 < \alpha_1 \leq 1, 0 < \alpha_t \leq 1)$

An effective weighting is achieved in each sub-band in the manner as described hereinabove.

Although the three-dimensional DCT is used for the orthogonal transform in the above embodiment, two-dimensional DCT can be employable. In such case, a coefficient RMS of the two-dimensional DCT has a similar tendency as the RMS in the two-dimensional plane in the three-dimensional DCT, and therefore, the weighting factors $W_{LL}(i,j)$, $W_{LH}(i,j)$, $W_{HL}(i,j)$, $W_{HH}(i,j)$ for the LL, LH, HL, HH bands are set respectively as follows;

$$W_{LL}(i,j) = \left\{1 - \frac{1-\alpha_1}{7}i\right\}\left\{1 - \frac{1-\alpha_1}{7}j\right\}$$

$(i, j = 0, 1, \ldots, 7)$
$(2/3 < \alpha_1 \leq 1)$ $$W_{LH}(i,j) = \left\{1 - \frac{1-\alpha_1}{7}i\right\}\left(\alpha_1 - \frac{1-\alpha_1}{7}(7-j)\right)$$

$(i, j = 0, 1, \ldots, 7)$
$(2/3 < \alpha_1 \leq 1)$ $$W_{HL}(i,j) = \left(\alpha_1 - \frac{1-\alpha_1}{7}(7-i)\right)\left\{1 - \frac{1-\alpha_1}{7}j\right\}$$

$(i, j = 0, 1, \ldots, 7)$
$(2/3 < \alpha_1 \leq 1)$ $$W_{HH}(i,j) = \left(\alpha_1 - \frac{1-\alpha_1}{7}(7-i)\right)\left(\alpha_1 - \frac{1-\alpha_1}{7}(7-j)\right)$$

$(i, j = 0, 1, \ldots, 7)$
$(2/3 < \alpha_1 \leq 1)$

Figure 51:
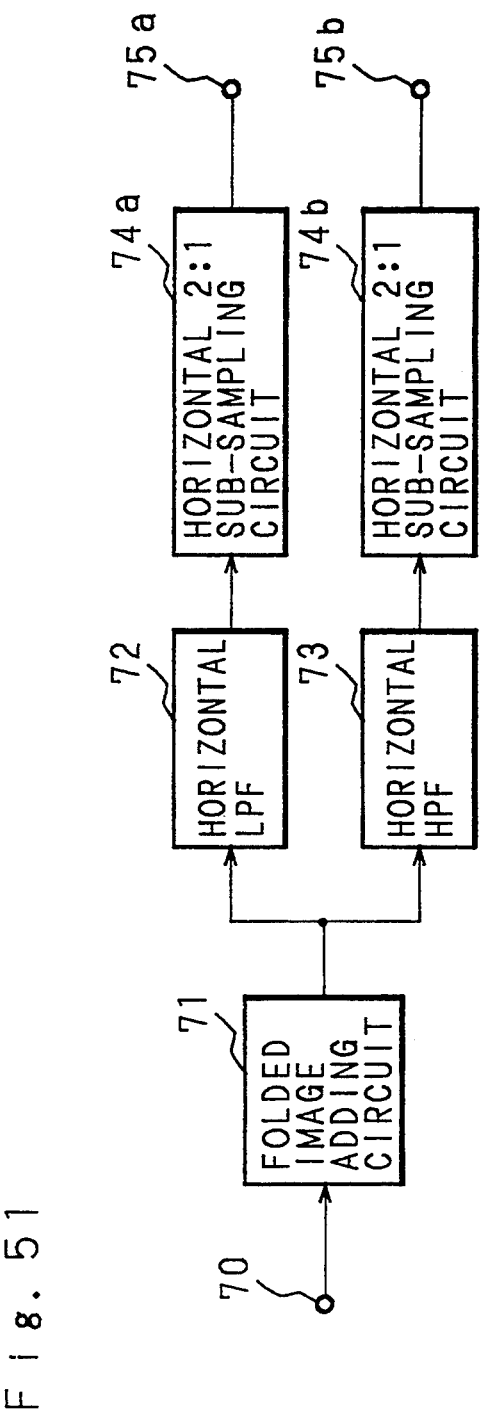
FIG. 51 is a block diagram showing the structure of a sub-band dividing circuit of this invention.
Figure 52:
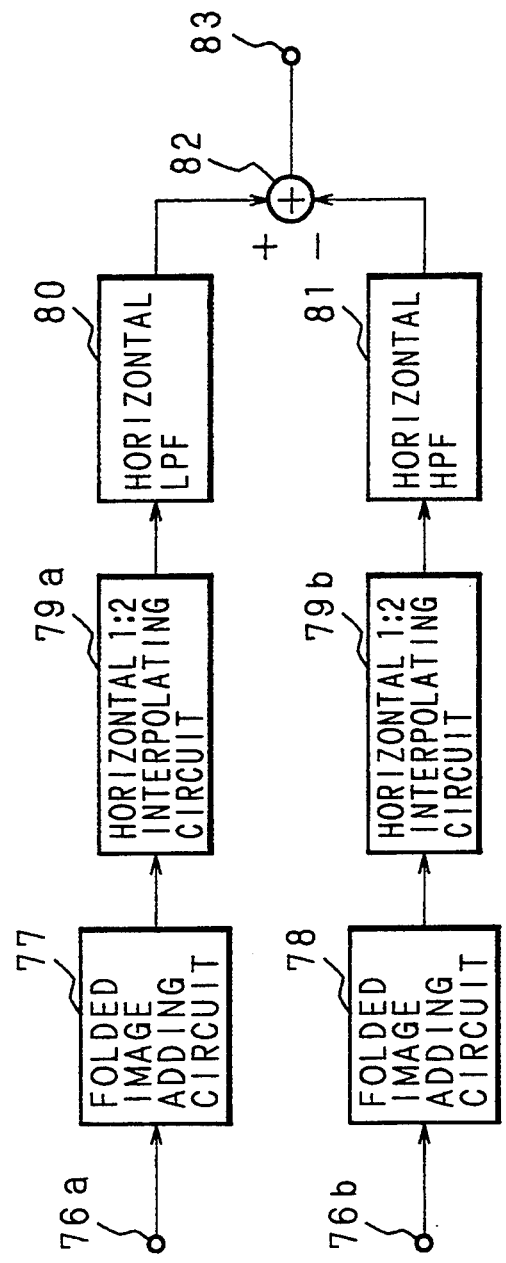
FIG. 52 is a block diagram showing the structure of a sub-band synthesizing circuit of this invention.

Hereinbelow, the dividing and combining method of frequency bands according to this invention will be discussed. FIGS. 51 and 52 illustrate a sub band dividing and a sub-band synthesizing circuits when the horizontal frequency band is separated into two. Referring to FIG. 51 showing the structure of the sub band dividing circuit, 70 is an input terminal of a digital video signal. The sub band dividing circuit is provided with a folded image adding circuit 71 for folding an image inputted through the input terminal 70 at an end point thereof and adding it, a horizontal LPF 72 and horizontal HPF 73 with even-number taps for restricting the horizontal frequencies of the image outputted from the circuit 71, and horizontal 2:1 sub-sampling circuits 74a, 74b for reducing the number of picture elements in the horizontal direction of the outputs of the horizontal LPF 72 and HPF 73 to half respectively. 75a, 75b are output terminals of the horizontal 2:1 sub-sampling circuits 74a, 74b respectively.

In FIG. 52 showing the structure of the sub-band synthesizing circuit, 76a, 76b are input terminals of the separated bands as above. The sub-band synthesizing circuit is provided with a folded image adding circuit 77 for folding an image inputted through the input terminal 76a at an end point thereof and adding it, a folded image adding circuit 78 for folding the image inputted through the input terminal 76b at an end point thereof and multiplying it with −1 and adding it, horizontal 1:2 interpolating circuits 79a, 79b for interpolating the images from the circuits 77, 78 with 0 thereby to increase the number of picture elements in the horizontal direction twice, a horizontal LPF 80 with an even-number taps for restricting the horizontal frequencies of the output from the circuit 79a, a horizontal HPF 81 with even-number taps for restricting the horizontal frequencies of the output of the horizontal 1:2 interpolating circuit 79b, and a calculating unit 82 for reducing the output of the horizontal HPF 81 from the output of the horizontal LPF 80. 83 is an output terminal of the calculating unit 82.

The operation of the sub-band synthesizing circuit will be described with reference to FIGS. 53(a)-(g) explanatory of the concept of signals outputted from each part of the circuit. An image folded at an end point of the image at the folded image adding circuit 71 is added to the video signal inputted the input terminal 70. More specifically, a folded image as represented by (9) below is added to the video signal with an image of, for example, 704 picture elements ×240 lines by each line signal x(n) (n=1, ..., 704) (FIGS. 53(b)).

$$\begin{cases} x(1-n) = x(n) \\ x(704+n) = x(705-n) \end{cases} \quad (9)$$

$$(n = 1, \ldots, 704)$$

The output of the folded image adding circuit 71 is inputted to the horizontal LPF 72 and horizontal HPF 73. The horizontal LPF 72 is a low pass filter of a linear phase of even-number taps, and the factor h1(n) (n=0, ..., $N_1-1$; $N_1$ being an even number) thereof is $$h1(n) = h1(N_1 - n - 1) \quad n = 0, \ldots, (N_1/2) - 1 \quad (10)$$

In other word, the horizontal LPF 72 outputs a signal expressed by an equation (11) below by signal x(n) of each line (FIG. 53(c));

$$\begin{aligned} y_1(n) &= \sum_{k=0}^{N_1-1} h_1(k) \cdot x\left(n + \frac{N_1}{2} - k\right) \\ &= \sum_{k=0}^{(N_1/2)-1} h_1(k) \cdot \left\{ x\left(n + \frac{N_1}{2} - k\right) + x\left(n - \frac{N_1}{2} + 1 + k\right) \right\} \end{aligned} \quad (11)$$

$$(n = 1, \ldots, 704)$$

Meanwhile, the horizontal HPF 73 is a high pass filter of a linear phase with even-number taps, and the factor h2(n) (n=0, ..., $N_2-1$; $N_2$ being an even number) thereof is $$h2(n) = -h2(N_2 - n - 1) \quad n = 0, \ldots, (N_2/2) - 1 \quad (12)$$

That is, the horizontal HPF 73 outputs a signal expressed by an equation (13) by a signal x(n) of each line (FIG. 53(c));

$$\begin{aligned} y_2(n) &= \sum_{k=0}^{N_2-1} h_2(k) \cdot x\left(n + \frac{N_2}{2} - k\right) \\ &= \sum_{k=0}^{(N_2/2)-1} h_2(k) \cdot \left\{ x\left(n + \frac{N_2}{2} - k\right) - x\left(n - \frac{N_2}{2} + 1 + k\right) \right\} \end{aligned} \quad (13)$$

$$(n = 1, \ldots, 704)$$

The outputs of the horizontal LPF 72 and horizontal HPF 73 are thinned out at the horizontal 2:1 sub-sampling circuit 74a, 74b respectively, so that the number of picture elements in the horizontal direction is reduced to half. The outputs are then outputted from the output terminal 75a, 75b (FIG. 53(d)). The sub-band dividing circuit operates in the manner as discussed hereinabove.

Two outputs divided into sub-blocks are coded by predictive coding, orthogonal transform, etc. At the coding side, after the signals are decoded, the sub-bands are combined.

The signals of each divided sub-band are inputted to the input terminals 76a, 76b. That is, the signals inputted through the input terminals 76a, 76b are identical to the signals outputted from the output terminals 75a, 75b respectively if there is no distortion in coding/decoding. Therefore, each line of the image inputted through the inputted terminals 76a, 76b is expressed by y1(n), y2(n) (n =1, 3, 5, ..., 703) respectively. The folded image adding circuit 77 folds the image input through the input terminal 76a at the end point thereof and adds it i.e., the following equation (14) is held;

$$\begin{cases} y1(-n) = y1(n) \\ y1(704 + n) = y1(704 - n) \end{cases} \quad (14)$$

$$(n = 1, 3, 5, \ldots, 703)$$

The sub-band dividing circuit does not output the added folded image. However, if the folded image is calculated at the horizontal LPF 72, the following are satisfied by the equation (9) and (11);

$$\begin{aligned} y_1(-n) &= \sum_{k=0}^{(N_1/2)-1} h_1(k) \cdot \left\{ x\left(-n + \frac{N_1}{2} - k\right) + x\left(-n - \frac{N_1}{2} + 1 + k\right) \right\} \\ &= \sum_{k=0}^{(N_1/2)-1} h_1(k) \cdot \left\{ x\left(1 + n - \frac{N_1}{2} + k\right) + x\left(n + \frac{N_1}{2} - k\right) \right\} \\ &= y_1(n) \quad (n = 1, \ldots, 704) \end{aligned}$$

$$\begin{aligned} y_1(704 + n) &= \sum_{k=0}^{(N_1/2)-1} h_1(k) \cdot \left\{ x\left(704 + n + \frac{N_1}{2} - k\right) + x\left(705 + n - \frac{N_1}{2} + k\right) \right\} \\ &= \sum_{k=0}^{(N_1/2)-1} h_1(k) \cdot \left\{ x\left(705 - n - \frac{N_1}{2} + k\right) + x\left(704 - n + \frac{N_1}{2} - k\right) \right\} \\ &= y_1(704 - n) \quad (n = 1, \ldots, 704) \end{aligned}$$

Therefore, when the folded image is added at the folded image adding circuit 77 as indicated in the equation (14), the image can be correctly reproduced at the sub-band synthesizing circuit without transmiting the image folded at the sub-band dividing circuit. The output of the folded image adding circuit 77 is interpolated with 0 at the horizontal 1:2 interpolating circuit 79a, and consequently the number of picture elements in the horizontal direction is increased twice. In other words, each line of the image outputted from the horizontal 1:2 interpolating circuit 79a is, as indicated in FIG. 53(e), expressed as follows;

$$y1'(n) = \begin{cases} y1(n) & (n: \text{an odd number}) \\ 0 & (n: \text{an even number}) \end{cases}$$

The output from the horizontal 1:2 interpolating circuit 79a is inputted to the horizontal LPF 80. The horizontal LPF 80 is a low pass filter with even-number taps. Supposing that the factor thereof is g1(n) (n=0, outputs a signal described below by each line y1'(n) (n=−703, −702, ... , 1407) of the image outputted from the horizontal 1:2 outputted from interpolating circuit 79a (FIG. 53(g));

$$x_1(n) = \sum_{k=0}^{N_3-1} g_1(k) \cdot y_1'\left(n + \frac{N_3}{2} - 1 - k\right)$$

On the other hand, the folded image adding circuit 78 folds the image inputted through the input terminal 76b and multiplies it with −1 and adds it. Namely, each line y2(n) (n=1, 3, 5, ... , 703) of the image inputted through the input terminal 76b becomes as represented by (15) below;

$$\begin{cases} y2(-n) = -y2(n) \\ y2(704+n) = -y2(704-n) \end{cases} \quad (15)$$

$$(n = 1, 3, 5, \ldots, 703)$$

Supposing that the horizontal HPF 73 calculates the folded image at the sub-band dividing circuit, the following are satisfied by the equations (9) and (13);

$$y_2(-n) = \sum_{k=0}^{(N_2/2)-1} h_2(k) \cdot \left\{ x\left(-n + \frac{N_2}{2} - k\right) - x\left(-n - \frac{N_2}{2} + 1 + k\right) \right\}$$

$$= \sum_{k=0}^{(N_2/2)-1} h_2(k) \cdot \left\{ x\left(1 + n - \frac{N_2}{2} + k\right) - x\left(n + \frac{N_2}{2} - k\right) \right\}$$

$$= -y_2(n)$$

$$(n = 1, \ldots, 704)$$

$$y_2(704 + n) = \sum_{k=0}^{(N_2/2)-1} h_2(k) \cdot$$

$$\left\{ x\left(704 + n + \frac{N_2}{2} - k\right) - x\left(705 + n - \frac{N_2}{2} + k\right) \right\}$$

$$= \sum_{k=0}^{(N_2/2)-1} h_2(k) \cdot$$

$$\left\{ x\left(705 - n - \frac{N_2}{2} + k\right) - x\left(704 - n + \frac{N_2}{2} - k\right) \right\}$$

$$= -y_1(704 - n)$$

$$(n = 1, \ldots, 704)$$

Accordingly, if the folded image is added as expressed by the equation (15) at the folded image adding circuit 78, the image becomes correctly reproduced in the sub-band synthesizing circuit without transmitting the image folded at the sub-band dividing circuit. The output of the folded image adding circuit 78 is interpolated with 0 at the horizontal 1:2 interpolating circuit 79b, thereby increasing the number of picture elements in the horizontal direction twice. Each line is expressed as follows as indicated in FIG. 53(f);

$$y2'(n) = \begin{cases} y2(n) & (n: \text{an odd number}) \\ 0 & (n: \text{an even number}) \end{cases}$$

The output of the horizontal 1:2 interpolating circuit 79b is inputted to the horizontal HPF 81 which is a high pass filter with even-number taps. When the factor of the horizontal HPF 81 is g2(n) (n=0, ... , $N_4$−1; $N_4$ being an even number), the horizontal HPF 81 outputs a signal below by each line y2'(n) (n= −703, −702, ... , 1407) of the image outputted from the horizontal 1:2 interpolating circuit 79b;

$$x_2(n) = \sum_{k=0}^{N_4-1} g_2(k) \cdot y_2'\left(n + \frac{N_4}{2} - 1 - k\right)$$

The calculating unit 82 reduces the output of the horizontal HPF 81 from the output of the horizontal LPF 80, and outputs the result from the output terminal 83.

For explaining the effects of the instant embodiment concretely, supposing that the horizontal LPF 72, horizontal HPF 73, horizontal LPF 80 and horizontal HPF 81 are filters with 16 taps shown in Table 1, the first lines x(n) (n=1, x(1)=16, x(2)=120, x(3)=130, x(4)=140, x(5)=150,
x(6)=160, x(7)=170, x(8)=180, x(9)=190,
x(10)=200, x(n)=200, (n=11, 12, ... , 704)

As this time, the signals outputted from the output terminal 75a are y1(1)=59.6, y1(3)=144.7, y1(5)=152.6,
y1(7)=175.1, y1(9)=195.3, y1(11)=200.5,
y1(13)=199.8, y1(15)=200,0, y1(17)=199.9, Furthermore, the signals outputted from the output terminal 75b are y2(1)=−37.7, y2(3)=8.2, y2(5)=−3.1, y2(7)=1.0
y2(9)=−1.6, y2(11)=0.1, y2(13)=−0.1 ,
y2(15)=0.1, y2(17)=0.0, When these signals from the output terminals 75a, 75b are inputted to the input terminals 76a, 76b at the synthesizing side respectively, the outputs of the horizontal LPF 80 become x1(1)=46.3, x1(2)=77.9, x1(3)=129.4, x1(4)=156.1,
x1(5)=151.0, x1(6)=153.2, x1(7)=169.1,
x1(8)=182.0, x1(9)=191.3, And, the outputs of the horizontal HPF 81 become x2(1)=30.5, x2(2)=−42.0, x2(3)=−0.5,
x2(4)=16.3, x2(5)=1.2, x2(6)=−6.7,
x2(7)=−0.8, x2(8)=2.1, x2(9)=1.4, Therefore, the outputs X(n) of the calculating unit 82 are, when rounded off to the nearest whole number;

x(1)=16, X(2)=120, X(3)=130, X(4)=140,
x(5)=150, X(6)=160, X(7)=170, X(8)=180,
X(9)=190,

As is clear from this, x(n)=x(n) is held even in the periphery of the end point of the image, whereby the original image can be correctly reproduced.

In the above embodiment, although the folded image is added before 0 is interpolated, the folded image can be added after 0 is interpolated.

Figure 54:
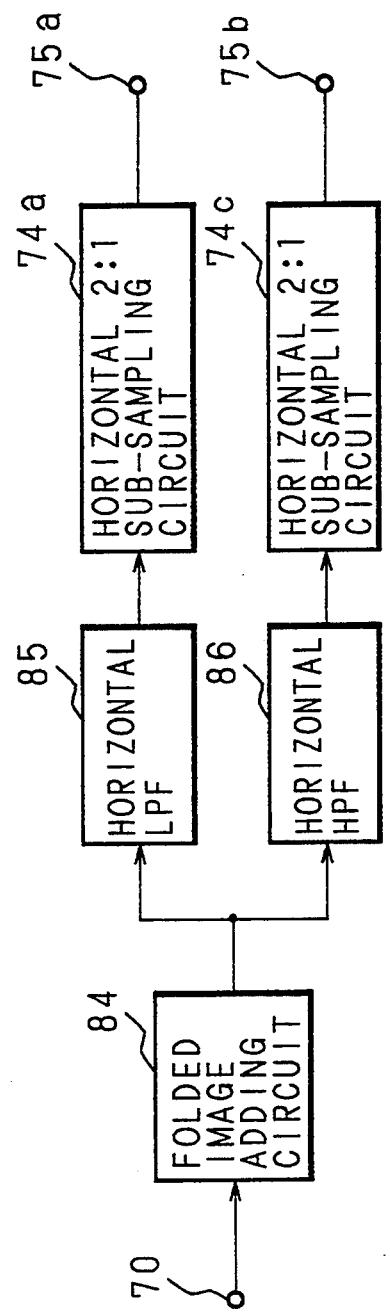
FIG. 54 is a block diagram showing the other structure of the sub-band dividing circuit of this invention.
Figure 55:
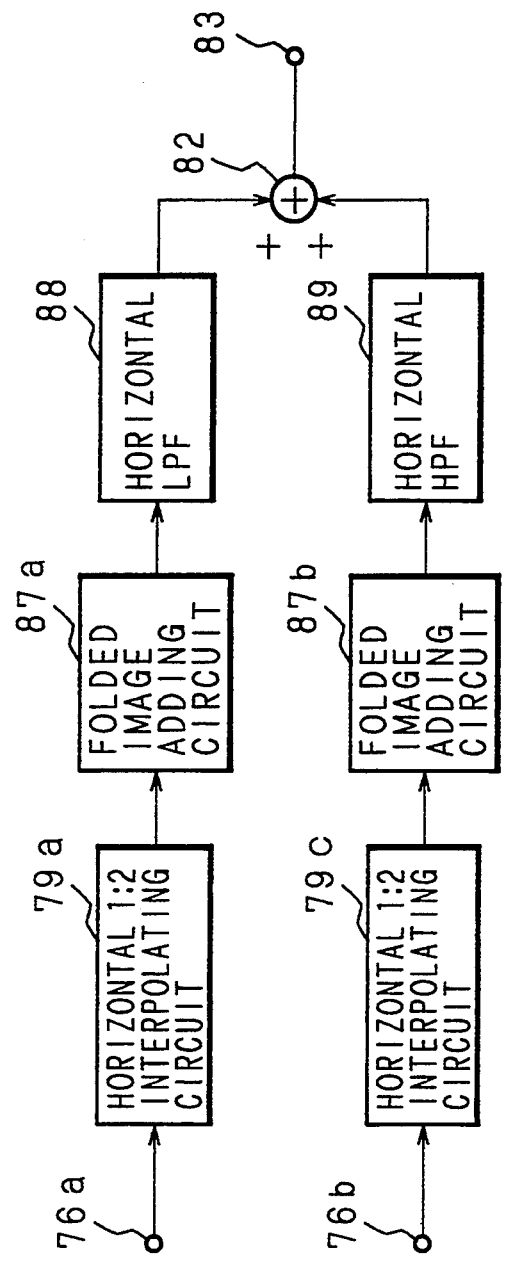
FIG. 55 is a block diagram showing the other structure of the sub-band synthesizing circuit.

Furthermore, although the filters in the above embodiment have even-number taps, the filters can be provided with odd-number taps. FIGS. 54 and 55 show an example of the structure in the case where the filters with odd-number taps are used. The image inputted through the input terminal 70 is connected to the image which is folded at the end point and whose picture element is reduced by one at a folded image adding circuit 84 as indicated in FIG. 88(b), which results;

$$\begin{bmatrix} x(1 - n) = x(1 + n) \\ x(704 + n) = x(704 - n) \end{bmatrix} \quad (16)$$

$(n = 1, \ldots, 704)$

The horizontal LPF 85 is a low pass filter of a linear phase having odd-number taps. The factor of the horizontal LPF 85, i.e., h1(n) (n=0, ..., $N_1$−1; $N_1$ being an odd number) is;

$$h_1(n) = h_1(N_1 - n - 1) \quad n = 0, \ldots, (N_1 - 1)/2$$

That is, the horizontal LPF 85 outputs a signal as represented by an equation (17) by a signal x(n) of each line;

$$y_1(n) = \sum_{k=0}^{N_1 - 1} h_1(k) \cdot x\left(n + \frac{N_1 - 1}{2} - k\right) + \quad (17)$$

$$h_1\left(\frac{N_1 - 1}{2}\right) \cdot X(n) +$$

$$\sum_{k=0}^{(N_1 - 3)/2} h_1(k) \cdot \left\{ x\left(n + \frac{N_1 - 1}{2} - k\right) + x\left(n - \frac{N_1 - 1}{2} + k\right) \right\}$$

$(n = 1, \ldots, 704)$

The horizontal 2:1 sub-sampling circuit 74a reduces the number of picture elements in the horizontal direction of the output from the horizontal LPH 85 to half, with outputting y1(1), y1(3), y1(5) ... from the output terminal 75a (FIG. 56(c)). While the horizontal HPF 86 is a high pass filter of a linear phase having odd-number taps. The factor of the horizontal HPF 86, namely, h2(n) (n=0, ..., $N_2$−1; $N_2$ being an odd number) is;

$$h_2(n) = h_2(N_2 - n - 1) \quad n = 0, \ldots, (N_2 - 1)/2$$

In other word, the horizontal HPF 86 outputs a signal expressed by an equation (18) by a signal x(n) of each line;

$$y_2(n) = \sum_{k=0}^{N_2 - 1} h_2(k) \cdot x\left(n + \frac{N_2 - 1}{2} - k\right) + \quad (18)$$

$$h_2\left(\frac{N_2 - 1}{2}\right) \cdot x(n) +$$

$$\sum_{k=0}^{(N_2 - 3)/2} h_2(k) \cdot \left\{ x\left(n + \frac{N_2 - 1}{2} - k\right) + x\left(n - \frac{N_2 - 1}{2} + k\right) \right\}$$

$(n = 1, \ldots, 704)$

The horizontal 2:1 sub-sampling circuit 74c reduces the number of picture elements in the horizontal direction of the output of the horizontal HPF 86 to half, with outputting y2(2), y2(4), y2(6) ... from the output terminal 75b (FIG. 56(d)).

In the sub-band synthesizing circuit, signals of each band outputted from the output terminals 75a, 75b at the dividing side are inputted to the respective input terminal 76a, 76b. Each line of the image inputted from the input terminals 76a, 76b is expressed by y1(n) (n=1, 3, 5, ..., 703), y2(n) (n=2, 4, 6, ..., 704) respectively. The image inputted through the input terminals 76a, 76b, is interpolated with 0 at the horizontal 1:2 interpolating circuits 79a, 79c, so that the number of picture elements in the horizontal direction is increased twice. Accordingly, the outputs y1'(n), y2'(n) from the horizontal 1:2 interpolating circuits 79a, 79c are;

$$y_1'(n) = \begin{bmatrix} y_1(n) & (n = 1, 3, 5, \ldots, 703) \\ 0 & (n = 2, 4, 6, \ldots, 704) \end{bmatrix}$$

$$y_2'(n) = \begin{bmatrix} 0 & (n = 1, 3, 5, \ldots, 703) \\ y_2(n) & (n = 2, 4, 6, \ldots, 704) \end{bmatrix}$$

The folded image adding circuits 87a, 87b folds the images outputted from the horizontal 1:2 interpolating circuits 79a, 79c respectively at the end point, and adds it as indicated by (19), (20) (FIGS. 56(e), 56(f));

$$\begin{bmatrix} y_1'(1 - n) = y_1'(1 + n) \\ y_1'(704 + n) = y_1'(704 - n) \end{bmatrix} \quad (19)$$

$(n = 1, 2, \ldots, 704)$ $$\begin{bmatrix} y_2'(1 - n) = y_2'(1 + n) \\ y_2'(704 + n) = y_2'(704 - n) \end{bmatrix} \quad (20)$$

$(n = 1, 2, \ldots, 704)$

The sub-band dividing circuit does not transmit the added folded image. However, if the horizontal LPF 85 and horizontal HPF 86b are supposed to calculate the folded image, the following is satisfied by the equations (16) and (17);

$$y_1(1-n) = h_1\left(\frac{N_1-1}{2}\right) \cdot x(1-n) +$$

$$\sum_{k=0}^{(N_1-3)/2} h_1(k) \cdot \left\{ x\left(1-n+\frac{N_1-1}{2}-k\right) + \right.$$

$$\left. x\left(1-n-\frac{N_1-1}{2}+k\right)\right\}$$

$$= h_1\left(\frac{N_1-1}{2}\right) \cdot x(1+n) +$$

$$\sum_{k=0}^{(N_1-3)/2} h_1(k) \cdot \left\{ x\left(1+n-\frac{N_1-1}{2}+k\right) + \right.$$

$$\left. x\left(1+n+\frac{N_1-1}{2}-k\right)\right\}$$

$$= y_1(1+n)$$

$(n = 1, \ldots, 704)$

Likewise,
$y_1(704 + n) = y_1(704 - n)$
$(n = 1, 2, \ldots, 704)$

Moreover, the following is also satisfied by the equations (16) and (18);

$$\begin{cases} y_2(1-n) = y_2(1+n) \\ y_2(704+n) = y_2(704-n) \end{cases}$$

$(n = 1, 2, \ldots, 704)$

Therefore, if the image folded at the end of the image is added as represented by the equations (19) and (20) at the folded image adding circuits 87a, 87b, also the folded image which is added but not transmitted at the sub-band dividing circuit can be correctly reproduced. The outputs from the folded image adding circuits 87a, 87b are respectively inputted to the horizontal LPF 88 and horizontal HPF 89. The horizontal LPF 88 is a low pass filter with odd-number taps. If the factor of the horizontal LPF 88 is denoted by g1(n) (n=0, ..., N −1; N being an odd number), the horizontal LPF 88 outputs a signal expressed by an equation below by each line y1'(n) of the image outputted from the folded image adding circuit 87a;

$$x_1(n) = \sum_{k=0}^{N_3-1} g(k) \cdot y'_1\left(n + \frac{N_3-1}{2} - k\right)$$

On the other hand, the horizontal HPF 89 is a high pass filter with odd-number taps. Supposing that the factor of the horizontal HPF 89 is expressed by g2(n) (n=0, ..., $N_4$ −1; $N_4$ being an odd number), the horizontal HPF 89 outputs a signal expressed as follows by each line y2'(n) of the image outputted from the folded image adding circuit 87b;

$$x_2(n) = \sum_{k=0}^{N_4-1} g_2(k) \cdot y'_2\left(n + \frac{N_4-1}{2} - k\right)$$

The calculating unit 82 adds the output of the horizontal HPF 89 to the output of the horizontal LPF 88, outputting the result from the output terminal 83.

Although the folded image is added after 0 is interolated in the foregoing embodiment, it is possible that 0 is interpolated after the folded image is added.

In addition, the horizontal frequency band is divided into two at the sub-band dividing circuit in the above-discussed embodiments. However, it is clear that the vertical frequency band can be divided into two. This invention is also applied to the case where the two-dimensional frequency band is divided into four by connecting a sub-band dividing circuit which separates the horizontal frequency band into two with a sub-band dividing circuit which separates the vertical frequency band into two. Further, it is possible to separate the frequency band more finely by connecting a plurality of sub-band dividing circuits one another.

It is apparent that it is enough to add only of picture elements necessary for filtering although all the folded images are added in the foregoing embodiment.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the metes and bounds of the claims, or equivalence of such metes and bounds thereof ape therefore intended to be embraced by the claims.

TABLE 2

| k = 0 | | | | | | | |
|---|---|---|---|---|---|---|---|
| 407.48 | 47.45 | 23.12 | 15.73 | 10.09 | 6.30 | 4.47 | 2.87 |
| 57.91 | 22.37 | 14.95 | 9.56 | 6.14 | 4.76 | 3.62 | 2.09 |
| 43.20 | 18.54 | 12.10 | 8.51 | 6.70 | 4.08 | 3.12 | 2.02 |
| 30.87 | 14.32 | 10.70 | 6.86 | 5.21 | 3.46 | 2.74 | 1.80 |
| 21.90 | 12.71 | 8.99 | 6.75 | 4.56 | 3.73 | 2.65 | 1.81 |
| 16.39 | 10.70 | 7.90 | 5.64 | 4.39 | 3.40 | 2.11 | 1.64 |
| 13.77 | 9.80 | 7.41 | 5.16 | 3.58 | 2.59 | 2.01 | 1.68 |
| 10.64 | 7.79 | 6.70 | 4.53 | 3.24 | 2.37 | 1.79 | 1.17 |
| k = 1 | | | | | | | |
| 21.68 | 19.90 | 19.23 | 11.77 | 8.06 | 5.82 | 4.28 | 2.84 |
| 16.41 | 16.56 | 13.64 | 9.52 | 6.58 | 4.69 | 3.39 | 2.67 |
| 12.99 | 11.90 | 10.54 | 7.72 | 5.50 | 4.38 | 3.41 | 2.55 |
| 11.52 | 9.85 | 8.57 | 6.70 | 5.18 | 3.72 | 2.80 | 2.22 |
| 10.36 | 8.64 | 7.62 | 6.23 | 4.40 | 3.61 | 2.69 | 2.09 |
| 9.97 | 7.22 | 7.24 | 5.20 | 3.87 | 3.25 | 2.42 | 1.71 |
| 8.40 | 7.12 | 5.67 | 4.83 | 3.54 | 2.87 | 2.06 | 1.66 |
| 7.15 | 5.84 | 5.17 | 3.93 | 2.90 | 2.44 | 1.94 | 1.37 |
| k = 2 | | | | | | | |
| 6.66 | 11.75 | 13.40 | 11.21 | 8.10 | 4.94 | 3.17 | 2.45 |
| 6.40 | 9.05 | 10.89 | 9.94 | 7.05 | 4.46 | 3.12 | 1.96 |
| 5.31 | 7.90 | 8.50 | 7.75 | 5.62 | 3.97 | 2.63 | 2.05 |
| 5.15 | 6.71 | 7.72 | 7.48 | 4.91 | 3.71 | 2.43 | 1.89 |
| 5.06 | 5.97 | 7.14 | 6.03 | 4.49 | 3.27 | 2.35 | 1.83 |
| 4.32 | 5.94 | 5.45 | 5.33 | 3.52 | 2.70 | 1.88 | 1.46 |
| 5.05 | 4.69 | 5.12 | 4.48 | 3.58 | 2.43 | 1.83 | 1.39 |
| 4.76 | 4.53 | 3.93 | 3.78 | 2.73 | 2.12 | 1.64 | 1.29 |
| k = 3 | | | | | | | |
| 3.23 | 4.53 | 7.10 | 9.08 | 7.27 | 5.78 | 3.37 | 1.98 |
| 2.98 | 4.31 | 6.45 | 7.42 | 6.96 | 5.94 | 3.42 | 1.97 |
| 2.38 | 3.87 | 5.60 | 6.52 | 6.23 | 4.68 | 3.02 | 2.02 |
| 2.27 | 3.38 | 5.08 | 5.81 | 5.55 | 4.27 | 2.61 | 1.52 |
| 2.17 | 3.29 | 4.33 | 5.49 | 4.69 | 3.65 | 2.68 | 1.63 |
| 2.52 | 3.24 | 4.40 | 4.44 | 4.24 | 2.78 | 2.35 | 1.39 |
| 2.68 | 3.48 | 3.70 | 4.00 | 3.85 | 2.66 | 2.00 | 1.35 |
| 2.63 | 2.93 | 3.52 | 3.13 | 3.12 | 2.45 | 1.56 | 1.15 |

TABLE 3 k = 4

| | | | | | | | |
|---|---|---|---|---|---|---|---|
| 2.08 | 2.63 | 3.78 | 4.47 | 5.58 | 5.30 | 4.22 | 2.42 |
| 1.87 | 2.36 | 3.24 | 4.67 | 5.36 | 5.31 | 3.90 | 2.65 |
| 1.76 | 2.32 | 3.16 | 4.53 | 5.44 | 5.12 | 3.88 | 2.41 |
| 1.81 | 2.11 | 2.67 | 3.85 | 5.05 | 4.78 | 3.28 | 2.02 |
| 1.61 | 1.99 | 2.80 | 3.81 | 4.59 | 4.21 | 3.26 | 2.13 |
| 1.57 | 2.26 | 2.95 | 3.73 | 4.00 | 4.16 | 2.83 | 2.03 |
| 1.67 | 2.35 | 2.90 | 3.84 | 4.16 | 3.15 | 2.79 | 1.69 |
| 1.67 | 2.20 | 3.10 | 3.44 | 3.49 | 3.03 | 2.50 | 1.36 | k = 5

| | | | | | | | |
|---|---|---|---|---|---|---|---|
| 1.81 | 1.46 | 1.92 | 2.44 | 3.33 | 3.85 | 3.58 | 2.70 |
| 2.16 | 1.52 | 1.86 | 2.26 | 3.08 | 3.37 | 3.22 | 2.41 |
| 1.82 | 1.58 | 1.99 | 2.51 | 3.16 | 3.34 | 3.32 | 2.35 |
| 1.54 | 1.74 | 1.92 | 2.11 | 2.88 | 3.31 | 2.92 | 2.20 |
| 1.57 | 1.64 | 1.90 | 2.35 | 2.56 | 3.12 | 3.07 | 2.13 |
| 1.84 | 1.73 | 2.00 | 2.24 | 2.40 | 2.64 | 2.81 | 1.84 |
| 2.08 | 1.91 | 1.87 | 2.12 | 2.22 | 2.33 | 2.12 | 1.82 |
| 2.14 | 1.74 | 1.92 | 2.05 | 2.07 | 2.12 | 1.91 | 1.49 | k = 6

| | | | | | | | |
|---|---|---|---|---|---|---|---|
| 1.11 | 1.17 | 1.22 | 1.38 | 1.66 | 2.05 | 2.66 | 2.27 |
| 1.42 | 1.35 | 1.32 | 1.34 | 1.71 | 2.20 | 2.30 | 2.21 |
| 1.70 | 1.56 | 1.53 | 1.42 | 1.88 | 2.24 | 2.29 | 2.15 |
| 1.88 | 1.81 | 1.67 | 1.62 | 1.69 | 2.10 | 2.21 | 1.98 |
| 2.17 | 1.91 | 1.79 | 1.52 | 1.79 | 2.00 | 2.36 | 1.94 |
| 2.10 | 2.09 | 1.75 | 1.76 | 1.62 | 1.94 | 2.04 | 1.95 |
| 2.47 | 1.96 | 1.99 | 1.63 | 1.53 | 1.83 | 1.90 | 1.66 |
| 2.47 | 2.15 | 1.94 | 1.82 | 1.59 | 1.62 | 1.79 | 1.59 | k = 7

| | | | | | | | |
|---|---|---|---|---|---|---|---|
| 4.22 | 1.32 | 1.04 | 0.91 | 1.02 | 1.26 | 1.85 | 1.64 |
| 5.62 | 1.87 | 1.36 | 1.11 | 1.04 | 1.36 | 1.67 | 1.68 |
| 4.84 | 2.13 | 1.56 | 1.21 | 1.22 | 1.39 | 1.77 | 1.60 |
| 3.84 | 2.36 | 1.76 | 1.39 | 1.28 | 1.30 | 1.55 | 1.53 |
| 3.92 | 2.47 | 2.00 | 1.44 | 1.24 | 1.42 | 1.49 | 1.51 |
| 4.42 | 2.92 | 2.19 | 1.65 | 1.34 | 1.48 | 1.39 | 1.57 |
| 5.06 | 3.03 | 2.37 | 1.66 | 1.46 | 1.28 | 1.37 | 1.43 |
| 4.79 | 2.90 | 2.41 | 1.79 | 1.49 | 1.31 | 1.34 | 1.29 |

TABLE 4 k = 0

| | | | | | | | |
|---|---|---|---|---|---|---|---|
| 0.25 | 0.35 | 0.40 | 0.48 | 0.68 | 1.00 | 1.68 | 1.98 |
| 0.20 | 0.24 | 0.32 | 0.33 | 0.51 | 0.62 | 0.99 | 1.45 |
| 0.17 | 0.29 | 0.30 | 0.34 | 0.47 | 0.66 | 1.00 | 1.46 |
| 0.13 | 0.23 | 0.25 | 0.29 | 0.36 | 0.58 | 0.85 | 1.31 |
| 0.14 | 0.22 | 0.22 | 0.29 | 0.35 | 0.49 | 0.81 | 1.19 |
| 0.14 | 0.20 | 0.27 | 0.29 | 0.35 | 0.55 | 0.78 | 0.99 |
| 0.14 | 0.20 | 0.23 | 0.31 | 0.35 | 0.51 | 0.78 | 0.97 |
| 0.07 | 0.17 | 0.19 | 0.22 | 0.29 | 0.49 | 0.62 | 0.85 | k = 1

| | | | | | | | |
|---|---|---|---|---|---|---|---|
| 0.25 | 0.36 | 0.36 | 0.47 | 0.61 | 1.02 | 1.54 | 2.05 |
| 0.25 | 0.35 | 0.36 | 0.40 | 0.55 | 0.79 | 1.35 | 1.84 |
| 0.21 | 0.31 | 0.36 | 0.41 | 0.55 | 0.77 | 1.10 | 1.79 |
| 0.20 | 0.30 | 0.36 | 0.42 | 0.53 | 0.71 | 1.11 | 1.56 |
| 0.19 | 0.30 | 0.34 | 0.38 | 0.48 | 0.67 | 1.03 | 1.60 |
| 0.18 | 0.28 | 0.28 | 0.36 | 0.41 | 0.66 | 0.92 | 1.35 |
| 0.14 | 0.24 | 0.28 | 0.33 | 0.40 | 0.58 | 0.86 | 1.27 |
| 0.16 | 0.19 | 0.23 | 0.26 | 0.36 | 0.49 | 0.83 | 1.11 | k = 2

| | | | | | | | |
|---|---|---|---|---|---|---|---|
| 0.19 | 0.29 | 0.34 | 0.39 | 0.54 | 0.78 | 1.15 | 1.71 |
| 0.21 | 0.31 | 0.33 | 0.39 | 0.49 | 0.76 | 1.11 | 1.70 |
| 0.15 | 0.29 | 0.34 | 0.36 | 0.46 | 0.69 | 1.16 | 1.53 |
| 0.16 | 0.23 | 0.30 | 0.34 | 0.45 | 0.62 | 0.93 | 1.28 |
| 0.19 | 0.25 | 0.29 | 0.33 | 0.42 | 0.63 | 0.88 | 1.18 |
| 0.17 | 0.26 | 0.28 | 0.32 | 0.41 | 0.60 | 0.80 | 1.17 |
| 0.19 | 0.23 | 0.28 | 0.33 | 0.40 | 0.62 | 0.78 | 1.06 |
| 0.11 | 0.22 | 0.25 | 0.33 | 0.35 | 0.56 | 0.76 | 0.94 | k = 3

| | | | | | | | |
|---|---|---|---|---|---|---|---|
| 0.19 | 0.24 | 0.27 | 0.34 | 0.42 | 0.66 | 0.96 | 1.24 |
| 0.19 | 0.29 | 0.30 | 0.35 | 0.44 | 0.64 | 0.92 | 1.38 |
| 0.19 | 0.24 | 0.30 | 0.34 | 0.48 | 0.64 | 0.92 | 1.34 |
| 0.15 | 0.21 | 0.28 | 0.30 | 0.40 | 0.54 | 0.78 | 1.07 |
| 0.17 | 0.25 | 0.30 | 0.29 | 0.42 | 0.55 | 0.79 | 1.09 |
| 0.15 | 0.28 | 0.27 | 0.33 | 0.37 | 0.56 | 0.72 | 1.01 |
| 0.15 | 0.22 | 0.27 | 0.28 | 0.35 | 0.50 | 0.71 | 0.95 |
| 0.15 | 0.19 | 0.20 | 0.25 | 0.32 | 0.45 | 0.60 | 0.82 |

TABLE 5 k = 4

| | | | | | | | |
|---|---|---|---|---|---|---|---|
| 0.22 | 0.29 | 0.30 | 0.34 | 0.44 | 0.66 | 1.08 | 1.46 |
| 0.30 | 0.37 | 0.40 | 0.45 | 0.56 | 0.80 | 1.12 | 1.48 |
| 0.26 | 0.31 | 0.36 | 0.34 | 0.48 | 0.72 | 1.10 | 1.21 |
| 0.19 | 0.25 | 0.30 | 0.28 | 0.40 | 0.56 | 0.88 | 1.45 |
| 0.20 | 0.27 | 0.28 | 0.35 | 0.37 | 0.58 | 0.88 | 1.15 |
| 0.17 | 0.24 | 0.26 | 0.31 | 0.40 | 0.49 | 0.87 | 1.19 |
| 0.16 | 0.24 | 0.30 | 0.35 | 0.38 | 0.56 | 0.77 | 1.07 |
| 0.15 | 0.22 | 0.23 | 0.28 | 0.30 | 0.48 | 0.62 | 0.96 | k = 5

| | | | | | | | |
|---|---|---|---|---|---|---|---|
| 0.28 | 0.38 | 0.43 | 0.47 | 0.60 | 0.81 | 1.32 | 1.69 |
| 0.30 | 0.38 | 0.41 | 0.44 | 0.55 | 0.81 | 1.26 | 1.74 |
| 0.29 | 0.43 | 0.39 | 0.46 | 0.58 | 0.86 | 1.08 | 1.63 |
| 0.22 | 0.31 | 0.34 | 0.39 | 0.43 | 0.61 | 1.02 | 1.40 |
| 0.22 | 0.31 | 0.32 | 0.40 | 0.43 | 0.61 | 0.99 | 1.57 |
| 0.22 | 0.35 | 0.38 | 0.41 | 0.52 | 0.77 | 1.07 | 1.49 |
| 0.22 | 0.30 | 0.30 | 0.35 | 0.45 | 0.57 | 0.91 | 1.19 |
| 0.16 | 0.23 | 0.26 | 0.28 | 0.40 | 0.57 | 0.82 | 1.07 | k = 6

| | | | | | | | |
|---|---|---|---|---|---|---|---|
| 0.26 | 0.33 | 0.41 | 0.43 | 0.58 | 0.72 | 1.19 | 1.56 |
| 0.28 | 0.40 | 0.43 | 0.54 | 0.60 | 0.95 | 1.29 | 1.66 |
| 0.28 | 0.39 | 0.40 | 0.47 | 0.59 | 0.81 | 1.24 | 1.77 |
| 0.26 | 0.34 | 0.38 | 0.41 | 0.59 | 0.81 | 1.03 | 1.56 |
| 0.28 | 0.34 | 0.38 | 0.44 | 0.60 | 0.72 | 1.06 | 1.50 |
| 0.26 | 0.36 | 0.34 | 0.45 | 0.53 | 0.69 | 1.02 | 1.50 |
| 0.19 | 0.30 | 0.33 | 0.41 | 0.47 | 0.68 | 0.86 | 1.31 |
| 0.22 | 0.28 | 0.33 | 0.35 | 0.43 | 0.61 | 0.84 | 1.22 | k = 7

| | | | | | | | |
|---|---|---|---|---|---|---|---|
| 0.30 | 0.44 | 0.48 | 0.58 | 0.76 | 1.02 | 1.31 | 1.77 |
| 0.25 | 0.39 | 0.37 | 0.47 | 0.62 | 0.90 | 1.35 | 1.59 |
| 0.28 | 0.42 | 0.40 | 0.53 | 0.63 | 0.95 | 1.26 | 1.55 |
| 0.25 | 0.34 | 0.37 | 0.43 | 0.49 | 0.83 | 1.15 | 1.58 |
| 0.29 | 0.36 | 0.46 | 0.43 | 0.63 | 0.78 | 1.19 | 1.36 |
| 0.21 | 0.32 | 0.34 | 0.38 | 0.47 | 0.65 | 1.05 | 1.31 |
| 0.24 | 0.32 | 0.36 | 0.41 | 0.51 | 0.71 | 1.05 | 1.22 |
| 0.19 | 0.29 | 0.33 | 0.37 | 0.42 | 0.65 | 0.98 | 1.31 |

TABLE 6 k = 0

| | | | | | | | |
|---|---|---|---|---|---|---|---|
| 3.43 | 2.73 | 2.16 | 1.63 | 1.16 | 0.81 | 0.69 | 0.58 |
| 3.94 | 2.88 | 2.38 | 1.74 | 1.23 | 0.96 | 0.71 | 0.60 |
| 4.23 | 3.15 | 2.68 | 1.66 | 1.31 | 0.95 | 0.80 | 0.59 |
| 5.07 | 3.63 | 3.02 | 2.11 | 1.42 | 1.02 | 0.84 | 0.67 |
| 5.83 | 4.31 | 3.49 | 2.41 | 1.72 | 1.21 | 0.89 | 0.73 |
| 6.57 | 5.12 | 4.12 | 2.84 | 1.92 | 1.40 | 1.16 | 0.84 |
| 7.83 | 6.78 | 4.79 | 3.40 | 2.16 | 1.59 | 1.18 | 1.08 |
| 9.13 | 7.00 | 5.71 | 3.81 | 2.71 | 1.98 | 1.50 | 1.11 | k = 1

| | | | | | | | |
|---|---|---|---|---|---|---|---|
| 3.04 | 2.51 | 2.12 | 1.54 | 1.11 | 0.88 | 0.69 | 0.57 |
| 3.50 | 2.86 | 2.38 | 1.73 | 1.34 | 0.97 | 0.82 | 0.64 |
| 3.79 | 3.26 | 2.55 | 1.85 | 1.27 | 1.05 | 0.89 | 0.67 |
| 4.07 | 3.31 | 2.62 | 1.97 | 1.56 | 1.15 | 0.88 | 0.69 |
| 4.67 | 3.84 | 2.74 | 2.26 | 1.66 | 1.33 | 1.07 | 0.87 |
| 5.47 | 4.41 | 3.54 | 2.56 | 1.84 | 1.52 | 1.18 | 1.06 |
| 6.22 | 4.73 | 3.93 | 2.94 | 2.17 | 1.68 | 1.39 | 1.07 |
| 5.73 | 5.45 | 4.31 | 3.54 | 2.53 | 1.96 | 1.50 | 1.30 | k = 2

| | | | | | | | |
|---|---|---|---|---|---|---|---|
| 2.51 | 2.12 | 1.69 | 1.38 | 1.10 | 0.96 | 0.67 | 0.52 |
| 2.93 | 2.25 | 1.83 | 1.46 | 1.20 | 1.07 | 0.71 | 0.58 |
| 2.99 | 2.41 | 1.95 | 1.73 | 1.29 | 1.01 | 0.80 | 0.66 |
| 3.34 | 2.59 | 2.27 | 1.69 | 1.28 | 1.06 | 0.91 | 0.66 |
| 3.39 | 2.68 | 2.44 | 1.77 | 1.49 | 1.22 | 1.00 | 0.77 |
| 4.33 | 3.03 | 2.71 | 2.12 | 1.68 | 1.35 | 1.08 | 0.89 |
| 4.86 | 3.44 | 3.00 | 2.55 | 1.99 | 1.58 | 1.20 | 0.96 |
| 4.34 | 3.47 | 3.75 | 2.83 | 2.32 | 1.74 | 1.35 | 1.13 | k = 3

| | | | | | | | |
|---|---|---|---|---|---|---|---|
| 2.48 | 1.85 | 1.61 | 1.24 | 0.98 | 0.88 | 0.67 | 0.55 |
| 2.78 | 1.89 | 1.65 | 1.41 | 1.01 | 0.95 | 0.64 | 0.54 |
| 2.64 | 2.04 | 1.93 | 1.40 | 1.28 | 0.94 | 0.76 | 0.60 |
| 2.96 | 2.11 | 1.83 | 1.55 | 1.41 | 1.11 | 0.87 | 0.61 |
| 3.08 | 2.26 | 2.02 | 1.92 | 1.62 | 1.17 | 0.98 | 0.81 |
| 3.32 | 2.80 | 1.98 | 2.11 | 1.67 | 1.54 | 1.06 | 0.72 |
| 3.46 | 2.65 | 2.63 | 2.48 | 2.10 | 1.53 | 1.29 | 0.88 |
| 2.76 | 2.68 | 2.76 | 2.86 | 2.60 | 1.85 | 1.51 | 1.09 |

TABLE 7 k = 4

| 3.00 | 2.51 | 2.28 | 1.62 | 1.57 | 1.25 | 0.85 | 0.62 |
| --- | --- | --- | --- | --- | --- | --- | --- |
| 3.43 | 2.39 | 2.08 | 1.50 | 1.61 | 1.06 | 0.90 | 0.62 |
| 3.48 | 2.90 | 2.22 | 2.03 | 1.79 | 1.33 | 1.02 | 0.57 |
| 3.48 | 2.65 | 2.67 | 2.14 | 1.80 | 1.67 | 1.01 | 0.80 |
| 3.26 | 2.65 | 2.28 | 2.60 | 2.12 | 1.98 | 1.35 | 0.88 |
| 2.76 | 2.56 | 2.83 | 2.66 | 2.56 | 1.66 | 1.49 | 1.03 |
| 2.54 | 2.71 | 3.12 | 2.76 | 2.76 | 2.52 | 1.78 | 0.97 |
| 2.28 | 2.35 | 2.86 | 3.04 | 2.81 | 2.84 | 1.91 | 1.28 | k = 5

| 2.52 | 1.88 | 1.70 | 1.41 | 1.11 | 0.89 | 0.72 | 0.56 |
| --- | --- | --- | --- | --- | --- | --- | --- |
| 2.79 | 1.86 | 1.61 | 1.37 | 1.17 | 0.96 | 0.70 | 0.61 |
| 2.42 | 1.95 | 1.77 | 1.33 | 1.29 | 0.98 | 0.84 | 0.65 |
| 2.45 | 1.90 | 1.73 | 1.59 | 1.28 | 1.04 | 0.94 | 0.73 |
| 2.53 | 1.88 | 1.85 | 1.66 | 1.50 | 1.20 | 1.09 | 0.87 |
| 2.60 | 2.08 | 1.68 | 1.82 | 1.45 | 1.44 | 1.17 | 0.92 |
| 2.75 | 1.90 | 1.87 | 1.73 | 1.69 | 1.68 | 1.34 | 1.18 |
| 2.21 | 1.85 | 1.67 | 1.92 | 1.86 | 1.87 | 1.65 | 1.22 | k = 6

| 2.76 | 2.23 | 1.97 | 1.53 | 1.12 | 0.89 | 0.65 | 0.54 |
| --- | --- | --- | --- | --- | --- | --- | --- |
| 2.90 | 2.32 | 1.96 | 1.49 | 1.10 | 0.94 | 0.74 | 0.58 |
| 2.85 | 2.26 | 1.95 | 1.53 | 1.19 | 0.93 | 0.75 | 0.71 |
| 3.03 | 2.40 | 1.84 | 1.58 | 1.15 | 1.08 | 0.90 | 0.71 |
| 2.84 | 2.27 | 2.00 | 1.70 | 1.27 | 1.13 | 0.99 | 0.96 |
| 3.10 | 2.43 | 1.91 | 1.60 | 1.35 | 1.18 | 1.11 | 0.99 |
| 3.16 | 2.53 | 1.92 | 1.61 | 1.45 | 1.28 | 1.31 | 0.99 |
| 2.68 | 2.21 | 1.99 | 1.61 | 1.56 | 1.49 | 1.39 | 1.32 | k = 7

| 3.79 | 2.43 | 2.03 | 1.44 | 1.01 | 0.83 | 0.65 | 0.56 |
| --- | --- | --- | --- | --- | --- | --- | --- |
| 4.24 | 2.63 | 2.07 | 1.53 | 1.16 | 0.87 | 0.81 | 0.64 |
| 3.55 | 2.58 | 2.04 | 1.43 | 1.13 | 0.88 | 0.78 | 0.59 |
| 3.36 | 2.41 | 1.97 | 1.42 | 1.19 | 0.88 | 0.81 | 0.71 |
| 4.02 | 2.88 | 2.24 | 1.58 | 1.27 | 0.96 | 0.94 | 0.77 |
| 5.30 | 3.14 | 2.43 | 1.58 | 1.28 | 1.07 | 0.93 | 0.95 |
| 5.86 | 3.06 | 2.46 | 1.70 | 1.40 | 1.09 | 1.15 | 1.04 |
| 4.91 | 3.04 | 2.37 | 1.74 | 1.41 | 1.34 | 1.22 | 1.33 |

TABLE 8 k = 0

| 0.06 | 0.10 | 0.16 | 0.20 | 0.20 | 0.28 | 0.42 | 0.42 |
| --- | --- | --- | --- | --- | --- | --- | --- |
| 0.10 | 0.16 | 0.13 | 0.21 | 0.22 | 0.33 | 0.45 | 0.51 |
| 0.09 | 0.16 | 0.13 | 0.17 | 0.23 | 0.34 | 0.44 | 0.50 |
| 0.06 | 0.12 | 0.13 | 0.20 | 0.20 | 0.30 | 0.48 | 0.60 |
| 0.13 | 0.15 | 0.15 | 0.22 | 0.27 | 0.34 | 0.53 | 0.58 |
| 0.09 | 0.16 | 0.17 | 0.17 | 0.23 | 0.37 | 0.60 | 0.73 |
| 0.08 | 0.19 | 0.22 | 0.25 | 0.30 | 0.44 | 0.62 | 0.75 |
| 0.12 | 0.16 | 0.20 | 0.26 | 0.31 | 0.51 | 0.69 | 0.87 | k = 1

| 0.07 | 0.13 | 0.15 | 0.19 | 0.25 | 0.28 | 0.42 | 0.50 |
| --- | --- | --- | --- | --- | --- | --- | --- |
| 0.08 | 0.11 | 0.19 | 0.18 | 0.27 | 0.32 | 0.42 | 0.49 |
| 0.11 | 0.15 | 0.15 | 0.18 | 0.24 | 0.33 | 0.45 | 0.53 |
| 0.09 | 0.12 | 0.15 | 0.18 | 0.25 | 0.37 | 0.44 | 0.55 |
| 0.08 | 0.16 | 0.16 | 0.17 | 0.26 | 0.34 | 0.51 | 0.71 |
| 0.07 | 0.15 | 0.17 | 0.21 | 0.27 | 0.42 | 0.54 | 0.71 |
| 0.11 | 0.17 | 0.19 | 0.25 | 0.33 | 0.45 | 0.65 | 0.87 |
| 0.12 | 0.18 | 0.23 | 0.28 | 0.35 | 0.50 | 0.71 | 0.95 | k = 2

| 0.12 | 0.13 | 0.17 | 0.15 | 0.24 | 0.28 | 0.35 | 0.49 |
| --- | --- | --- | --- | --- | --- | --- | --- |
| 0.10 | 0.12 | 0.19 | 0.18 | 0.22 | 0.33 | 0.40 | 0.50 |
| 0.08 | 0.15 | 0.18 | 0.21 | 0.21 | 0.32 | 0.40 | 0.51 |
| 0.14 | 0.16 | 0.17 | 0.17 | 0.24 | 0.31 | 0.46 | 0.54 |
| 0.13 | 0.16 | 0.19 | 0.21 | 0.25 | 0.36 | 0.50 | 0.63 |
| 0.13 | 0.15 | 0.21 | 0.22 | 0.28 | 0.39 | 0.53 | 0.68 |
| 0.12 | 0.19 | 0.23 | 0.25 | 0.30 | 0.44 | 0.62 | 0.79 |
| 0.13 | 0.21 | 0.23 | 0.29 | 0.32 | 0.50 | 0.66 | 0.94 | k = 3

| 0.11 | 0.12 | 0.15 | 0.19 | 0.21 | 0.26 | 0.34 | 0.42 |
| --- | --- | --- | --- | --- | --- | --- | --- |
| 0.12 | 0.13 | 0.13 | 0.16 | 0.20 | 0.27 | 0.39 | 0.39 |
| 0.09 | 0.15 | 0.17 | 0.19 | 0.18 | 0.29 | 0.39 | 0.44 |
| 0.10 | 0.12 | 0.16 | 0.17 | 0.21 | 0.30 | 0.38 | 0.54 |
| 0.11 | 0.13 | 0.17 | 0.17 | 0.21 | 0.32 | 0.40 | 0.54 |
| 0.07 | 0.13 | 0.17 | 0.21 | 0.27 | 0.36 | 0.47 | 0.61 |
| 0.12 | 0.20 | 0.20 | 0.19 | 0.29 | 0.31 | 0.51 | 0.63 |
| 0.12 | 0.18 | 0.18 | 0.24 | 0.28 | 0.42 | 0.55 | 0.76 |

TABLE 9 k = 4

| 0.04 | 0.06 | 0.10 | 0.13 | 0.15 | 0.21 | 0.28 | 0.37 |
| --- | --- | --- | --- | --- | --- | --- | --- |
| 0.04 | 0.06 | 0.12 | 0.17 | 0.13 | 0.23 | 0.29 | 0.42 |
| 0.04 | 0.10 | 0.11 | 0.10 | 0.15 | 0.21 | 0.30 | 0.41 |
| 0.00 | 0.09 | 0.10 | 0.16 | 0.14 | 0.20 | 0.37 | 0.44 |
| 0.10 | 0.12 | 0.12 | 0.15 | 0.18 | 0.29 | 0.44 | 0.50 |
| 0.08 | 0.15 | 0.17 | 0.20 | 0.19 | 0.31 | 0.44 | 0.54 |
| 0.12 | 0.17 | 0.19 | 0.19 | 0.22 | 0.33 | 0.48 | 0.66 |
| 0.15 | 0.18 | 0.20 | 0.26 | 0.31 | 0.40 | 0.56 | 0.72 | k = 5

| 0.10 | 0.15 | 0.15 | 0.19 | 0.21 | 0.28 | 0.36 | 0.41 |
| --- | --- | --- | --- | --- | --- | --- | --- |
| 0.11 | 0.14 | 0.17 | 0.17 | 0.21 | 0.28 | 0.37 | 0.48 |
| 0.13 | 0.12 | 0.15 | 0.17 | 0.22 | 0.32 | 0.36 | 0.50 |
| 0.08 | 0.16 | 0.17 | 0.20 | 0.21 | 0.31 | 0.41 | 0.58 |
| 0.10 | 0.17 | 0.20 | 0.21 | 0.26 | 0.34 | 0.47 | 0.66 |
| 0.16 | 0.15 | 0.19 | 0.23 | 0.28 | 0.35 | 0.54 | 0.75 |
| 0.16 | 0.19 | 0.21 | 0.23 | 0.30 | 0.38 | 0.59 | 0.72 |
| 0.17 | 0.21 | 0.24 | 0.27 | 0.33 | 0.45 | 0.70 | 0.91 | k = 6

| 0.12 | 0.17 | 0.18 | 0.19 | 0.21 | 0.31 | 0.42 | 0.47 |
| --- | --- | --- | --- | --- | --- | --- | --- |
| 0.11 | 0.11 | 0.16 | 0.21 | 0.24 | 0.32 | 0.44 | 0.55 |
| 0.10 | 0.12 | 0.17 | 0.21 | 0.22 | 0.33 | 0.45 | 0.51 |
| 0.10 | 0.14 | 0.18 | 0.19 | 0.26 | 0.39 | 0.48 | 0.57 |
| 0.09 | 0.15 | 0.19 | 0.22 | 0.26 | 0.39 | 0.50 | 0.68 |
| 0.17 | 0.21 | 0.22 | 0.26 | 0.34 | 0.38 | 0.62 | 0.79 |
| 0.17 | 0.25 | 0.23 | 0.31 | 0.36 | 0.49 | 0.67 | 0.93 |
| 0.17 | 0.21 | 0.26 | 0.31 | 0.37 | 0.58 | 0.79 | 1.07 | k = 7

| 0.09 | 0.14 | 0.14 | 0.16 | 0.24 | 0.30 | 0.43 | 0.47 |
| --- | --- | --- | --- | --- | --- | --- | --- |
| 0.09 | 0.17 | 0.15 | 0.18 | 0.23 | 0.35 | 0.47 | 0.52 |
| 0.10 | 0.12 | 0.17 | 0.20 | 0.23 | 0.34 | 0.48 | 0.56 |
| 0.12 | 0.12 | 0.19 | 0.22 | 0.28 | 0.38 | 0.54 | 0.60 |
| 0.15 | 0.20 | 0.19 | 0.24 | 0.31 | 0.40 | 0.53 | 0.74 |
| 0.13 | 0.19 | 0.23 | 0.28 | 0.35 | 0.49 | 0.62 | 0.77 |
| 0.15 | 0.19 | 0.23 | 0.28 | 0.36 | 0.50 | 0.70 | 0.90 |
| 0.15 | 0.26 | 0.27 | 0.31 | 0.41 | 0.63 | 0.74 | 1.02 |

TABLE 10

| | | | METHOD 1 | | METHOD 2 |
| --- | --- | --- | --- | --- | --- |
| BIT RATE (Mbps) | LL BAND | Y | 9.34 | Mbps | 9.34 |
| | | R − Y | 1.19 | | 1.19 |
| | | B − Y | 1.54 | | 1.54 |
| | | TOTAL | 12.07 | | 12.07 |
| | LH BAND | Y | 6.50 | Mbps | 6.50 |
| | | R − Y | 0.49 | | — |
| | | B − Y | 0.67 | | — |
| | | TOTAL | 7.65 | | 6.50 |
| | HL BAND | Y | 1.96 | Mbps | 1.96 |
| | | R − Y | 0.13 | | — |
| | | B − Y | 0.22 | | — |
| | | TOTAL | 2.32 | | 12.07 |
| | HH BAND | Y | 0.96 | Mbps | — |
| | | R − Y | 0.07 | | — |
| | | B − Y | 0.07 | | — |
| | | TOTAL | 1.08 | | 0.00 |
| | ALL BANDS | Y | 18.76 | Mbps | 17.8 |
| | | R − Y | 1.87 | | 1.19 |
| | | B − Y | 2.49 | | 1.54 |
| | | TOTAL | 23.12 | | 20.53 |
| S/N (dB) | | Y | 38.5 | dB | 37.6 |
| | | R − Y | 41.1 | | 39.5 |
| | | B − Y | 40.1 | | 37.8 |

TABLE 11

| | | METHOD 1 | | METHOD 2 |
| --- | --- | --- | --- | --- |
| BIT RATE (MBPS) | Y | 9.85 | Mbps | 9.85 |
| | R − Y | 1.39 | | 1.39 |
| | B − Y | 1.78 | | 1.78 |
| | Y | 7.60 | Mbps | 7.60 |
| | R − Y | 0.71 | | 0.05 |
| | B − Y | 0.93 | | 0.15 |
| | Y | 2.89 | Mbps | 1.72 |
| | R − Y | 0.27 | | 0 |
| | B − Y | 0.41 | | 0.01 |
| | Y | 1.48 | Mbps | 0.30 |

TABLE 11-continued

|  |  | METHOD 1 | METHOD 2 |
| --- | --- | --- | --- |
|  | R − Y | 0.09 | 0 |
|  | B − Y | 0.14 | 0 |
|  | TOTAL | 27.53 | 22.85 |
| S/N | Y | 39.26 dB | 37.00 |
| (dB) | R − Y | 42.04 | 39.47 |
|  | B − Y | 40.82 | 37.91 |

What is claimed is:

1. A coding apparatus for coding a digital video signal, comprising:
   sub-band dividing means for dividing the digital video signal into a plurality of digital video signals of distinct sub-bands;
   formatting means for formatting video signals of each sub-band into blocks corresponding to a plurality of picture elements;
   orthogonal transforming means for performing an orthogonal transform upon each formatted block to thereby obtain coefficients; and
   coding means for coding the obtained coefficients including,
      quantizing means, having a plurality of quantization tables of different quantizing step widths, for quantizing the coefficients obtained by said orthogonal transforming means, and
      determining means for determining a quantization table of said plurality of quantization tables to be selected by said quantizing means based on a signal level of picture elements of the block of a high frequency band.

2. The coding apparatus as obtained in claim 1, wherein said sub-band dividing means comprises:
   first filtering means for dividing the digital video signal into two digital video signals of different vertical frequency sub-bands;
   first sampling means for downsampling each digital video signal;
   second filtering means for dividing each downsampled digital video signal into two digital video signals of different horizontal frequency sub-bands, to produce four digital video signals of different frequency sub-bands; and
   second sampling means for downsampling each of the four digital video signals.

3. The coding apparatus as claimed in claim 2 wherein said digital video signal includes a luminance signal and two chrominance signals such that said sub-band dividing means, said formatting means, said orthogonal transforming means, and said coding means operate on said luminance signal and two chrominance signal separately and simultaneously; and
   said formatted blocks being three-dimensional corresponding to eight picture elements by eight lines by eight fields of data.

4. The coding apparatus as claimed in claim 3 wherein said first and second filtering means produce four sub-bands for said luminance signal and produce four sub-bands for each chrominance signal;
   said four sub-bands of said luminance signals corresponding first, second, third, and fourth sub-bands;
   said first sub-band of said luminance signal corresponding to a low frequency band in a horizontal direction and a low frequency band in a vertical direction, said second sub-band of said luminance signal corresponding to a low frequency band in a horizontal direction and a high frequency band in a vertical direction, said third sub-band of said luminance signal corresponding to a high frequency band in a horizontal direction and a low frequency band in a vertical direction, and said fourth sub-band of said luminance signal corresponding to a high frequency band in a horizontal direction and a high frequency band in a vertical direction;
   said four sub-bands of each chrominance signal corresponding first, second, third, and fourth sub-bands;
   said first sub-band of each chrominance signal corresponding to a low frequency band in a horizontal direction and a low frequency band in a vertical direction, said second sub-band of each chrominance signal corresponding to a low frequency band in a horizontal direction and a high frequency band in a vertical direction, said third sub-band of each chrominance signal corresponding to a high frequency band in a horizontal direction and a low frequency band in a vertical direction, and said fourth sub-band of each chrominance signal corresponding to a high frequency band in a horizontal direction and a high frequency band in a vertical direction.

5. The coding apparatus as claimed in claim 4, wherein said first and second sampling means thin out said fourth sub-band of said luminance signal in each field and thin out said second, third, and fourth sub-bands of each chrominance signal for each field.

6. The coding apparatus as claimed in claim 4 wherein said first and second sampling means thin out said second and third sub-bands of said luminance signal in third, fourth, seventh, and eighth fields and thin out said fourth sub-band of said luminance signal in third, fourth, fifth, sixth, seventh, and eighth fields.

7. The coding apparatus as claimed in claim 1, wherein said coding means comprises:
   scanning means for scanning in one dimension the coefficients obtained by said orthogonal transforming means; and
   control means for controlling said scanning means so that a starting position of the one-dimensional scanning is decided in accordance with each sub-band.

8. The coding apparatus as claimed in claim 1, wherein said orthogonal transforming means comprises:
   an orthogonal transforming circuit which thins a part of the formatted blocks obtained from said formatting means and performs an orthogonal transform upon remaining formatted blocks.

9. The coding apparatus as claimed in claim 8, wherein said digital video signal is interlaced.

10. The coding apparatus as claimed in claim 9, wherein said orthogonal transforming circuit thins high frequency components of the formatted blocks.

11. The coding apparatus of claim 10, wherein said orthogonal transforming circuit thins the high frequency components of the formatted blocks for a predetermined number of fields in one cycle.

12. The coding apparatus as claimed in claim 9, wherein said orthogonal transforming circuit thins high frequency components of the formatted blocks.

13. The coding apparatus of claim 12, wherein said orthogonal transforming circuit thins the high frequency components of the formatted blocks for a predetermined number of fields in one cycle.

14. The coding apparatus as claimed in claim 1, wherein said orthogonal transforming means comprises:

first means for obtaining an activity of the blocks obtained from said formatting means;

second means for determining an effectiveness of each block on the basis of the obtained activity; and outputting means for outputting coefficients of effective blocks.

15. The coding apparatus as claimed in claim 14, wherein said activity is either a variance of the formatted blocks, a maximum value of the formatted blocks, a dynamic range of the formatted blocks, or a difference of a signal level between adjacent picture elements.

16. The coding apparatus as claimed in claim 14, wherein said outputting means outputs a coefficient of a direct current component in a non-effective block.

17. The coding apparatus as claimed in claim 1, wherein said determining means comprises:

filtering means for dividing said block of the high frequency band into a plurality of sub-blocks; and selecting means for determining a quantization table to be selected by said quantizing means based on a maximum value of an absolute signal level of the picture elements within the sub-blocks.

18. The coding apparatus as claimed in claim 1, wherein said determining means comprises:

filtering means for dividing said block of the high frequency band into a plurality of sub-blocks; and selecting means for determining a quantization table to be selected by said quantizing means based on a dynamic range of the signal level of the picture elements within the sub-blocks.

19. The coding apparatus as claimed in claim 1, wherein said sub-band dividing means divides said digital video signal into two digital video signals of different horizontal frequency sub-bands and divides each digital video signal of a horizontal frequency sub-band into two digital video signal of different vertical frequency sub-bands, thereby dividing said digital video signal into four digital video signals of different sub-bands.

20. The coding apparatus as claimed in claim 19, wherein said blocks of the high frequency band includes a block having a horizontal frequency in a low band and vertical frequency in a high band and a block having a horizontal frequency in a high band and vertical frequency in a low band.

21. The coding apparatus as claimed in claim 19, wherein said orthogonal transform is a Discrete cosine transform.

22. A coding apparatus for coding a digital video signal, comprising:

sub-band dividing means for dividing the digital video signal into a plurality of digital video signals of different sub-bands;

formatting means for formatting the digital video signals of each sub-band into blocks per plurality of picture elements at least in a temporal direction;

orthogonal transforming means for performing an orthogonal transform upon each formatted block to obtain coefficients for each block; and coding means for coding the obtained coefficients.

23. A coding apparatus for coding a digital video signal, comprising:

sub-band dividing means for dividing the digital video signal into a plurality of digital video signals of different sub-bands;

formatting means for formatting the digital video signals of each sub-band into three-dimensional blocks per plurality of picture elements;

orthogonal transforming means for performing a three-dimensional orthogonal transform upon each formatted block thereby to obtain coefficients for each block; and coding means for coding the obtained coefficients.

24. A coding apparatus for coding a digital video signal of interlaced type, comprising:

a first vertical filter having odd number taps, which allows either an odd-number or an even-number field of said digital video signal to pass;

a second vertical filter, having even number taps, which allows the field of said digital video signal not passed by said first vertical filter to pass;

formatting means for formatting the video signals outputted from said first and second vertical filters into three-dimensional blocks per plurality of picture elements;

orthogonal transforming means for performing a three-dimensional orthogonal transform upon each formatted block thereby to obtain coefficients for each block; and coding means for coding the obtained coefficients.

25. A coding apparatus for coding a digital video signal, comprising:

sub-band dividing means for dividing the digital video signal into a plurality of digital video signals of different sub-bands;

formatting means for formatting video signals of each sub-band into blocks per plurality of picture elements;

orthogonal transforming means for performing an orthogonal transform upon each formatted block thereby to obtain coefficients for each block;

weighting means for weighting the obtained coefficients; and coding means for coding an output of said weighting means, wherein said weighting means weights the obtained coefficients consecutively in each sub-band and between each sub-band in a horizontal direction and consecutively in a vertical direction with respect to frequency.

26. A coding apparatus for coding a digital video signal, comprising:

sub-band dividing means for dividing the digital video signal into a plurality of digital video signals of different sub-bands;

formatting means for formatting video signals of each sub-band into blocks per plurality of picture elements;

orthogonal transforming means for performing an orthogonal transform upon each formatted block thereby to obtain coefficients for each block; and coding means, having a plurality of coding tables corresponding to respective sub-bands, for coding the obtained coefficients on the basis of a coding table selected from the plurality of coding tables, said coding means including, quantizing means, having a plurality of quantization tables of different quantizing step widths, for quantizing the coefficients obtained by said orthogonal transforming means by using one of the selected quantization table, and determining means for determining a quantization table to be selected by said quantizing means based on a signal level of picture elements of the block of a high frequency band, said determining means including, filtering means for dividing said block of the high frequency band into a plurality of sub-blocks, and selecting means for determining a quantization table to be selected by said quantizing means based on a maximum value of an absolute signal level of the picture elements within the sub-blocks.

27. A coding apparatus for coding a digital video signal, comprising:

sub-band dividing means for dividing the digital video signal into a plurality of digital video signals of different sub-bands;

formatting means for formatting video signals of each sub-band into blocks per plurality of picture elements;

orthogonal transforming means for performing an orthogonal transform upon each formatted blocks thereby to obtain coefficients for each block;

weighting means for weighting the obtained coefficients; and coding means, having a plurality of coding tables corresponding to respective sub-bands, for coding an output of said weighting means on the basis of a coding table selected from the plurality of coding tables, said coding means including, quantizing means, having a plurality of quantization tables of different quantizing step widths, for quantizing the coefficients obtained by said orthogonal transforming means by using one of the selected quantization table, and determining means for determining a quantization table to be selected by said quantizing means based on a signal level of picture elements of the block of a high frequency band, said determining means including, filtering means for dividing said block of the high frequency band into a plurality of sub-blocks, and selecting means for determining a quantization table to be selected by said quantizing means based on a maximum value of an absolute signal level of the picture elements within the sub-blocks.

28. A coding/decoding apparatus for coding an inputted digital video signal and decoding a coded data thereby to obtain the digital video signal, comprising:

sub-band dividing means for dividing the digital video signal into a plurality of digital video signals of different sub-bands;

formatting means for formatting video signals of each sub-band into blocks per plurality of picture elements;

orthogonal transforming means for performing an orthogonal transform upon each formatted block thereby to obtain coefficients for each block;

coding means for coding the obtained coefficients;

decoding means for decoding the coded data thereby to obtain coefficients;

inverse orthogonal transforming means for performing an inverse orthogonal transform upon the obtained coefficients thereby to obtain a plurality of video signals of different sub-bands; and sub-band synthesizing means for synthesizing the plurality of video signals of sub-bands thereby to obtain said digital video signal, said coding means including, quantizing means, having a plurality of quantization tables of different quantizing step widths, for quantizing the coefficients obtained by said orthogonal transforming means, and determining means for determining a quantization table of the plurality of quantization tables to be selected by said quantizing means based on a signal level of picture elements of the block of a high frequency band.

29. The coding apparatus as claimed in claim 28, wherein said sub-band dividing means divides said digital video signal into two digital video signals of different horizontal frequency sub-bands and divides each digital video signal of a horizontal frequency sub-band into two digital video signal of different vertical frequency sub-bands, thereby dividing said digital video signal into four digital video signals of different sub-bands.

30. The coding apparatus as claimed in claim 29, wherein said blocks of the high frequency band includes a block having a horizontal frequency in a low band and vertical frequency in a high band and a block having a horizontal frequency in a high band and vertical frequency in a low band.

31. The coding apparatus as claimed in claim 28, wherein said determining means comprises:

filtering means for dividing said block of the high frequency band into a plurality of sub-blocks; and selecting means for determining a quantization table to be selected by said quantizing means based on a maximum value of as absolute signal level of the picture elements within the sub-blocks.

32. The coding apparatus as claimed in claim 28, wherein said determining means comprises:

filtering means for dividing said block of the high frequency band into a plurality of sub-blocks; and selecting means for determining a quantization table to be selected by said quantizing means based on a dynamic range of the signal level of the picture elements within the sub-blocks.

33. A coding method for coding a digital video signal, comprising the steps of:

(a) dividing the digital video signal into a plurality of digital video signals of different sub-bands;

(b) formatting the digital video signals of each sub-band into at least two dimensional blocks per plurality of picture elements;

(c) performing an orthogonal transform upon each formatted block thereby to obtain coefficients for each block; and (d) coding the obtained coefficients through one-dimensional scanning, wherein a starting position of the one-dimensional scanning is selected as a position with a lowest frequency component after sub-band division for each sub-band.

34. The coding method as claimed in claim 33 wherein said digital video signal includes a luminance signal and two chrominance signals such that said steps (a), (b), (c), and (d) operate on the luminance signal and two chrominance signal separately and simultaneously, and the formatted blocks are three-dimensional corresponding to eight picture elements by eight lines by eight fields of data.

35. The coding method as claimed in claim 34 wherein said step (a) produces four sub-bands for the luminance signal and produces four sub-bands for each chrominance signal, the four sub-bands of the luminance signals corresponding first, second, third, and fourth sub-bands, the first sub-band of the luminance signal corresponding to a low frequency band in a horizontal direction and a low frequency band in a vertical direction, the second sub-band of the luminance signal corresponding to a low frequency band in a horizontal direction and a high frequency band in a vertical direction, the third sub-band of the luminance signal corresponding to a high frequency band in a horizontal direction and a low frequency band in a vertical direction, and the fourth sub-band of the luminance signal corresponding to a high frequency band in a horizontal direction and a high frequency band in a vertical direction, the four sub-bands of each chrominance signals corresponding first, second, third, and fourth sub-bands, the first sub-band of each chrominance signal corresponding to a low frequency band in a horizontal direction and a low frequency band in a vertical direction, the second sub-band of each chrominance signal corresponding to a low frequency band in a horizontal direction and a high frequency band in a vertical direction, the third sub-band of each chrominance signal corresponding to a high frequency band in a horizontal direction and a low frequency band in a vertical direction, and the fourth sub-band of each chrominance signal corresponding to a high frequency band in a horizontal direction and a high frequency band in a vertical direction.

36. The coding method as claimed in claim 35, wherein said step (c) thins out the fourth sub-band of the luminance signal in each field and thins out the second, third, and fourth sub-bands of each chrominance signal for each field.

37. The coding method as claimed in claim 35 wherein said Step (c) thins out the second and third sub-bands of the luminance signal in third, fourth, seventh, and eighth fields and thins out the fourth sub-band of the luminance signal in third, fourth, fifth, sixth, seventh, and eighth fields.

38. A coding method for coding a digital video signal, comprising the steps of:
 (a) dividing the digital video signal into a plurality of digital video signals of different sub-bands;
 (b) formatting the digital video signals of each sub-band into blocks per plurality of picture elements;
 (c) thinning out high frequency components of the formatted blocks;
 (d) performing an orthogonal transform upon each remaining formatted block thereby to obtain coefficients; and
 (e) coding the obtained coefficients.

39. The coding method of claim 38, wherein said step (c) the high frequency components of the formatted blocks are thinned in a predetermined number of fields in one cycle.

40. A coding method for coding a digital video signal, comprising the steps of:
 (a) dividing the digital video signal into a plurality of digital video signals of different sub-bands;
 (b) formatting the digital video signals of each sub-band into blocks per plurality of picture elements;
 (c) obtaining an activity of the digital video signals in each formatted block;
 (d) determining whether each block is an effective block on the basis of the activity and discarding non-effective blocks;
 (e) performing an orthogonal transform upon only each effective block thereby to obtain coefficients; and
 (f) coding the coefficients for each effective block.

41. A coding method for quantizing and coding a digital video signal, comprising the steps of:
 (a) dividing the digital video signal into a plurality of digital video signals of different sub-bands;
 (b) formatting the digital video signals of each sub-band into blocks per plurality of picture elements;
 (c) performing an orthogonal transform upon each formatted block thereby to obtain coefficients;
 (d) selecting one quantization table from a plurality of quantization tables of different quantizing step widths on the basis of a signal level of picture elements of the block of a high frequency band; and
 (e) quantizing and coding the obtained coefficients according to the selected quantization table.

42. A coding method for coding a digital video signal of interlaced type, comprising the steps of:
 (a) filtering either an odd-number or an even-number field of the digital video signal through a vertical filter having odd number taps;
 (b) filtering the field of the digital video signal not filtered in said step (a) through a vertical filter having even number taps;
 (c) constructing two-dimensional blocks in a horizontal direction and a vertical direction within each field using an output signal from the vertical filters;
 (d) constructing three-dimensional blocks by bundling the two-dimensional blocks for a plurality of field in a temporal direction;
 (e) performing an orthogonal transform upon each three-dimensional block thereby to obtain coefficients; and
 (f) coding the obtained coefficients.

43. A coding method for coding a digital video signal, comprising the steps of:
 (a) dividing the digital video signal into a plurality of digital video signals of different sub-bands;
 (b) formatting the digital video signals of each sub-band into blocks per plurality of picture elements;
 (c) performing an orthogonal transform upon each formatted block thereby to obtain coefficients;
 (d) weighting the obtained coefficients consecutively in each sub-band and between each sub-band in a horizontal direction and is consecutive in a vertical direction; and (e) coding the weighted coefficients.

44. A sub-band dividing/synthesizing method for dividing a digital video signal into sub-bands and synthesizing the divided digital video signals, comprising the steps of:
 (a) connecting a folded video signal folded at an end point of the digital video signal with the end point;
 (b) filtering the video signal connected with the folded video signal through a first low pass filter having even number taps;
 (c) downsampling an output signal of the first low pass filter at a 2:1 rate thereby to obtain a first output signal;
 (d) filtering the video signal connected with the folded video signal through a first high pass filter having even number taps;
 (g) downsampling an output signal of the first high pass filter at a 2:1 rate thereby to obtain a second output signal;
 (h) connecting a folded video signal folded at an end point of the first output signal with the end point;
 (i) interpolating 0 to the first output signal connected with the folded video signal thereby to double the number of picture elements;

(j) filtering the video signal after interpolation of 0 in said step (i) through a second low pass filter having even number taps;

(k) connecting the video signal obtained by multiplying with −1 the value of each picture element when the second output signal is folded at an end point thereof with the end point;

(l) interpolating 0 to the second output signal connected with the folded video signal thereby to double the number of picture elements;

(m) filtering the video signal after interpolation of 0 in said step (l) through a second high pass filter having even number taps; and (n) synthesizing the outputs of the second low pass filter and the second high pass filter.

45. A sub-band dividing/synthesizing method for dividing a digital video signal into sub-bands and synthesizing the divided digital video signals, comprising the steps of:

(a) connecting a video signal obtained by subtracting one picture element from a folded video signal folded at an end point of the digital video signal with the end point;

(b) filtering the video signal connected with the folded video signal through a first low pass filter having odd number taps;

(c) downsampling an output signal of the first low pass filter at a 2:1 rate thereby to obtain a first output signal;

(d) filtering the video signal connected with the folded video signal through a first high pass filter having odd number taps;

(e) downsampling an output of the first high pass filter at a 2:1 rate thereby to obtain a second output signal;

(f) interpolating 0 to the first output signal thereby to double the number of picture elements;

(g) connecting the video signal obtained by subtracting one picture element from a folded video signal folded at an end point of the first output signal after interpolation of 0 with the end point;

(h) filtering the video signal connected with the folded video signal through a second low pass filter having odd number taps;

(i) interpolating 0 to the second output signal thereby to double the number of picture elements;

(j) connecting a folded video signal obtained by subtracting one picture element from the video signal folded at an end point of the second output signal after interpolation of 0 with the end point;

(k) filtering the video signal connected with the folded video signal through a second high pass filter having odd number taps; and (l) synthesizing the outputs of the second low pass filter and second high pass filter.

46. A coding apparatus for coding a digital video signal comprising:

dividing means for dividing the digital signal into a plurality of sub-band blocks of data;

transformation means for performing a three dimensional transformation upon the sub-band blocks of data to generate coefficients; and coding means for coding the coefficients to reduce redundancy in the digital video signal;

the digital video signal including a luminance signal and two chrominance signals such that said dividing means, said transformation means, and said coding means operate on said luminance signal and two chrominance signals separately and simultaneously and said sub-band blocks are three-dimensional and correspond to eight picture elements by eight lines by eight fields of data;

said dividing means producing four sub-band blocks for said luminance signal and producing four sub-band blocks for each chrominance signal;

said four sub-band blocks of said luminance signals corresponding to first, second, third, and fourth sub-band blocks;

said first sub-band block of said luminance signal corresponding to a low frequency band in a horizontal direction and a low frequency band in a vertical direction, said second sub-band block of said luminance signal corresponding to a low frequency band in a horizontal direction and a high frequency band in a vertical direction, said third sub-band block of said luminance signal corresponding to a high frequency band in a horizontal direction and a low frequency band in a vertical direction, and said fourth sub-band block of said luminance signal corresponding to a high frequency band in a horizontal direction and a high frequency band in a vertical direction;

said four sub-band blocks of each chrominance signal corresponding to first, second, third, and fourth sub-band blocks;

said first sub-band block of each chrominance signal corresponding to a low frequency band in a horizontal direction and a low frequency band in a vertical direction, said second sub-band block of each chrominance signal corresponding to a low frequency band in a horizontal direction and a high frequency band in a vertical direction, said third sub-band block of each chrominance signal corresponding to a high frequency band in a horizontal direction and a low frequency band in a vertical direction, and said fourth sub-band block of each chrominance signal corresponding to a high frequency band in a horizontal direction and a high frequency band in a vertical direction.

47. The coding apparatus as claimed in claim 46, further comprising:

thinning means for thinning out said fourth sub-band of said luminance signal in each field and for thinning out said second, third, and fourth sub-bands of each chrominance signal for each field.

48. The coding apparatus as claimed in claim 46 further comprising:

thinning means for thinning out said second and third sub-bands of said luminance signal in third, fourth, seventh, and eighth fields and for thinning out said fourth sub-band of said luminance signal in third, fourth, fifth, sixth, seventh, and eighth fields.

49. A coding method for coding a digital video signal comprising:

(a) dividing the digital signal into a plurality of sub-bands blocks of data;

(b) performing a three dimensional transformation upon the sub-band blocks of data to generate coefficients; and (c) coding the coefficient to reduce redundancy in the digital video signal;

wherein the digital video signal includes a luminance signal and two chrominance signals such that said steps (a), (b), and (c) operate on the luminance signal and two chrominance signal separately and simultaneously, and the sub-band blocks are three-dimensional corresponding to eight picture elements by eight lines by eight fields of data;

wherein said step (a) produces four sub-band blocks for the luminance signal and produces four sub-band blocks for each chrominance signal, four sub-band blocks of the luminance signals corresponding first, second, third, and fourth sub-bands, the first sub-band block of the luminance signal corresponding to a low frequency band in a horizontal direction and a low frequency band in a vertical direction, the second sub-band block of the luminance signal corresponding to a low frequency band in a horizontal direction and a high frequency band in a vertical direction, the third sub-band block of the luminance signal corresponding to a high frequency band in a horizontal direction and a low frequency band in a vertical direction, and the fourth sub-band block of the luminance signal corresponding to a high frequency band in a horizontal direction and a high frequency band in a vertical direction, the four sub-band blocks of each chrominance signal corresponding first, second, third, and fourth sub-bands, the first sub-band block of each chrominance signal corresponding to a low frequency band in a horizontal direction and a low frequency band in a vertical direction, the second sub-band block of each chrominance signal corresponding to a low frequency band in a horizontal direction and a high frequency band in a vertical direction, the third sub-band block of each chrominance signal corresponding to a high frequency band in a horizontal direction and a low frequency band in a vertical direction, and the fourth sub-band block of each chrominance signal corresponding to a high frequency band in a horizontal direction and a high frequency band in a vertical direction.

50. The coding method as claimed in claim 49, further comprising the step of:
    (d) thinning out the fourth sub-band block of the luminance signal in each field and thinning out the second, third, and fourth sub-band blocks of each chrominance signal for each field.

51. The coding method as claimed in claim 49 further comprising the step of:
    (e) thinning out the second and third sub-band blocks of the luminance signal in third, fourth, seventh, and eighth fields and thinning out the fourth sub-band block of the luminance signal in third, fourth, fifth, sixth, seventh, and eighth fields.

52. A coding apparatus for coding an interlaced digital video signal, comprising:
    sub-band dividing means for dividing the interlaced digital video signal into a plurality of digital video signals of distinct sub-bands;
    formatting means for formatting video signals of each sub-band into blocks corresponding to a plurality of picture elements;
    orthogonal transforming means for performing an orthogonal transform upon each formatted block to thereby obtain coefficients; and
    coding means for coding the obtained coefficients said orthogonal transforming means including,
        an orthogonal transforming circuit which thins a part of the formatted blocks obtained from said formatting means and performs an orthogonal transform upon remaining formatted blocks;
    wherein said orthogonal transforming circuit thins a part of the formatted blocks.

53. The coding apparatus as claimed in claim 52, wherein said sub-band dividing means comprises:
    first filtering means for dividing the interlaced digital video signal into two digital video signals of different vertical frequency sub-bands;
    first sampling means for downsampling each digital video signal;
    second filtering means for dividing each downsampled digital video signal into two digital video signals of different horizontal frequency sub-bands, to produce four digital video signals of different frequency sub-bands; and
    second sampling means for downsampling each of the four digital video signals.

54. The coding apparatus as claimed in claim 52, wherein said coding means comprises:
    scanning means for scanning in one dimension the coefficients obtained by said orthogonal transforming means; and
    control means for controlling said scanning means so that a starting position of the one-dimensional scanning is decided in accordance with each sub-band.

55. The coding apparatus of claim 52, wherein said orthogonal transforming circuit thins the high frequency components of the formatted blocks for a predetermined number of fields in one cycle.

56. A coding apparatus for coding a digital video signal, comprising:
    sub-band dividing means for dividing the digital video signal into a plurality of digital video signals of distinct sub-bands;
    formatting means for formatting video signals of each sub-band into blocks corresponding to a plurality of picture elements;
    orthogonal transforming means for performing an orthogonal transform upon each formatted blocks to thereby obtain coefficients; and
    coding means for coding the obtained coefficients;
    said orthogonal transforming means including,
        first means for obtaining an activity of the blocks obtained from said formatting means,
        second means for determining an effectiveness of each block on the basis of the obtained activity, and
        outputting means for outputting coefficients of effective blocks;
    wherein said activity is either a variance of the formatted blocks, a maximum value of the formatted blocks, a dynamic range of the formatted blocks, or a difference of a signal level between adjacent picture elements.

57. The coding apparatus as claimed in claim 56, wherein said outputting means outputs a coefficient of a direct current component in a non-effective block.

58. A coding apparatus for coding an interlaced digital video signal, comprising:
    sub-band dividing means for dividing the interlaced digital video signal into a plurality of digital video signals of distinct sub-bands;
    formatting means for formatting video signals of each sub-band into blocks corresponding to a plurality of picture elements;
    orthogonal transforming means for performing an orthogonal transform upon each formatted blocks to thereby obtain coefficients; and coding means for coding the obtained coefficients;
said orthogonal transforming means including,
an orthogonal transforming circuit which thins a part of the formatted blocks, obtained from said formatting means and performs an orthogonal transform upon remaining formatted blocks.

59. The coding apparatus as obtained in claim 58, wherein said sub-band dividing means comprises:
first filtering means for dividing the interlaced digital video signal into two digital video signals of different vertical frequency sub-bands;
first sampling means for downsampling each digital video signal;
second filtering means for dividing each downsampled digital video signal into two digital video signals of different horizontal frequency sub-bands, to produce four digital video signals of different frequency sub-bands; and
second sampling means for downsampling each of the four digital video signals.

60. The coding apparatus as claimed in claim 58, wherein said coding means comprises:
scanning means for scanning in one dimension the coefficients obtained by said orthogonal transforming means; and
control means for controlling said scanning means so that a starting position of the one-dimensional scanning is decided in accordance with each sub-band.

61. The coding apparatus of claim 58, wherein said orthogonal transforming circuit thins the high frequency components of the formatted blocks for a predetermined number of fields in one cycle.

62. The coding apparatus as claimed in claim 28, wherein said orthogonal transform is a Discrete Cosine Transform.

* * * * *